United States Patent
Nishizawa et al.

(10) Patent No.: US 9,147,434 B2
(45) Date of Patent: Sep. 29, 2015

(54) INFORMATION PROCESSING APPARATUS AND INFORMATION PROCESSING METHOD

(75) Inventors: Manabu Nishizawa, Tokyo (JP); Yuki Kobayashi, Kanagawa (JP); Kensaku Ishizuka, Tokyo (JP); Satoshi Morita, Chiba (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 54 days.

(21) Appl. No.: 14/119,258

(22) PCT Filed: Apr. 17, 2012

(86) PCT No.: PCT/JP2012/002642
§ 371 (c)(1),
(2), (4) Date: Nov. 21, 2013

(87) PCT Pub. No.: WO2013/001695
PCT Pub. Date: Jan. 3, 2013

(65) Prior Publication Data
US 2014/0126884 A1    May 8, 2014

(30) Foreign Application Priority Data
Jun. 29, 2011    (JP) ................................ 2011-144893

(51) Int. Cl.
*H04N 5/765* (2006.01)
*H04N 5/775* (2006.01)
(Continued)

(52) U.S. Cl.
CPC ............ *G11B 27/102* (2013.01); *G11B 27/034* (2013.01); *G11B 27/105* (2013.01);
(Continued)

(58) Field of Classification Search
USPC .................. 386/239–248, 291–299, 200–234; 725/37–45, 139–142, 153
See application file for complete search history.

(56) References Cited

U.S. PATENT DOCUMENTS 7,469,413 B1 * 12/2008 Mizutome et al. ............... 725/48
2005/0229213 A1 * 10/2005 Ellis et al. ....................... 725/58
(Continued)

FOREIGN PATENT DOCUMENTS

JP    2002-232814        8/2002
JP    2004-133984 A      4/2004
(Continued)

OTHER PUBLICATIONS

International Search Report dated Jul. 24, 2012 from the corresponding PCT/JP2012/002642.
(Continued)

*Primary Examiner* — Hung Dang
(74) *Attorney, Agent, or Firm* — Katten Muchin Rosenman LLP

(57) ABSTRACT

A recording information acquisition unit 626 acquires recording information of a plurality of recorded contents having programs recorded therein and stored in the information processing apparatus or in any of a plurality of recording apparatus connected to the information processing apparatus through a network. A content classification unit 628 classifies the recorded contents into groups based on the recording information acquired by the recording information acquisition unit 626. A group name determination unit 630 determines, for each of the groups of the recorded contents classified by the content classification unit 628, a title of the group. A list displaying unit 632 displays the group names determined by the group name determination unit 630 in a list on a user interface without distinguishing the apparatus in which the recorded contents are stored.

7 Claims, 41 Drawing Sheets

| PROGRAM TITLE | RECORDING DATE AND TIME | STATUS | PLAYBACK PROGRESS RATE | |
|---|---|---|---|---|
| AAA | 2009/8/1 19:00 ~2009/8/1 20:58 | RECORDED | 100% | PLAYBACK |
| BBB | 2009/8/2 23:00 ~2009/8/2 24:55 | RECORDED | 40% | PLAYBACK |
| BBB | 2009/8/3 23:00 ~2009/8/3 24:55 | RECORDED | 0% | PLAYBACK |
| CCC | 2009/8/4 12:00 ~2009/8/4 12:52 | ERROR WHILE RECORDING | — | |
| BBB | 2009/8/4 23:00 ~2009/8/4 24:55 | PROGRAMMED | — | |

LIST OF RECORDED CONTENTS

(51) Int. Cl.
*H04N 9/80* (2006.01)
*H04N 5/76* (2006.01)
*H04N 7/16* (2011.01)
*G11B 27/10* (2006.01)
*G11B 27/034* (2006.01)
*G11B 27/11* (2006.01)
*G11B 27/34* (2006.01)
*H04N 9/87* (2006.01)
*H04N 9/82* (2006.01)

(52) U.S. Cl.
CPC ............... *G11B 27/11* (2013.01); *G11B 27/34* (2013.01); *H04N 5/76* (2013.01); *H04N 9/87* (2013.01); *G11B 2220/412* (2013.01); *H04N 5/765* (2013.01); *H04N 9/8205* (2013.01); *H04N 9/8227* (2013.01)

(56) References Cited

U.S. PATENT DOCUMENTS

| | | | |
|---|---|---|---|
| 2005/0238317 A1* | 10/2005 | Horiguchi et al. | 386/46 |
| 2005/0283803 A1* | 12/2005 | Kimura et al. | 725/46 |
| 2006/0232707 A1* | 10/2006 | Kimura | 348/553 |
| 2008/0002940 A1 | 1/2008 | Tsunoda | |
| 2009/0103894 A1* | 4/2009 | Yamashita | 386/83 |
| 2010/0049989 A1* | 2/2010 | Lee | 713/189 |
| 2012/0017239 A1* | 1/2012 | Ryu et al. | 725/32 |

FOREIGN PATENT DOCUMENTS

| | | | | |
|---|---|---|---|---|
| JP | 2004-222045 A | 8/2004 | | |
| JP | 2007-172686 | 7/2007 | | |
| JP | 2007-201680 A | 8/2007 | | |
| JP | 2008-11432 A | 1/2008 | | |
| JP | 2008-28947 A | 2/2008 | | |
| JP | 2008-67332 A | 3/2008 | | |
| JP | 2009-135569 A | 6/2009 | | |
| JP | 2010-176247 A | 8/2010 | | |
| WO | WO 2010/117213 A2 * | 10/2010 | | H04N 7/173 |

OTHER PUBLICATIONS

Notification of Reasons for Refusal dated Apr. 2, 2013 from the corresponding Japanese Patent Application No. 2011-144893.
Notification of Reasons for Refusal dated Jul. 17, 2012 from the corresponding Japanese Patent Application No. 2011-144893.
Translation of International Preliminary Report on Patentability dated Jan. 7, 2014 from corresponding Application No. PCT/JP2012/002642.

* cited by examiner

| PROGRAM ID | NO. OF VIEWERS | | | | | NO. OF PROGRAMMED RECORDINGS | | | | |
|---|---|---|---|---|---|---|---|---|---|---|
| | MALE IN 10'S | FEMALE IN 10'S | MALE IN 20'S | FEMALE IN 20'S | .... | MALE IN 10'S | FEMALE IN 10'S | MALE IN 20'S | FEMALE IN 20'S | .... |

| PROGRAM ID | PROGRAM TITLE | PROGRAM SUMMARY | PERFORMER INFORMATION | BROADCAST START TIME | BROADCAST END TIME | POPULARITY RANKING |

| RECORDING ID | PROGRAM ID | PROGRAM TITLE | RECORDING DATE | RECORDING START TIME | RECORDING END TIME | RECORDING FLAG | PLAYBACK PROGRESS RATE | CONTENT DATA |

| | 01<br>○○ GENERAL | 02<br>△△ TELEVISION | 03<br>TELEVISION□□ | 04<br>○○ EDUCATION |
|---|---|---|---|---|
| 17 | (00) HIGH SCHOOL SOCCER FINALLY, THE SEMI-FINAL 1ST GROUP OF SEMI-FINAL AGGRESSIVE HIGH SCHOOL A | DON'T MISS THE DRAMATIC ENDING! | (00) PROGRAM TITLE PROGRAM SUMMARY | (00) PROGRAM TITLE PROGRAM SUMMARY |
| 18 | (30) EVENING NEWS STRAIGHTFORWARD COMMENTARY ON LATEST NEWS | (30) EVENING NEWS BRINGS YOU ACCURATE INFORMATION | (30) PROGRAM TITLE | |
| 19 | (00) XX GOTEN MAGICAL TALK SHOW HOSTS MEETS 12... | (00) ASK XX PEOPLE QUIZ SHOW | (00) PROGRAM TITLE PROGRAM SUMMARY | (00) PROGRAM TITLE PROGRAM SUMMARY |
| 20 | | (30) EXPLORATION! IN-DEPTH LOOK INTO HUMAN ORIGIN 2009 MARKS THE 150TH ANNIVERSARY OF "ORIGIN OF SPECIES" BY DARWIN. HOW THE MYSTERY OF EVOLUTION OF LIFE BEEN UNRAVELED? | (00) PROGRAM TITLE PROGRAM SUMMARY | (00) PROGRAM TITLE PROGRAM SUMMARY |
| 21 | (00) MONDAY NIGHT SUSPENSE | (00) PROGRAM TITLE PROGRAM SUMMARY | | |

| LIST OF RECORDED CONTENTS | | | | |
|---|---|---|---|---|
| PROGRAM TITLE | RECORDING DATE AND TIME | STATUS | PLAYBACK PROGRESS RATE | |
| AAA | 2009/8/1 19:00 ~2009/8/1 20:58 | RECORDED | 100% | (PLAYBACK) |
| BBB | 2009/8/2 23:00 ~2009/8/2 24:55 | RECORDED | 40% | (PLAYBACK) |
| BBB | 2009/8/3 23:00 ~2009/8/3 24:55 | RECORDED | 0% | (PLAYBACK) |
| CCC | 2009/8/4 12:00 ~2009/8/4 12:52 | ERROR WHILE RECORDING | — | |
| BBB | 2009/8/4 23:00 ~2009/8/4 24:55 | PROGRAMMED | — | |
| ⋮ | ⋮ | ⋮ | ⋮ | |

| PROGRAM GENRE | FIXED COMMENT |
|---|---|
| VARIETY | [PROGRAM NAME] IS INTERESTING. |
|  | [PROGRAM NAME] IS NOT INTERESTING. |
| NEWS | THIS IS A BIG NEWS. |
|  | I CANNOT BELIEVE IT. |
| ⋮ | ⋮ |

412

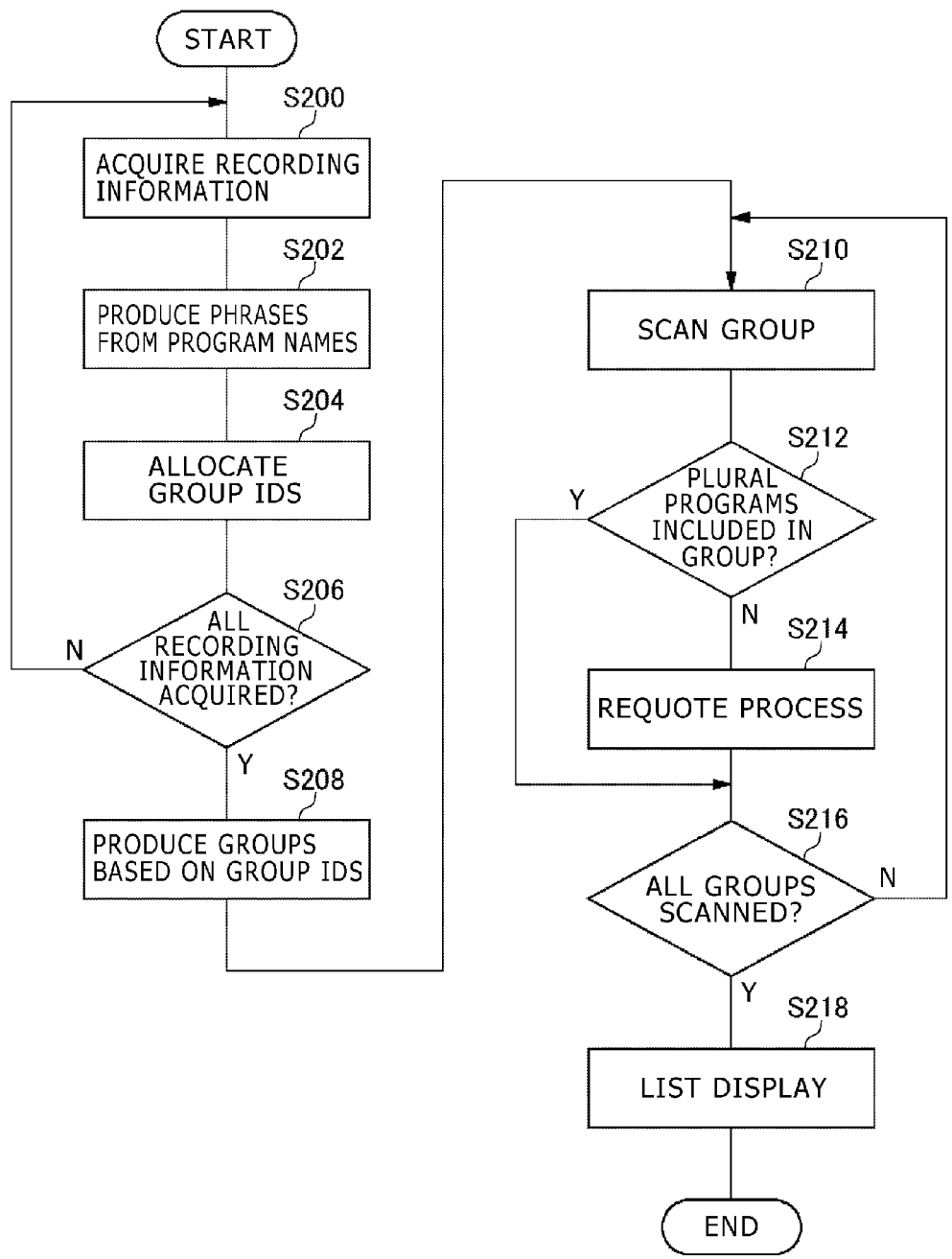

INFORMATION PROCESSING APPARATUS AND INFORMATION PROCESSING METHOD

TECHNICAL FIELD

The present invention relates to a data processing technology and more particularly to a technology for displaying program names of programs recorded in a plurality of recording apparatus in a list.

BACKGROUND ART

In recent years, thanks to rapid development of a recording apparatus and a network technology, it has become possible for an ordinary user to record a program by a plurality of recording apparatus at home and centrally manage the recorded programs through a network. A viewer can use such apparatus to record a number of programs and appreciate the recorded contents, for example, after the viewer comes home after work.

SUMMARY

Technical Problem

When recorded contents recorded separately in different recording apparatus are to be viewed, it is necessary to operate the recording apparatus separately from each other, which may possibly provide a cumbersome feeling to the viewer. Specifically in such a case that series programs in which relevant stories are broadcast every week are stored in a distributed manner in the different recording apparatus, only to search for the recorded contents in order may possibly take time.

The present invention has been made in view of such a problem as described above, and it is a principal object of the present invention to provide a technology for managing programs recorded in a plurality of recording apparatus in a centralized manner.

Solution to Problem

In order to solve the problem described above, an information processing apparatus according to an embodiment of the present invention includes: a recording information acquisition unit configured to acquire recording information of a plurality of recorded contents having programs recorded therein and stored in the information processing apparatus or in any of a plurality of recording apparatus connected to the information processing apparatus through a network; a content classification unit configured to classify the recorded contents into groups based on the recording information acquired by the recording information acquisition unit; a group name determination unit configured to determine, for each of the groups of the recorded contents classified by the content classification unit, a title of the group; and a list displaying unit configured to display the group names determined by the group name determination unit in a list on a user interface without distinguishing the apparatus in which the recorded contents are stored.

Another embodiment of the present invention is an information processing method. This method causes a processor to carry out: classifying a plurality of recorded contents having programs recorded therein and stored locally or in any of a plurality of recording apparatus connected through a network into groups; applying group names; and displaying the applied group names in a list on a user interface without distinguishing the apparatus in which the recorded contents are stored.

It is to be noted that optional combinations of the constituting elements described above and those obtained by converting the representations of the present invention between or among an apparatus, a method, a system, a program, a recording medium on or in which the program is stored and so forth are also effective as embodiments of the present invention.

Advantageous Effect of Invention

According to the present invention, a technology for managing programs recorded in a plurality of recording apparatus in a centralized manner can be provided.

BRIEF DESCRIPTION OF DRAWINGS

FIG. 7 shows the structure of data stored in a program information storage unit.

FIG. 8 shows the structure of data stored in a recording information storage unit.

FIG. 14 shows an exemplary second program guide as displayed.

FIG. 15 shows an exemplary second program guide as displayed.

FIG. 18(*a*) shows an exemplary second program guide as displayed.

FIG. 18(*b*) shows an exemplary second program guide as displayed.

FIG. 19 shows an exemplary video screen showing a list of recordings.

FIG. 45 is a flowchart showing the operation of the content management unit according to the embodiment.

DESCRIPTION OF EMBODIMENTS (Base Technology)

A description is now given of the base technology before explaining an embodiment of the present invention. The base technology provides an information processing technology of improving the comfort and convenience of a user viewing a program that is being broadcast or a program broadcast in the past. The information processing technology includes the following four technical elements.

A summary of the first technical element will be discussed. Conventional electronic program guides merely present summary information related to programs and defined by broadcasting stations, etc. As such, they are not necessarily convenient to use for viewers. The base technology provides a technology for providing an electronic program guide that provides excellent usability for viewers. For example, the electronic program guide of a form of the base technology provides a user interface whereby the convenience for viewers viewing program information is improved.

A summary of the second technical element will be discussed. Currently, Internet connection is available in a growing number of households. Information appliances in possession of a viewer of a program are equipped with the capabilities of exchanging data with a server on the Internet. The base technology proposes a technology of providing an electronic program guide that is based on data exchange over the Internet and designed to present information useful for viewers as well as mere program summaries. For example, the electronic program guide according to a form of the base technology presents the popularity ranking of a plurality of programs broadcast in the same time zone.

A summary of the third technical element will be discussed. The base technology provides a technology that implements a user-friendly user interface in a portal screen that serves as a primary entrance to various functional screens including the display screen of an electronic program guide. For example, the portal screen according to a form of the base technology provides latest information on program viewing useful for viewers of a program.

A summary of the fourth technical element will be discussed. The base technology provides a technology that provides a search result useful for a viewer viewing a program. For example, the program viewing screen according to a form of the base technology displays a result of Internet search using a keyword related to the program along with the image of the program.

Figure 1:
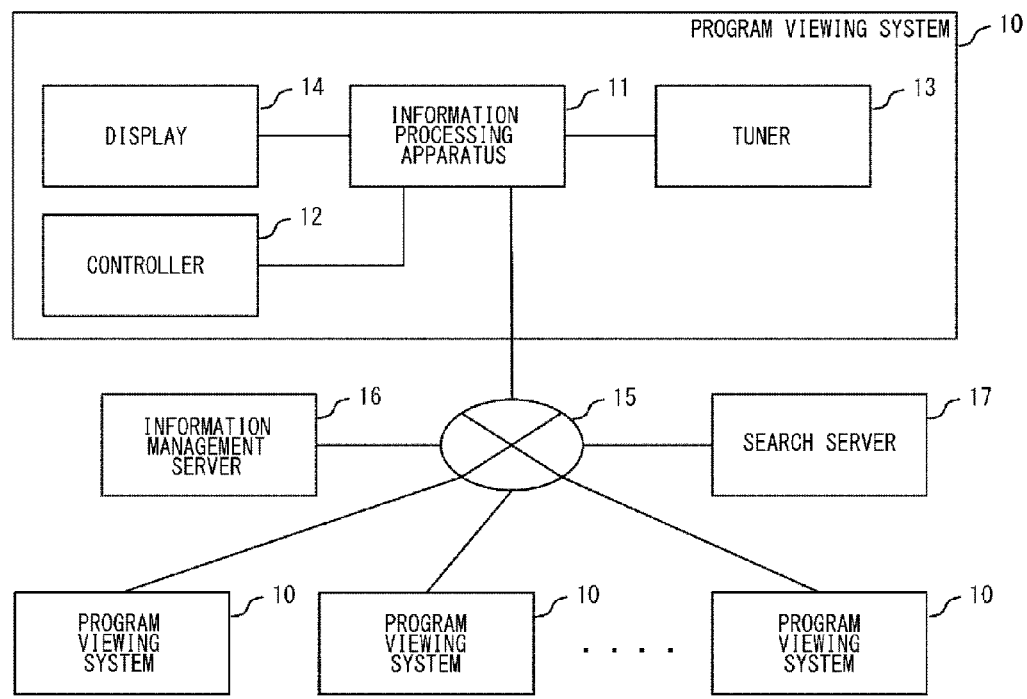
FIG. 1 shows the configuration of an information processing system according to a first form of the base technology.

FIG. 1 shows the configuration of an information processing system according to a first form of the base technology of the present invention. An information processing system 100 is configured such that a plurality of program viewing systems 10, an information management server 16, and a search server 17 are connected via the Internet 15.

The program viewing system 10 allows viewing, recording, reproducing of terrestrial digital television broadcast, and displaying of a program guide. The program viewing system 10 includes an information processing apparatus 11, a controller 12, a tuner 13, and a display 14. In the first form of the base technology, the program viewing system 10 represents a unit of "viewers." Therefore, two or more people watching the display 14 may be dealt with as one viewer.

The tuner 13 is a terrestrial digital television tuner. The tuner 13 receives a broadcast signal on a channel selected by the viewer and decodes the broadcast signal into image information. The tuner 13 then sends the image information to the information processing apparatus 11. The tuner 13 also acquires EPG information (program information) from the broadcast signal and sends the information to the information processing apparatus 11. The tuner 13 and the information processing apparatus 11 may be connected by a universal serial bus (USB) cable.

Figure 2:
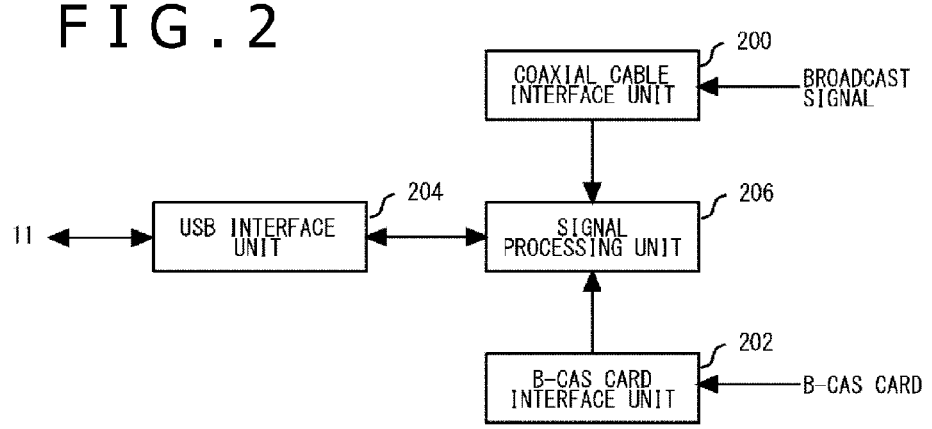
FIG. 2 is a block diagram showing the functional configuration of a tuner of FIG. 1.

FIG. 2 is a block diagram showing the functional configuration of the tuner 13 of FIG. 1. The blocks shown in the block diagram are implemented by hardware, i.e., components and mechanical devices, such as CPU or memory of a computer, or by software such as a computer program. FIG. 2 depicts functional blocks implemented by the cooperation of hardware and software. Therefore, it will be obvious to those skilled in the art that the functional blocks may be implemented in a variety of manners by a combination of hardware and software.

The tuner 13 includes a coaxial cable interface unit 200, a B-CAS (registered trademark) card interface unit 202, a USB interface unit 204, and a signal processing unit 206. The coaxial cable interface unit 200 functions as an interface with a coaxial cable connected to the antenna and acquires a broadcast signal of terrestrial digital television broadcast. The B-CAS card interface unit 202 functions as an interface with a B-CAS card and acquires an encryption key for decoding the broadcast signal from the B-CAS card.

The USB interface unit 204 functions as an interface with a USB cable and acquires identification information of the channel selected by the viewer from the information processing apparatus 11. Further, the USB interface unit 204 sends image information on the selected channel and EPG information to the information processing apparatus 11. The signal processing unit 206 retrieves a signal on the channel selected by the viewer from the broadcast signal and decodes the signal into image information according to the encryption key of the B-CAS card.

Referring back to FIG. 1, the information processing apparatus 11 is a computer terminal connected to the Internet 15 that acknowledges the viewer's operation via the controller 12 and is operated accordingly. The information processing apparatus 11 may be a desktop game device. A program viewer application (hereinafter, also referred to as "program viewer AP"), for displaying and recording live transmission of a program broadcast on terrestrial digital television and for playing back recorded images, is installed in the information processing apparatus 11. Also installed in the information processing apparatus 11 is a web browser for interpreting data for a structure document described in HTML, XML, etc. and displaying the result.

When the program viewer AP is started in the information processing apparatus 11, the information processing apparatus 11 may, for example, acquire image information on the channel selected by the viewer from the tuner 13 and display the program image on the display 14. The information processing apparatus 11 may also acquire EPG information from the tuner 13 and display an electronic program guide on the display 14. The detailed configuration of the information processing apparatus 11 will be described later. The information processing apparatus 11 and the display 14 may be connected by a high-definition multimedia interface (HDMI: registered trademark) cable.

The information management server 16 manages the status of viewing programs acquired from the plurality of program viewing systems 10 and delivers the viewing status to each of the program viewing systems 10. The detailed configuration of the information management server 16 will be described later. The search server 17 provides a search service and supplies the source originating a search request with information indicating a web page with a high score of matching with the search key designated in the search request.

Figures 3, 4:
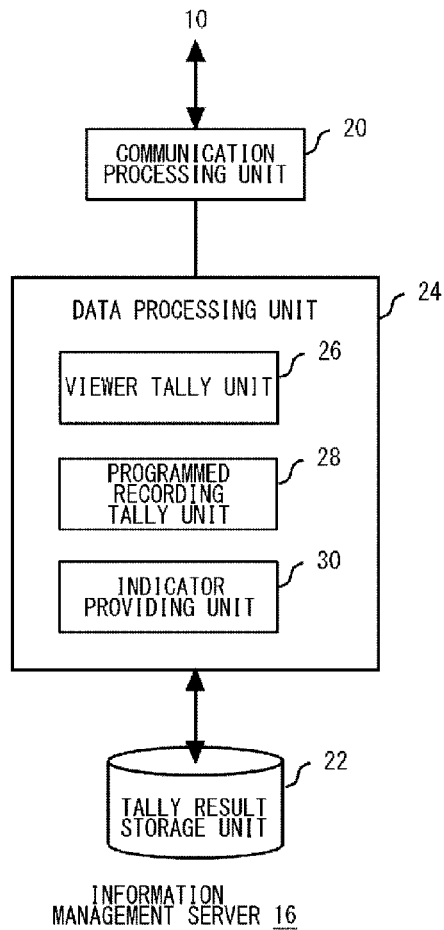
FIG. 3 is a block diagram showing the functional configuration of an information management server of FIG. 1.
FIG. 4 shows the structure of data stored in a tally result storage unit.

FIG. 3 is a block diagram showing the functional configuration of the information management server 16 of FIG. 1. It will be appreciated to a skilled person that the functional blocks of FIG. 3, like those of FIG. 2, may be implemented in a variety of manners by a combination of hardware and software. For example, the functional blocks of FIG. 3 may be stored in a predetermined recording medium as computer programs. The programs may be installed in a hard disk of the information management server 16, read into a main memory of the information management server 16, and run by a processor.

The information management server 16 includes a communication processing unit 20, a tally result storage unit 22, and a data processing unit 24 for performing various data processes. The data processing unit 24 may include a viewer tally unit 26, a programmed recording tally unit 28, and an indicator providing unit 30.

The communication processing unit 20 performs a process of communicating with an external device via the Internet 15. The data processing unit 24 exchanges data with the information processing apparatus 11 in the program viewing system 10 via the communication processing unit 20. The tally result storage unit 22 is a storage area for storing data indicating the tally score in the viewer tally unit 26 and the programmed recording tally unit 28 described later.

FIG. 4 shows the structure of data stored in the tally result storage unit 22. A program ID field is adapted to contain a program ID uniquely identifying a program broadcast on a specific date and time. Programs broadcast on a periodical basis with the same program title are assigned different ID's if broadcast on different time and date. It is assumed that the program ID is defined in advance in the EPG information. A viewer count field is adapted to contain the total number of viewers currently viewing the program identified by the program ID. In the first form of the base technology, the viewers are categorized according to the age group and sex. Each subfield is adapted to contain the total number in the respective category. A programmed recording count field is adapted to contain the total number of viewers having programmed the recording of the program identified by the program ID, categorizing the viewers according to the age group and sex.

Referring back to FIG. 3, the viewer tally unit 26 acquires the program ID of the program currently viewed by the viewer from each of the plurality of information processing apparatuses 11 on a periodical basis and adds up the number of viewers viewing each program. In the first form of the base technology, viewer attributes (i.e., age group and sex) are acquired along with the program ID. The number of viewers viewing the program identified by the program ID is added up for each viewer attribute so that the resultant score is stored in the tally result storage unit 22.

The programmed recording tally unit 28 acquires the program ID of the program that the viewer has programmed to record from each of the plurality of information processing apparatuses 11 on a periodical basis and adds up the number of recordings programmed. In the first form of the base technology, viewer attributes are acquired along with the program ID. The number of recordings programmed for the program identified by the program ID is added up for each viewer attribute so that the resultant score is stored in the tally result storage unit 22.

The indicator providing unit 30 supplies the information processing apparatus 11 with an indicator indicating the status of viewing programs in the information processing system 100. The indicator includes an indicator indicative of the number of viewers viewing a program (hereinafter, live indicator) and an indicator indicative of the number of viewers that have programmed recordings of the program (hereinafter, programmed recording indicator).

More specifically, the indicator providing unit 30 transmits, as a live indicator, the number of viewers, categorized according to the age group and sex, stored in the tally result storage unit 22 to the information processing apparatus 11. The indicator providing unit 30 also transmits the number of recordings programmed, categorized according to the age group and sex, stored in the tally result storage unit 22 to the information processing apparatus 11.

In one variation, the indicator providing unit 30 may supply, as a live indicator, the result of entering the number of viewers in a predetermined evaluation function instead of the number of viewers itself. For example, the number of viewers of a given program relative to the total number of viewers, i.e. the viewing rate, may be supplied. The same is true of the programmed recording indicator. For example, the number of programmed recordings of a given program relative to the total number of viewers, i.e., the programmed recording rate, may be supplied as a programmed recording indicator.

Figure 5:
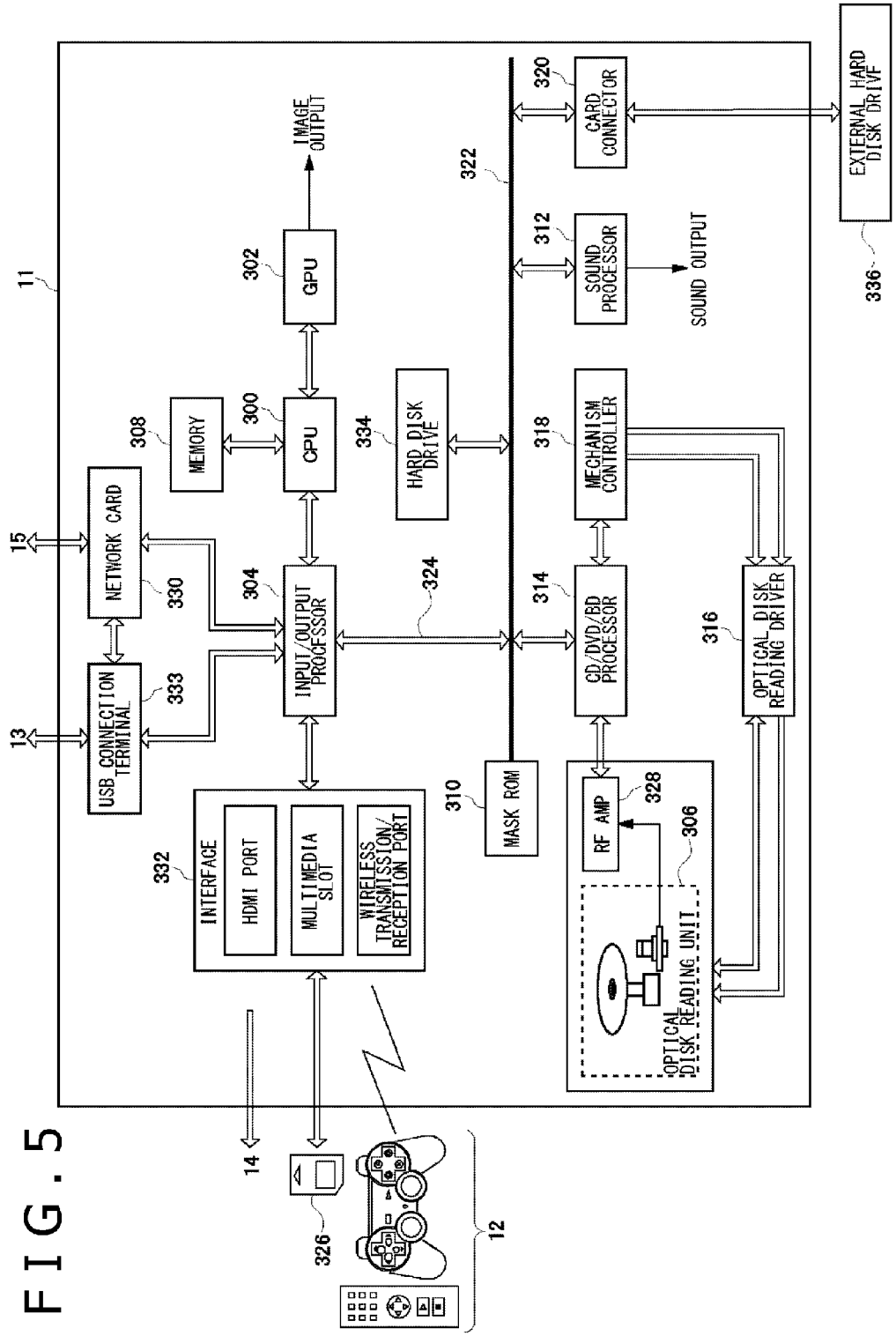
FIG. 5 shows the hardware configuration of an information processing apparatus of FIG. 1.

FIG. 5 shows the hardware configuration of the information processing apparatus 11 of FIG. 1. The information processing apparatus 11 includes, as basic components, a CPU 300, a graphic processor unit (GPU) 302, an input and output processor 304, an optical disk reading unit 306, a main memory 308, a mask ROM 310, and a sound processor 312.

The CPU 300 controls signal processing and internal components based on various programs such as a game, an e-mail program, and an application for a web browser. The CPU 300 may be a multicore CPU such as a CELL. Alternatively, the CPU 300 may be a heterogeneous multicore CPU in which a plurality of heterogeneous processor cores are combined.

The GPU 302 performs image processing. The input and output processor 304 performs a process for interfacing between an external device and internal components, or a process for maintaining downward compatibility. The optical disk reading unit 306 reads from an optical disk such as a BD, DVD, and CD in which an application program or multimedia data is recorded. The main memory 308 functions as a buffer that temporarily stores data read from a work area of the CPU 300 or the optical disk. The mask ROM 310 primarily stores an operating system program run by the CPU 300 or the input and output processor 304. The sound processor 312 processes a sound signal.

The information processing apparatus 11 also includes a CD/DVD/BD processor 314, an optical disk reading driver 316, a mechanism controller 318, a hard disk drive 334, and a card connector (e.g., a PC card slot) 320. The CD/DVD/BD processor 314 applies an error correction (e.g., cross interleave Reed-Solomon coding (CIRC)) process or an expanding and decoding process on a disk signal read by the optical disk reading unit 306 from a CD/DVD/BD and amplified by an RF amplifier 328. Thereby, the data recorded in the CD/DVD/BD is reproduced (restored). The optical disk reading driver 316 and the mechanism controller 318 control the rotation of a spindle motor of the optical disk reading unit 306, focusing/tracking of an optical pickup, and loading of a disk tray.

The hard disk drive 334 stores data saved from an application program or game read from the optical disk reading unit 306, or stores data such as photos, moving images, and music acquired via the input and output processor 304. The card connector 320 is a connection port for a communication card, an external hard disk drive 336, etc.

These components are primarily connected to each other via bus lines 322, 324, etc. The CPU 300 and the GPU 302 are connected via a dedicated bus. The CPU 300 and the input and output processor 304 are connected via SBUS. The input and output processor 304 is connected to the CD/DVD/BD processor 314, the mask ROM 310, the sound processor 312, the card connector 320, and the hard disk drive 334 via SSBUS.

The CPU 300 controls the overall operation of the information processing apparatus 11 by running the operating system program for the CPU stored in the mask ROM 310. The CPU 300 reads various data from an optical disk such as CD, DVD, BD, etc. and loads the data into the main memory 308. The CPU 300 may also run various application programs downloaded via a communication network and control games, creation/editing of e-mail messages, or an operation like web page browsing.

The input and output processor 304 runs an operating system program for the input and output processor stored in the mask ROM 310 and thereby controls input and output. For example, the input and output processor 304 controls the input and output of user-generated signals or game settings from the controller 12, contents or addresses of e-mail messages, or data from a memory card 326 adapted to store web site URLs, etc.

Further, the input and output processor 304 controls data input and output via a USB connection terminal 333, a network card 330, an IEEE1394 terminal or a PC card slot (not shown), etc. For example, the input and output processor 304 may be connected to the tuner 13 via the USB connection terminal 333 or connected to the Internet 15 via the network card 330. The input and output processor 304 may also perform data input and output through the memory card 326 via the PC card slot (not shown). Information from the controller 12 or the memory card is mediated by an interface 332 which includes a multimedia slot and a wireless transmission/reception port.

For example, the wireless transmission/reception port communicates with a game controller or a BD/DVD operation controller using wireless LAN or Bluetooth (registered trademark). The interface 332 is also provided with an interface with an HDMI (registered trademark) cable and outputs image data to the display 14 via the interface.

The GPU 302 is provided with the function of a geometry transfer engine for processes like coordinate conversion and the function of a rendering processor. The GPU 302 renders an image in accordance with a rendering instruction from the CPU 300 and stores the rendered image in a frame buffer (not shown). For example, given that an application program stored in an optical disk uses three-dimensional (3D) graphics (e.g., a game program), the GPU 302 computes the coordinates of polygons forming three-dimensional objects by performing geometric computation. In the rendering process, the GPU 302 performs computation to generate an image obtained by capturing the three-dimensional object with a virtual camera, i.e., computation for perspective transformation (computation of coordinate values occurring when the vertices of polygons forming the three dimensional object are projected onto a virtual camera screen). The image data ultimately obtained is written in the frame buffer. The GPU 302 outputs a video signal corresponding to the image thus generated.

The sound processor 312 is provided with functions for adaptive differential pulse code modulation (ADPCM) decoding, audio signal reproduction, signal modulation, etc. The ADPCM decoding function is a function of reconstructing and outputting an audio signal for sound effects, etc. by reading waveform data stored in a sound buffer (not shown) built in the sound processor 312 or externally coupled to the sound processor 312. The signal modulation function also functions as a sampling sound source capable of generating an audio signal for musical sound, sound effects, etc. from the waveform data stored in the sound buffer.

When the information processing apparatus 11 having the configuration as described above is turned on, the operating system programs for the CPU 300 and for the input and output processor 304 are read from the mask ROM 310. The CPU 300 and the input and output processor 304 run the corresponding operating system programs. This allows the CPU 300 to control the components of the information processing apparatus 11 in a coordinated manner. The input and output processor 304 controls the input and output of signals from and to the controller 12, the memory card 326, etc.

Upon starting the operating system program, the CPU 300 performs an initialization process such as verification of the operation. The CPU 300 then controls the optical disk reading unit 306 to read an application program such as a game stored in the optical disk and load the program in the main memory 308, and then runs, for example, the game application program. When the game application program is run, the CPU 300 controls the GPU 302 and the sound processor 312 in accordance with a user instruction acknowledged from the controller 12 via the input and output processor 304, so as to control the display of images, and generation of sound effects or musical sound, etc.

For example, when a movie stored in the optical disk is played back, the CPU 300 controls the GPU 302 and the sound processor 312 in accordance with a user instruction (command) acknowledged from the controller 12 via the input and output processor 304, so as to control the display of images, generation of sound effects or musical sound, etc in the movie played back from the optical disk.

Figure 6:
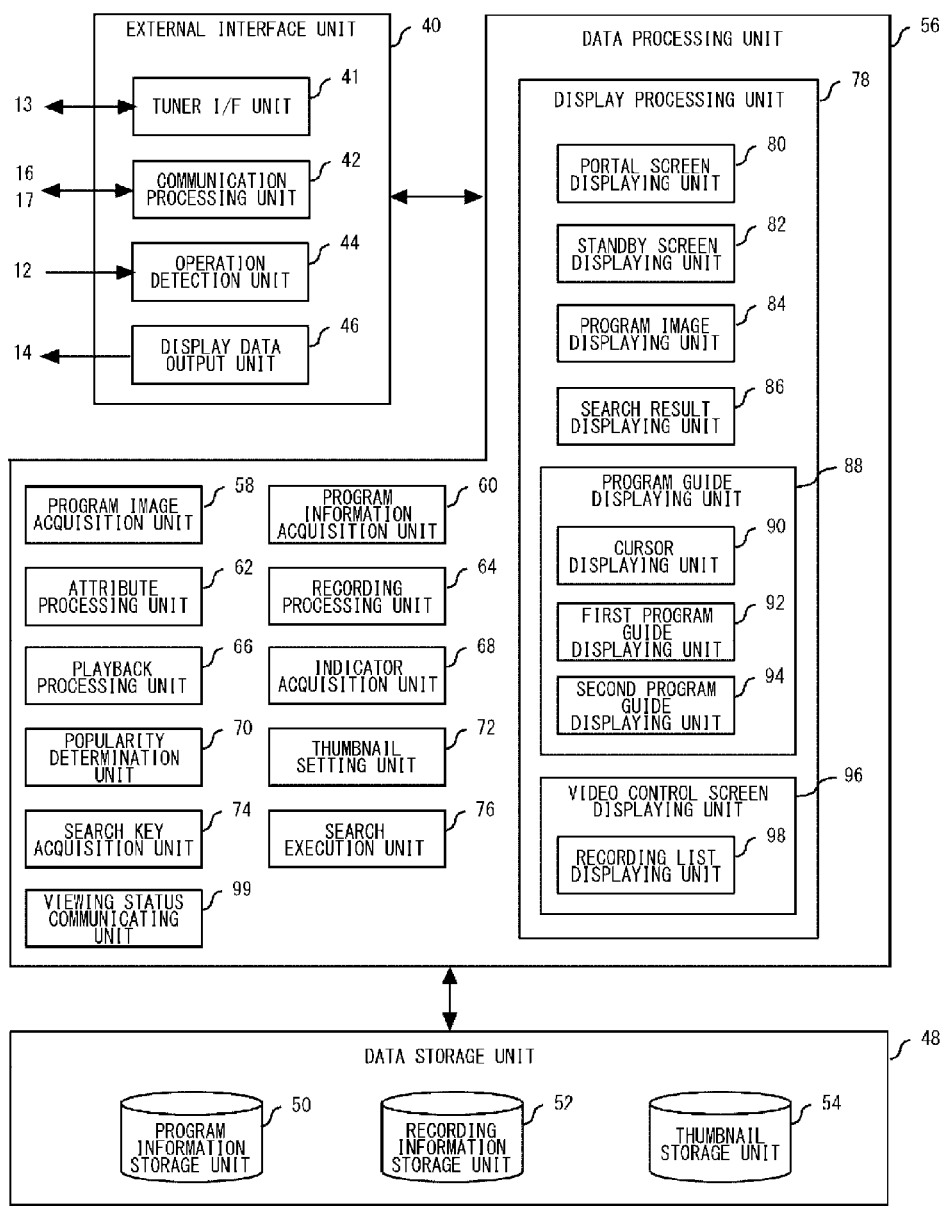
FIG. 6 is a block diagram showing the functional configuration of the information processing apparatus of FIG. 1.

FIG. 6 is a block diagram showing the functional configuration of the information processing apparatus 11 of FIG. 1. As in FIG. 2, it will be obvious to those skilled in the art that the functional blocks of FIG. 6 may be implemented in a variety of manners by a combination of hardware and software. For example, the functional blocks of FIG. 6 may be stored in a predetermined recording medium as computer programs. The programs may be installed in the hard disk drive 334 of FIG. 5, read into the main memory 308 of the information processing apparatus 11, and run by the CPU 300. In other words, it can be said that the functional blocks of FIG. 6 show various modules forming the program viewing AP.

The information processing apparatus 11 is provided with an external interface unit 40, a data storage unit 48, and a data processing unit 56. The external interface unit 40 provides an interface with various external devices. The data processing unit 56 exchanges data with an external device via the external interface unit 40. The external interface unit 40 includes a tuner IF unit 41, a communication processing unit 42, an operation detection unit 44, and a display data output unit 46.

The tuner IF unit 41 provides an interface with the tuner 13 and sends data acknowledged from the tuner 13 to the data processing unit 56. The communication processing unit 42 runs a process of communicating with the information management server 16 and the search server 17 via the Internet 15. The operation detection unit 44 detects a viewer operation of the controller 12 and sends the content of operation to the data processing unit 56. The display data output unit 46 sends the data for videos and images for display sent from a display processing unit 78 (described later) to the display 14 to display the videos and images accordingly.

The data storage unit 48 is a storage area for storing data and may be implemented as a hard disk drive and data stored therein. The data storage unit 48 includes a program information storage unit 50, a recording information storage unit 52, and a thumbnail storage unit 54.

The program information storage unit 50 stores program information on a plurality of programs that should be displayed in the electronic program guide. FIG. 7 shows the structure of data stored in the program information storage unit 50. A program summary field is adapted to contain summary information on the program. A popularity rank field is adapted to temporarily contain the relative popularity of each of a plurality of programs broadcast in the same time zone.

Referring back to FIG. 6, the recording information storage unit 52 stores recording information related to the recording of programs in the information processing apparatus 11. FIG. 8 shows the structure of data stored in the recording information storage unit 52. A recording ID field is adapted to contain a recording ID uniquely identifying the recorded content in the information processing apparatus 11.

A recording flag field of FIG. 6 is adapted to contain a flag indicating whether the recording process is completed or whether an error occurred during the recording process. For example, a record "done" in the recording flag field indicates that the recording is completed, and a record "not done" in the recording flag field indicates that the recording is programmed. A playback progress rate field is adapted to contain a value indicating the progress of playback of the recorded content, i.e., the percentage of the recorded content already played back. For example, the playback progress rate "0%" in a record indicates that the recorded content has not been played back at all. A content data field is adapted to contain data of the recorded content itself, i.e., data for the images of the program recorded.

Referring back to FIG. 6, the thumbnail storage unit 54 stores data for a thumbnail image showing a part of the image included in the recorded content on a reduced scale, associating the data with the recording ID of the recorded content. A thumbnail image may be a still image or a moving image.

A physical storage area for the data storage unit 48 to store the data may be the hard disk drive 334 built in the information processing apparatus 11, the external hard disk drive 336, or the memory card 326. The external hard disk drive 336 may store only the recorded information of a relatively large data size (particularly, the data in the content data field). The storage area for storing the respective data may be determined as needed according to the operation of the viewer.

The data processing unit 56 is a functional block for performing data processing and may be implemented as a module of a computer program. The data processing unit 56 includes a program image acquisition unit 58, a program information acquisition unit 60, an attribute acquisition unit 62, a recording processing unit 64, a playback processing unit 66, an indicator acquisition unit 68, a popularity determination unit 70, a thumbnail setting unit 72, a search key acquisition unit 74, a search execution unit 76, the display processing unit 78, and a viewing status communicating unit 99.

The program image acquisition unit 58 acquires image information of a program sent from the tuner 13. The program information acquisition unit 60 acquires EPG information sent from the tuner 13 and stores the program information of the programs in the program information storage unit 50.

The attribute acquisition unit 62 acquires attribute information of the viewer entered by the viewer, e.g., the age and sex of the viewer. For example, the attribute acquisition unit 62 may acquire the attribute information from a predetermined storage area adapted to store the attribute information entered by the viewer in a setting screen of the information processing apparatus 11.

The recording processing unit 64 programs the recording of a program designated by the viewer and records the program accordingly. Moreover, the recording processing unit 64 updates the recording information in the recording information storage unit 52 as appropriate. For example, the recording flag is set to "not done" in the programmed recording process. In the recording process, the image data for the program to be recorded is successively recorded in the content data field. When the recording process is completed normally, the recording flag is set to "done." When an error occurs in the recording process, the recording flag is set to "error."

When the target program being recorded is ranked at or higher than a certain rank in the ranking of popularity as determined by the popularity determination unit 70 described later, e.g., when the program is ranked as the third most popular program or higher, the recording processing unit 64 indicates as such in the recorded content. In the first form of the base technology, a chapter is inserted into the recorded content when the program is ranked at or higher than a certain rank in the ranking of popularity.

The playback processing unit 66 plays back the recorded content by sending the image data for the content designated by the viewer to the display processing unit 78. In association with this, the playback processing unit 66 updates the recording information in the recording information storage unit 52 as appropriate in accordance with the status of playback of the recorded content. For example, the processing unit 66 sets the rate of playback time relative to the recorded time in the playback progress rate field.

The playback processing unit 66 may play back only the popular scene in the program originating the recorded content, in accordance with an instruction from the viewer. For example, the playback processing unit 66 may play back only the portion preceding and succeeding the insertion of the chapter by the recording processing unit 64 for a predetermined period of time. Alternatively, changes in the ranking of popularity as determined by the popularity determination unit 70 described later may be stored in the data storage unit 48. The playback processing unit 66 may play back only the portion of the program originating the recorded content ranked at or higher than a certain rank in the ranking of popularity.

The indicator acquisition unit 68 acquires a live indicator and a programmed recording indicator from the information management server 16. Typically, the live indicator and the programmed recording indicator are acquired when the display processing unit 78 starts displaying an electronic program guide. The latest live indicator and the programmed recording indicator are acquired when an elapse of a predetermined interval period is detected.

The popularity determination unit 70 determines the ranking of relative popularity of a plurality of programs broadcast in the same time zone in accordance with the live indicator and/or the programmed recording indicator. In the first form of the base technology, the larger the sum of the live indicator and the programmed recording indicator, the higher the program is ranked. Since the live indicator is not available for a program not broadcast yet, the ranking of popularity is determined only on the basis of the programmed recording indicator. After determining the ranking of popularity of programs, the popularity determination unit 70 updates the data in the popularity rank field forming the program information in the program information storage unit 50.

When the population in which the ranking of popularity should be determined is designated by the user, the popularity determination unit 70 determines the ranking of popularity in accordance with the live indicator and the programmed recording indicator associated with the designated attribute (in this case, age group and sex). When the population is not designated, the ranking of popularity is determined in accordance with the sum of live indicators across the attributes and the sum of programmed recording indicators across the attributes.

The popularity determination unit 70 may output the indicator itself acquired by the indicator acquisition unit 68 as data indicating the degree of popularity without determining the ranking popularity. In this case, the indicator itself is dealt with as the ranking of popularity.

Upon detecting that the recording process is completed in the recording processing unit 64, the thumbnail setting unit 72 refers to the recording information in the recording information storage unit 52 and sets a thumbnail image showing a moving image or still image stored as content data on a reduced scale. The thumbnail setting unit 72 stores the data for the thumbnail image in the thumbnail storage unit 54, associating the data with the recording ID.

Of the plurality of images stored as content data, the thumbnail setting unit 72 according to the first form of the base technology sets a thumbnail image from the image of a popular scene in the program originating the recorded content. For example, a thumbnail image may be created from an image immediately preceding or succeeding the insertion of a chapter by the recording processing unit 64. Alternatively, changes in the ranking of popularity as determined by the popularity determination unit 70 may be stored in the data storage unit 48 so that the thumbnail setting unit 72 may create a thumbnail image from the image occurring when the program originating the recorded content is ranked the highest.

The search key acquisition unit 74 acquires the ID of the program being displayed on the display 14 from a program image displaying unit 84 and acquires, as a search key, program information associated with the program ID from the program information storage unit 50. The program being displayed may be a program broadcast live or a recorded program. The program information used as a search key may be the program title or the name of a performer. Alternatively, the information may be a noun phrase extracted appropriately from a character string of the summary information by, for example, morphological analysis.

The search key may not be limited to a key word. The search key acquisition unit 74 may acquire data of another format (e.g., image data etc. included in the program information) as a search key. In other words, data of an arbitrary format permitted by the search server 17 may be acquired. Alternatively, the search key acquisition unit 74 may set a search key using a plurality of elements in the program information as AND conditions. Still alternatively, the search key acquisition unit 74 may send the respective elements as search keys to the search execution unit 76 or causes the search execution unit 76 to perform a plurality of search processes successively. Still alternatively, when the program information of the program being displayed is updated, the search key acquisition unit 74 may acquire a new search key from the program information as updated and causes the search execution unit 76 to perform a new search using the new search key.

The search execution unit 76 transmits a search request designating the search key acquired by the search key acquisition unit 74 to the search server 17. The search execution unit 76 acquires, as a search result, a combination of the matching score with the search key and an URL of a web page from the search server 17. The search execution unit 76 acquires the data for the web page determined by the search server 17 to have the highest matching score with the search key, based on the URL. The search execution unit 76 then sends the data for the web page to the display processing unit 78.

The display processing unit 78 causes the display 14 to display an image desired by the viewer by sending the data for a moving image or still image that should be displayed on the display 14 to the display data output unit 46. The display processing unit 78 includes a portal screen displaying unit 80, a standby screen displaying unit 82, the program image displaying unit 84, a search result displaying unit 86, a program guide displaying unit 88, and a video control screen displaying unit 96.

The portal screen displaying unit 80 displays a portal screen that serves as a primary source of transition to a plurality of types of viewing screens or control screens. The portal screen is a top, frontend screen displayed without exception when any of a plurality of types of viewing screens or control screens is displayed. The portal screen serves as a common entrance to these screens. The plurality of types of viewing screens and control screens include a television screen for viewing the image from a program (hereinafter, also simply referred to as "live image") currently broadcast on terrestrial digital television, a video screen for playing back a recorded program, and a setting screen for entering various settings for the program viewing AP.

Figure 9:
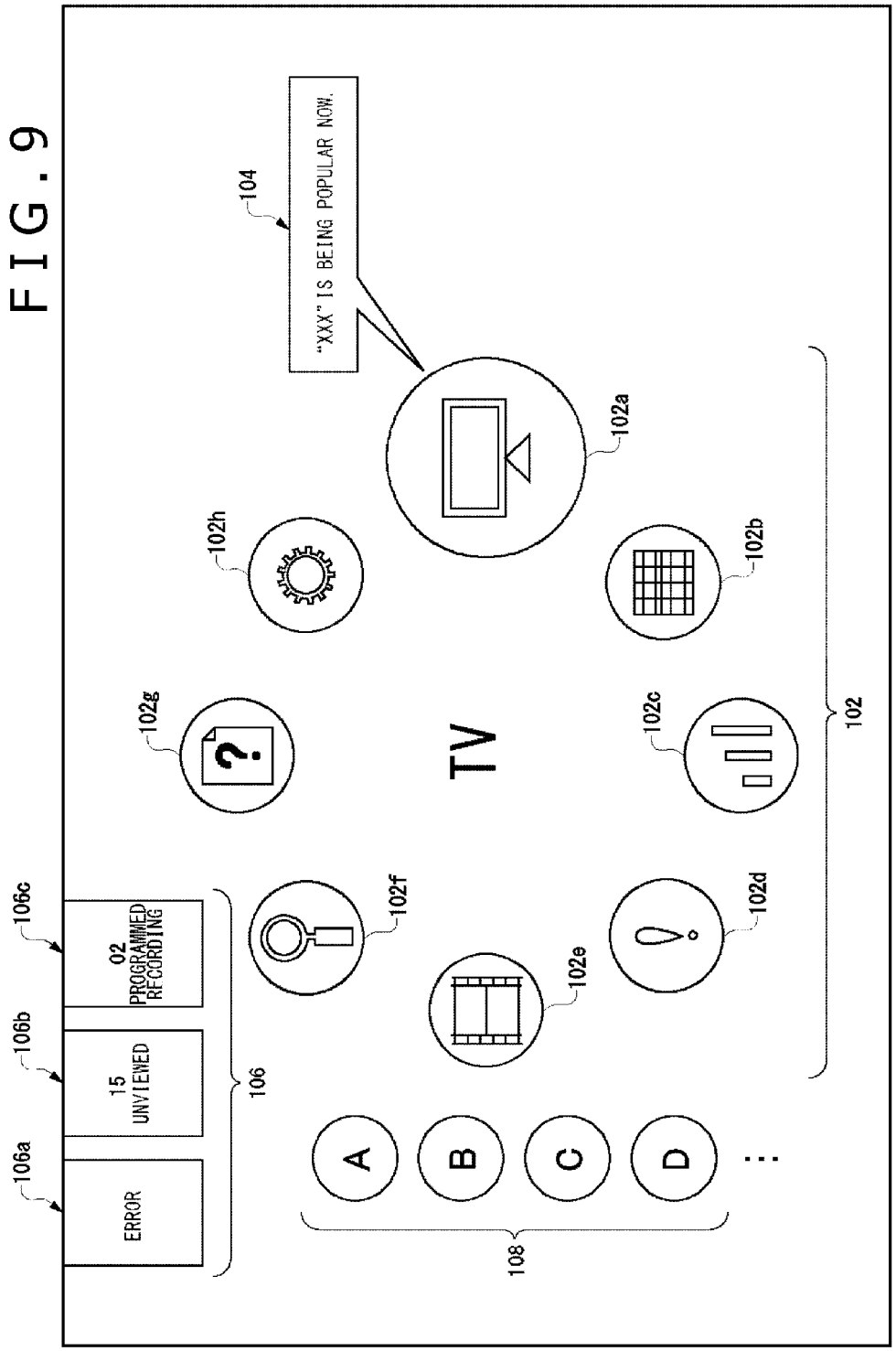
FIG. 9 shows an exemplary portal screen as displayed.

FIG. 9 shows an exemplary portal screen as displayed. On-screen selection icons 102 are for selecting from a plurality of types of viewing screens or control screens provided by the program viewing AP. The on-screen selection icons 102 include a TV icon 102a, . . . , and a setting icon 102h. When the TV icon 102a is selected, transition is made to a TV screen. When a program guide icon 102b is selected, transition is made to an EPG screen displaying an electronic program guide. When a ranking icon 102c is selected, transition is made to a ranking screen displaying a ranking of programs in popularity.

When a schedule icon 102d is selected, transition is made to a schedule screen for viewing a schedule (e.g., programmed recording). When a video icon 102e is selected, transition is made to a video screen. When a program search icon 102f is selected, transition is made to a program search screen for searching for a program being broadcast or scheduled to be broadcast. When a manual icon 102g is selected, transition is made to a manual screen displaying a manual related to the operation of the program viewing AP. When the setting icon 102h is selected, transition is made to a setting screen.

A latest information pop 104 represents a pop-up display of the latest information corresponding to the type of on-screen selection icon 102 that is selectable. Referring to FIG. 9, the TV icon 102a is being made selectable. The latest information pop 104, indicating the status of viewing by other viewers of the program currently broadcast, is displayed in association with the TV icon 102a. For example, the portal screen displaying unit 80 may display in the latest information pop 104 the title of the program ranked No. 1 by the popularity determination unit 70 among the programs current broadcast.

By way of another example, the portal screen displaying unit 80 may display in the latest information pop 104, which is displayed in association with the schedule icon 102d, the number of currently programmed recordings or the title of the program programmed to be recorded. The portal screen displaying unit 80 may display a currently available hard disk space or time available for recording in the latest information pop 104 displayed in association with the video icon 102e.

A status tag 106 indicates the viewing status of the recorded content (in other words, the viewing status based on the video-related operation). The status tag 106 includes an error situation tag 106a, an unviewed tag 106b, and a programmed recording tag 106c. In the event of an error during a recording process in the recording processing unit 64, the portal screen displaying unit 80 displays the situation in the error situation tag 106a. The portal screen displaying unit 80 also refers to the recording information stored in the recording information storage unit 52 and displays the number of recorded contents that are recorded and not played back yet (0% playback progress rate) in the unviewed tag 106b. The portal screen displaying unit 80 also refers to the recording information and displays the number of programmed recordings not yet processed in the programmed recording tag 106c.

A recorded content thumbnail 108 is a thumbnail image of each recorded content. One thumbnail image is displayed per one recorded content. The portal screen displaying unit 80 acquires a thumbnail image of the recorded content that should be displayed from the thumbnail storage unit 54 and sets the image in the portal screen. Recorded content thumbnails 108 for the entirety of the recorded contents may be displayed. Alternatively, thumbnail images of only those recorded contents with less than 100% playback progress rate may be displayed, or thumbnail images of only those recorded contents with 0% playback progress rate may be displayed.

Referring back to FIG. 6, the standby screen displaying unit 82 displays a standby screen. The standby screen is a screen displayed when a viewer operation is not detected for a predetermined period of time (e.g., 30 seconds) or more in the portal screen. The standby screen could be equated with a screen saver. When a user operation using the controller 12 is detected while the standby screen is being displayed, the standby screen displaying unit 82 terminates the display of the standby screen so that the portal screen displaying unit 80 displays the portal screen again.

Figure 10:
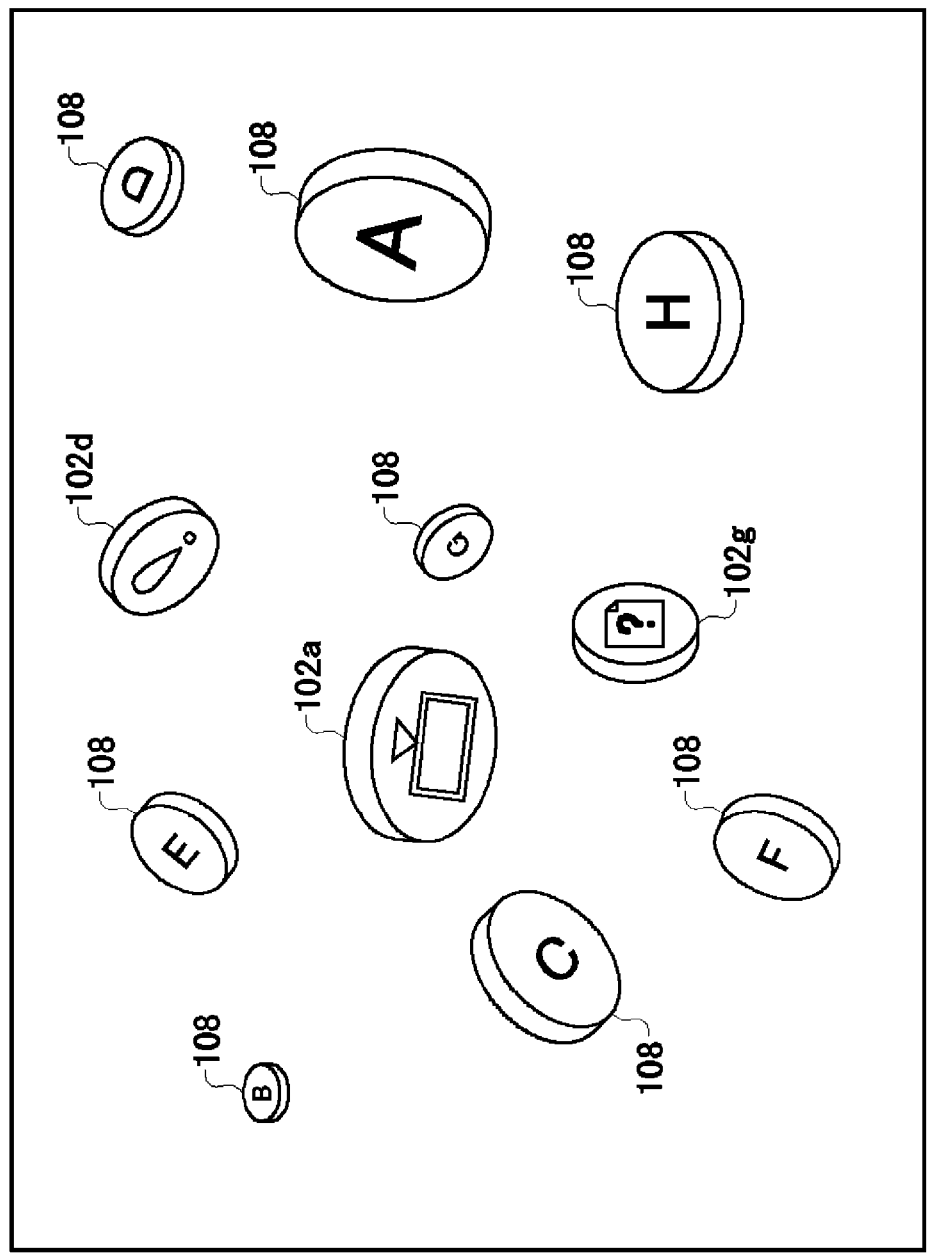
FIG. 10 shows an exemplary standby screen as displayed.

FIG. 10 shows an exemplary standby screen as displayed. In the standby screen, the standby screen displaying unit 82 displays an image of a three-dimensional space in which each of the on-screen selection icons 102 and the recorded content thumbnails 108 is displayed in varying manner, changing its position, angle, and size.

The standby screen displaying unit 82 refers to the recording information in the recording information storage unit 52 so as to change the mode of display of the recorded content thumbnail 108 corresponding to the recorded content in accordance with the attribute of the recorded content. For example, the recorded content with the recording date and time closer to the current date and time may be indicated by a recorded content thumbnail 108 displayed in a varying mode assumed to attract more attention of the viewer. More specifically, the target recorded content thumbnail 108 may be displayed on a scale larger than the other recorded content thumbnails 108. Alternatively, the target recorded content thumbnail 108 may be allowed to change its mode of display more rapidly than the other recorded content thumbnails 108.

Referring back to FIG. 6, the program image displaying unit 84 displays the image of the program on the display 14. For example, when the TV icon 102a is selected in the portal screen, the program image displaying unit 84 displays the live image of the program acquired by the program image acquisition unit 58. When the video icon 102e is selected in the portal screen and playback of the recorded content is requested in the video screen at the destination of transition, the program image displaying unit 84 displays the image of the recorded content acknowledged from the playback processing unit 66.

Figure 11:
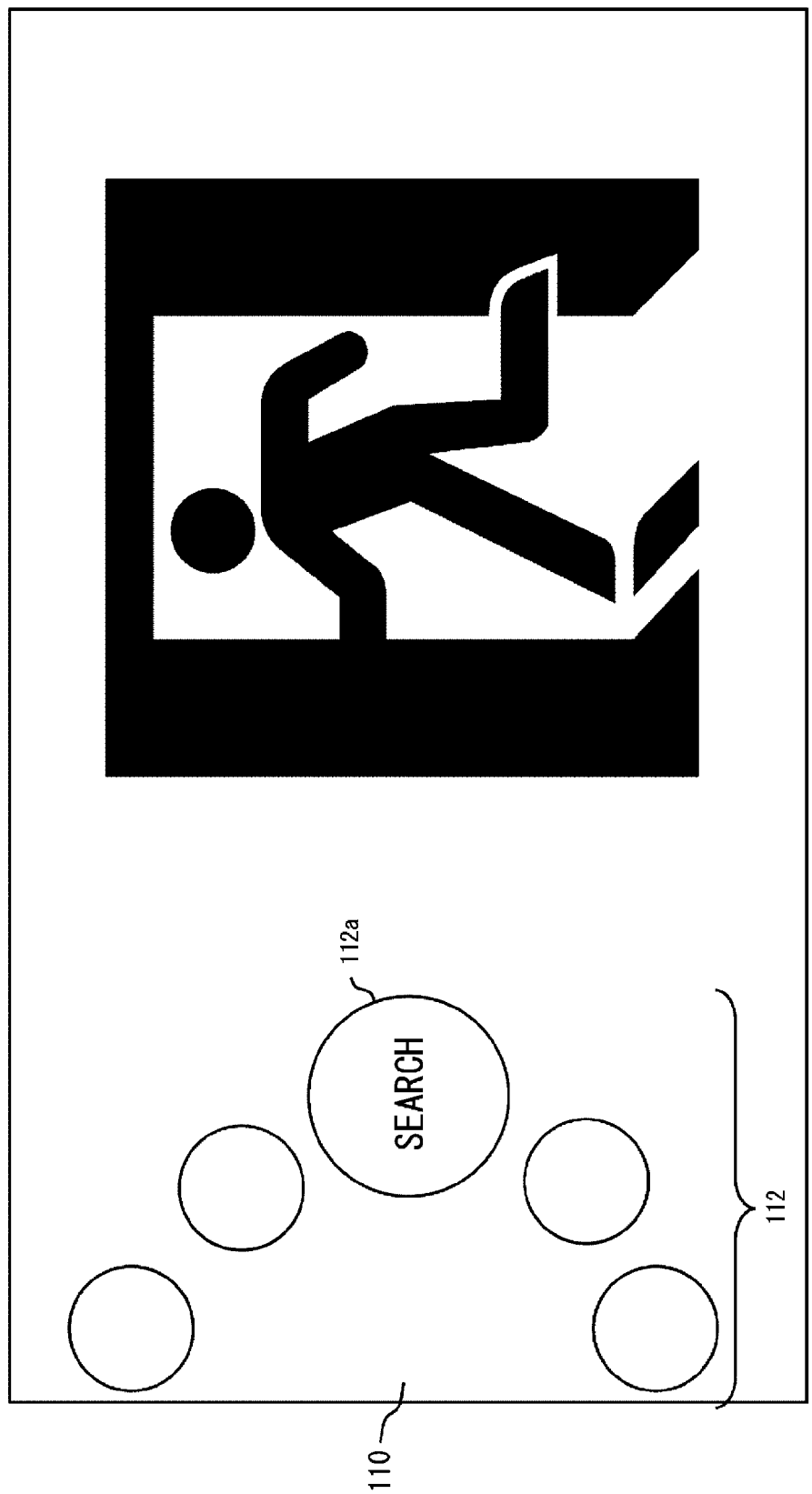
FIG. 11 shows an exemplary image display screen.

The program image displaying unit 84 displays a control icon for acknowledging a viewer operation in the television screen or the video screen (hereinafter, generically referred to as "image display screen") displaying the image of a program. FIG. 11 shows an exemplary image display screen 110. Control icons 112 in the figure include a search icon 112a for initiating an Internet search using information related to the program as a key. Selection of the search icon 112a represents a trigger for starting a process in the search key acquisition unit 74 and the search execution unit 76.

Referring back to FIG. 6, the search result displaying unit 86 displays on a browser screen data for the web page acknowledged from the search execution unit 76 as a search result. The browser screen is a screen in which the web browser is running.

Figure 12:
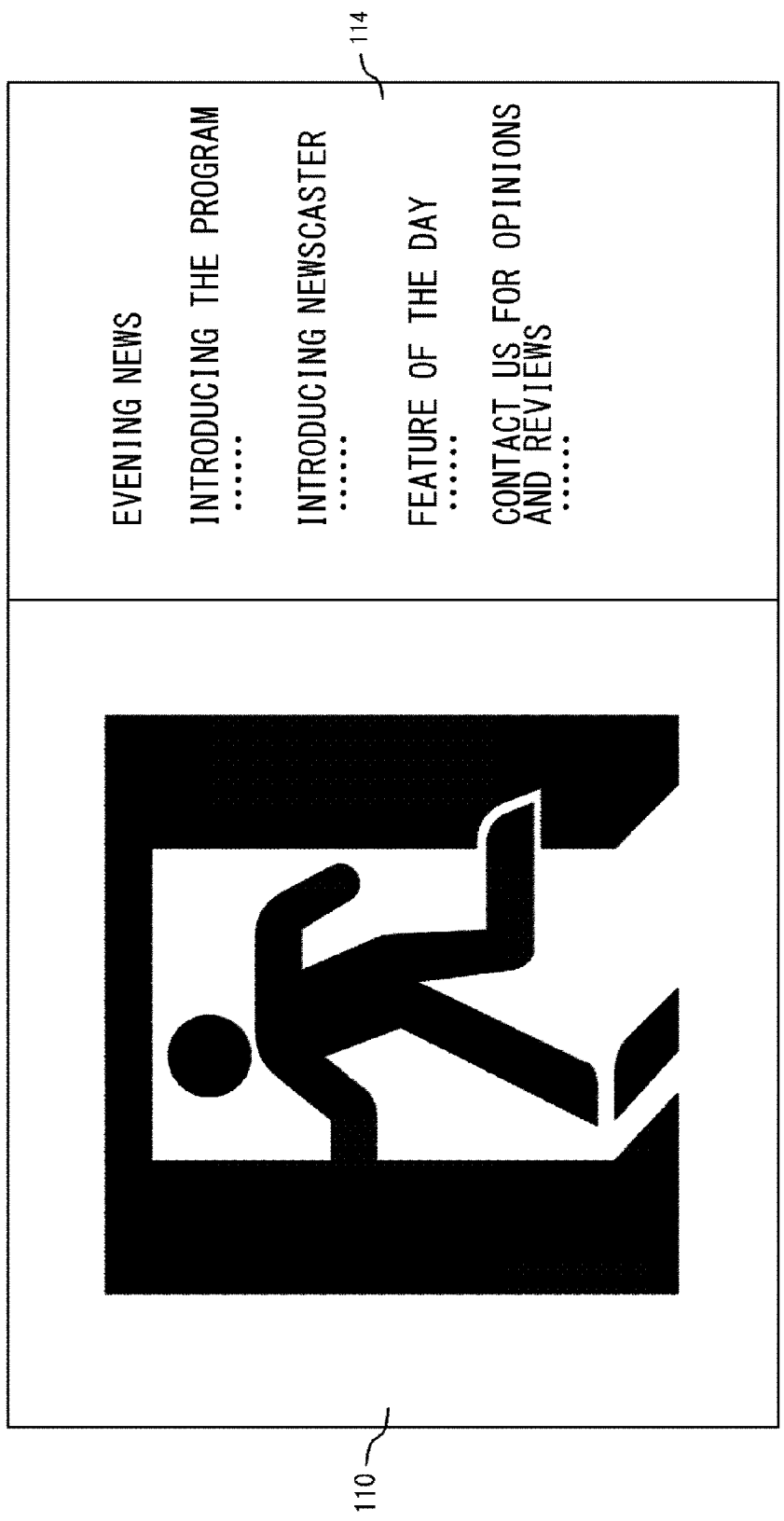
FIG. 12 shows an exemplary image display screen.

FIG. 12 shows an exemplary image display screen 110. As shown in the figure, the image display screen 110, and a browser screen 114 displaying the search result using the information on the program being displayed in the image display screen 110 as a key are displayed on the display 14 at the same time. Referring to the figure, the program home page is displayed in the browser screen 114. When the search execution unit 76 performs a new search, the search result displaying unit 86 updates the displayed content in the browser screen 114, displaying the result of the new search in the browser screen 114.

Referring back to FIG. 6, the program guide displaying unit 88 performs a process of displaying an electronic program guide. The program guide displaying unit 88 includes a cursor displaying unit 90, a first program guide displaying unit 92, and a second program guide displaying unit 94. The cursor displaying unit 90 displays a cursor that allows the viewer to select a specific program in the electronic program guide and moves the cursor in accordance with the viewer operation. The viewer selects an area in which information on a program is displayed (hereinafter, also referred to as "program frame") in the electronic program guide, by using the controller 12 to move the cursor. The program frame can be said to be a cell area formed by a time axis and a channel axis.

When a predetermined viewer operation is acknowledged while a program is being displayed by the program image displaying unit 84, the first program guide displaying unit 92 refers to the program information in the program information storage unit 50 and displays a first program guide, superimposing the guide on the program image. The first program guide includes an arrangement of program information on a plurality of programs currently broadcast in respective channels. The first program guide displaying unit 92 displays the first program guide, setting a predetermined transparency rate so that the program image in the background is viewable to the viewer.

In the first form of the base technology, the first program guide displaying unit 92 displays the first program guide in which only the information on the currently broadcast programs is arranged. When a program displayed in a program frame ends, the first program guide displaying unit 92 displays information on a subsequently broadcast program in the program frame.

Figure 13:
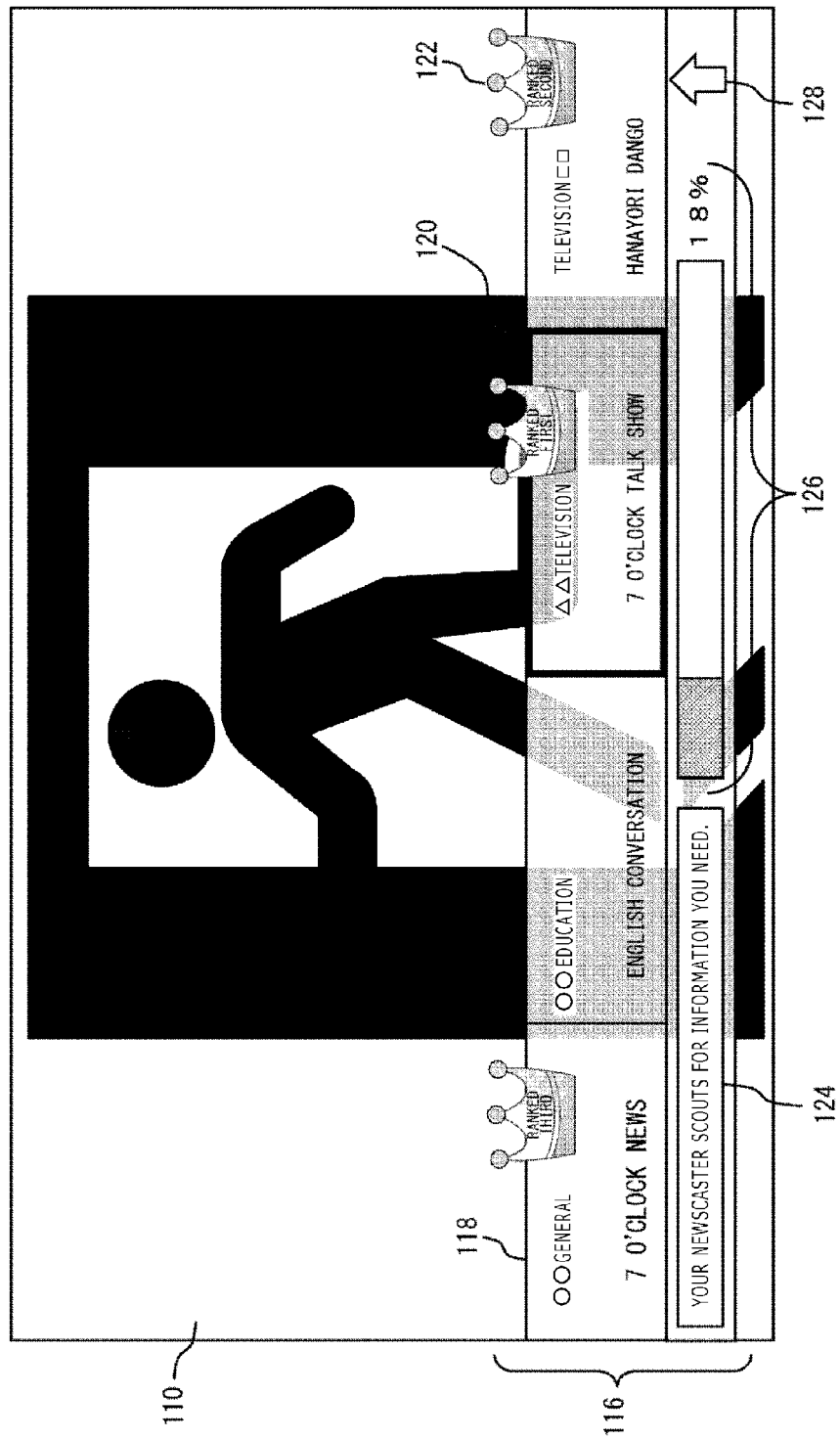
FIG. 13 shows an exemplary first program guide as displayed.

FIG. 13 shows an exemplary first program guide 116 as displayed. The first program guide 116 shows program frames 118 corresponding to a plurality of channels. The channel name and the program title are displayed in each program frame 118. The first program guide displaying unit 92 refers to the program information on the programs and displays objects indicating the rank of popularity (hereinafter, also referred to as "popularity rank indicator") in the program frames 118 for the top-ranking three programs, associating the objects with the programs. In one variation, the rank of popularity of each program may be suggested to the viewer by varying the color in the program frame 118, the character font of the program information, or the like. The first program guide displaying unit 92 refers to the program information of the respective programs periodically (e.g., once in one minute) and updates the popularity rank indicators accordingly.

The cursor displaying unit 90 displays a cursor 120 for selecting the program frame 118. The viewer uses the cursor 112 to select the program frame 118 for the program for which the viewer wishes to view the program content or the progress status. The first program guide displaying unit 92 acquires a program summary of the program corresponding to the program frame 118 selected by the cursor 120 (hereinafter, also referred to as "temporarily selected program") from the program information storage unit 50 and displays the summary in a program summary field 124, allowing the scrolling of the display. When the cursor 120 is moved downward in a given program frame 118, the first program guide displaying unit 92 may display information on the program broadcast after the currently broadcast program in the program frame 118.

The first program guide displaying unit 92 computes the degree of progress of the program, based on the broadcast start time, the broadcast end time, and the current time of the temporarily selected program and displays the degree in a progress indicator 126. In one variation, the first program guide displaying unit 92 may indicate the degree of progress of each program to the viewer by varying the mode of display in the plurality of program frames 118 displayed in the first program guide 116 in accordance with the degree of progress of the programs.

Further, the first program guide displaying unit 92 displays a popularity transition indicator 128 of the temporarily selected program. When the latest popularity rank of the temporarily selected program is acquired, the first program guide displaying unit 92 sets the popularity transition indicator 128 to show the status of transition as compared with the past popularity rank (e.g., rise, decline or no change).

When a predetermined viewer operation (e.g., depression of a designated button in the controller 12) is initiated by the viewer for the temporarily selected program in the first program guide 116, the data processing unit 56 acknowledges that the temporarily selected program is designated as a formally selected program. This causes the program image displaying unit 84 to switch the program image displayed in the image display screen 110 to the image of the formally selected program. For example, the program image acquisition unit 58 acquires the image information on the formally selected program from the tuner 13, and the program image displaying unit 84 displays the program image of the formally selected program on the display 14.

The first program guide displaying unit 92 may further display the live indicator and/or the programmed recording indicator providing the ground for the current popularity rank, associating the indicator with the program for which the popularity rank indicator is displayed or the temporarily selected program (not shown in FIG. 13). According to this form, the viewer can view the data itself that indicates the actual status of viewing, in addition to the popularity rank, which is an abstraction of the viewing status of the program.

Referring back to FIG. 6, a second program guide displaying unit 94 displays the second program guide in the entirety of the screen of the display 14, when the program guide icon 102b is selected in the portal screen. The second program guide shows an arrangement of program information on a plurality of programs, using the time axis covering a plurality of time zones as a vertical axis and using the channel axis covering a plurality of channels as a horizontal axis.

Figure 14:
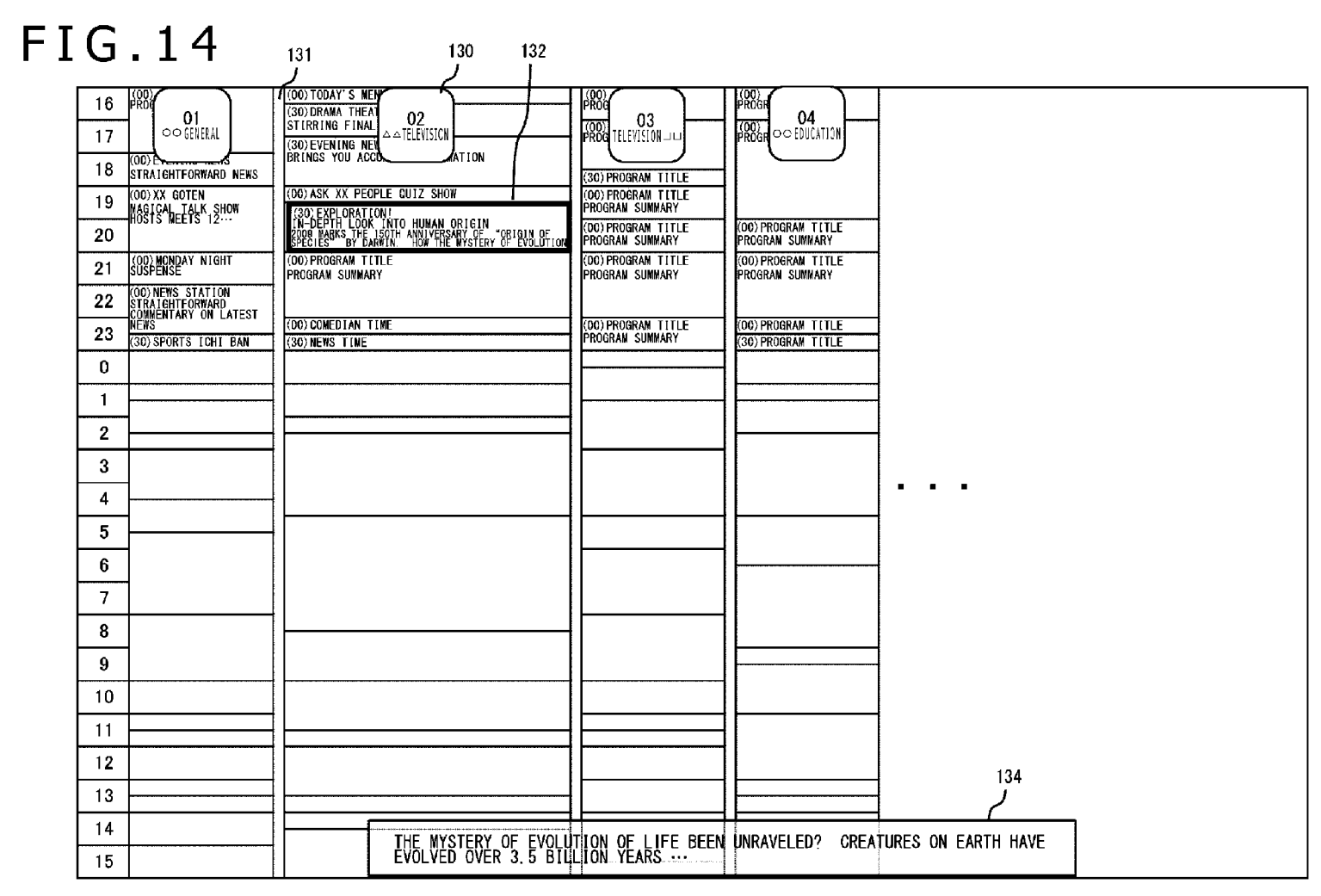

FIG. 14 shows an exemplary second program guide as displayed. The figure shows the second program guide showing program information covering 24 hours. A channel indicator 130 is an identifier object for identifying a channel on terrestrial digital television broadcast. A channel interval 131 is arranged between adjacent channels. The mode of displaying a program frame may be changed for each predetermined time zone (e.g., each three hours) so that the viewer can have knowledge of programs broadcast in the same time zone. For example, the color or character font of the program frame may be changed.

The second program guide displaying unit 94 enlarges or reduces the area for the program frames in the second program guide in accordance with a viewer operation. More specifically, the second program guide displaying unit 94 enlarges or reduces the size of the program frames per unit time or enlarges or reduces the size of the program frames per channel. Associated with this, the volume of program information that can be displayed in each program frame is increased or decreased. For example, the mode of displaying the second program guide may be switched such that "vertical axis=24 hrs, horizontal axis=9 channels," "vertical axis=5 hrs, horizontal axis=7 channels," "vertical axis=3 hrs, horizontal axis=5 channels," or "vertical axis=2 hrs, horizontal axis=3 channels."

The second program guide displaying unit 94 displays "the program title of the program started to be broadcast" on the first line of the program frame in the second program guide, and displays the program summary in the second and subsequent lines. In the second program guide where "vertical axis=24 hrs, horizontal axis=9 channels," the program frame for a 30-minute program is displayed so as to consume a minimum unit of display, i.e., a single line. Thus, program information for a program that lasts less than 30 minutes is displayed in a balloon in accordance with the movement of a cursor 132 described later.

The cursor displaying unit 90 displays the cursor 132 for selecting a program frame. The viewer uses the cursor 132 to select the program frame of a program for which the viewer wishes to know more detailed information or a program that the viewer desires to control for viewing. The program highlighted by the cursor 132 is designated as a temporarily selected program. The second program guide displaying unit 94 enlarges the program frame of the temporarily selected program in the direction of channel axis, i.e., displays the program frame in a larger size than the other program frames. Further, the second program guide displaying unit 94 displays the program summary of the temporarily selected program in a program summary field 134, allowing the scrolling of the display.

Figure 15:
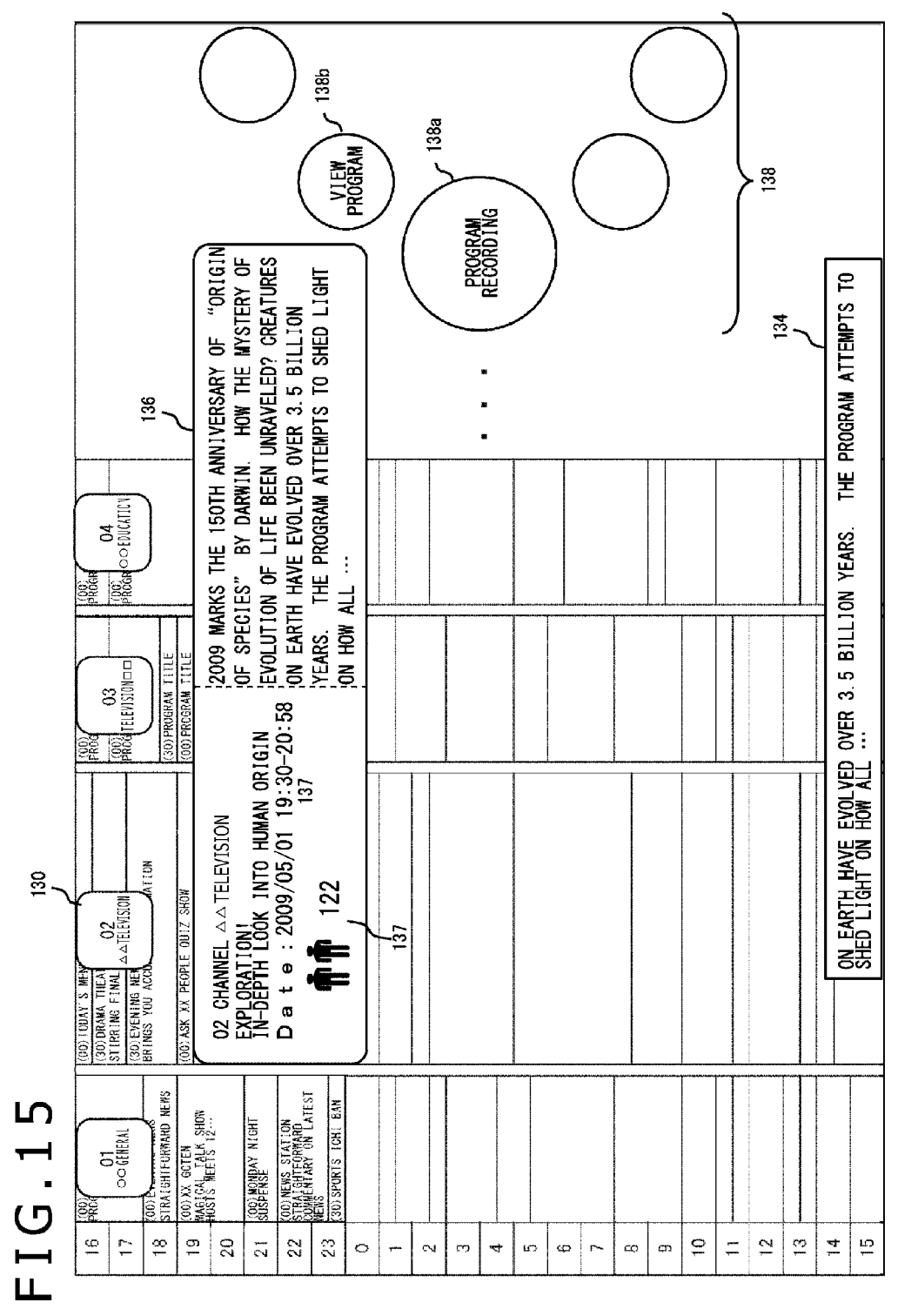

FIG. 15 also shows an exemplary second program guide as displayed. The figure shows that the temporarily selected program of FIG. 14 is designated as the formally selected program by a predetermined user operation. The viewer performs a desired operation for viewing the formally selected program by selecting control icons 138 such as a programmed recording icon 138a or a program viewing icon 138b.

The second program guide displaying unit 94 displays program information on the formally selected program (e.g., channel name, broadcasting station name, program title, broadcast date and time, viewing status, program summary) in a program detail window 136. A viewing status indicator 137 shows the number of viewers of the formally selected program. More specifically, the live indicator, the programmed recording indicator, or a total thereof may be displayed. When the formally selected program is designated, the second program guide displaying unit 94 displays the program detail window 136, superimposing the program detail window 136 on the second program guide in a pop-up mode of display and displaying the second program guide in the background in a reduced image quality. For example, the second program guide may be displayed in a blurred manner by removing high-frequency components from the image data for the second program guide. Alternatively, a semitransparent object may be displayed on the image of the second program guide.

A description will now be given of a variation adapted for a case where the display 14 is a 3D display capable of stereographic display. The image of the program frame of the program selected by the cursor 132, i.e., the temporarily selected program, and/or the image of the program detail window 136, as displayed by the second program guide displaying unit 94 may be a parallax view split temporarily or spatially.

For example, when the viewer wears eyeglasses with a shutter, a temporally split parallax view may be displayed, and, when the viewer wears eyeglasses with a polarization plate, a spatially split parallax view may be displayed. Typically, the program frame of the temporarily selected program and/or the program detail window 136 is displayed in front of the second program guide.

According to this variation, viewability of the program frame of the temporarily selected program and/or the program detail window 136 is increased. Whether a parallax view is displayed or the mode of parallax view may be preset by the viewer. Alternatively, the information processing apparatus 11 may detect the type of the display 14 and determine dynamically in accordance with the type.

Figure 16:
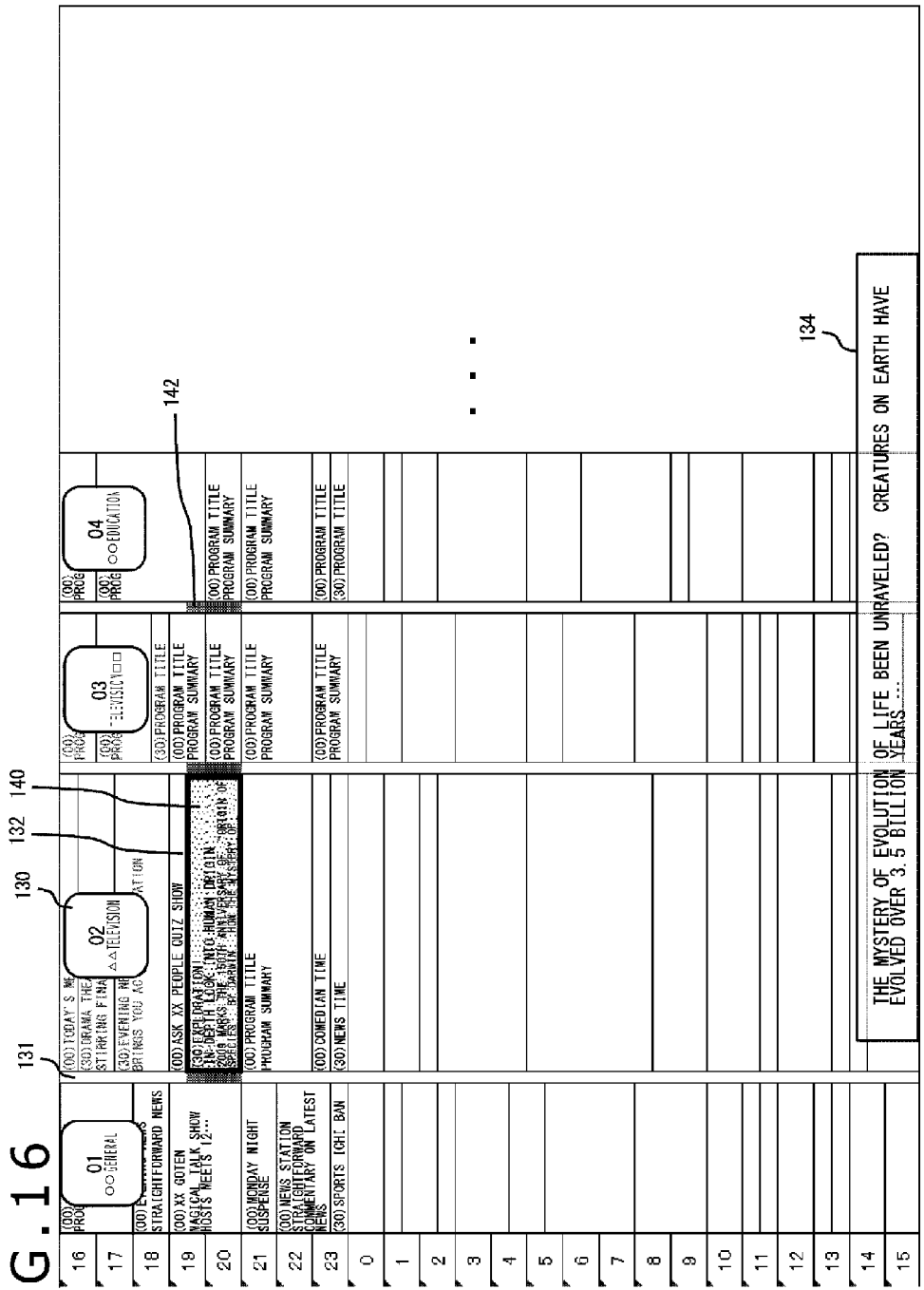
FIG. 16 shows an exemplary second program guide as displayed.

FIG. 16 also shows an exemplary second program guide as displayed. The figure shows the second program guide displayed after the recording of the formally selected program is programmed in FIG. 15. The second program guide displaying unit 94 displays a program frame 140 of the program programmed to be recorded in a predetermined mode indicating that the recording of the program has been programmed. Associated with this, a programmed recording line 142 is displayed in the channel interval 131 of the time zone in which the recording of the program is programmed so as to indicate that the program is programmed to be recorded in the time zone. The second program guide displaying unit 94 may display a line object indicating a current time in the second program guide in a similar mode as the programmed recording line 142. The provision is particularly useful when the information on the program broadcast already continues to be displayed in the second program guide.

Figure 17:
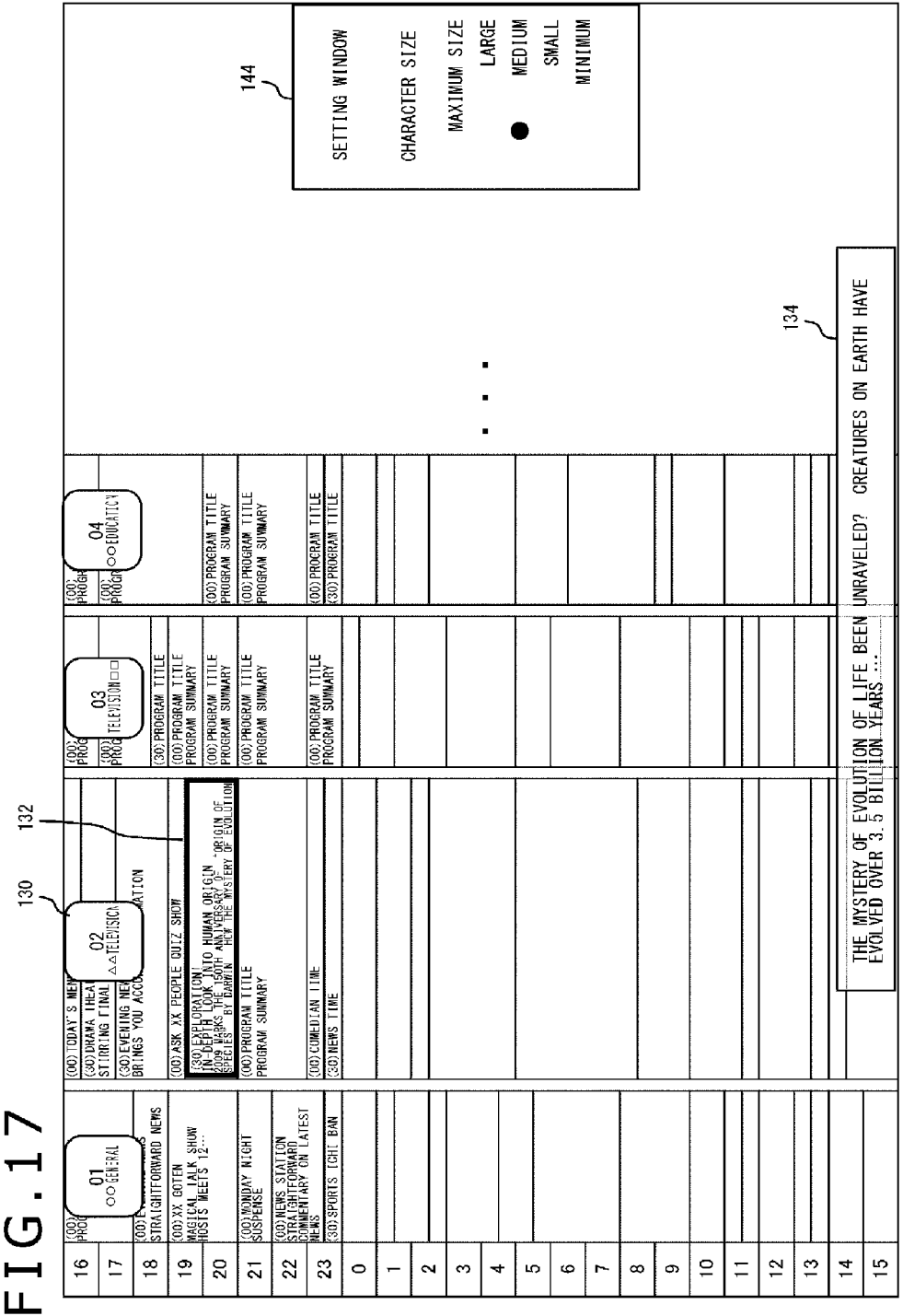
FIG. 17 shows an exemplary second program guide as displayed.

Further, the second program guide displaying unit 94 temporarily displays a setting window for setting the character font of the second program guide on the display 14 along with the second program guide. FIG. 17 shows an exemplary second program guide as displayed. When a particular character font is designated by the viewer in a setting window 144, the second program guide displaying unit 94 immediately reflects the designated character font in the second program guide currently displayed. In other words, the second program guide as displayed is switched to the guide in which program information is shown using the designated character font. FIG. 17 shows an example in which the character size is changed. Alternatively, the character style, i.e., the type face, may be similarly changed.

The second program guide displaying unit 94 scrolls the second program guide in the time axis direction or the channel axis direction in accordance with the movement of the cursor 132 in the second program guide, thereby switching the displayed content in the second program guide. As regards the program frame a part of which is no longer displayed as a result of the scrolling in the time axis direction and which shows a program that has not been completely broadcast yet, the second program guide displaying unit 94 displays the program information that should be displayed in that program frame in an area that remains displayed after the scrolling, starting at the head of the program information. In other words, the second program guide displaying unit 94 displays "broadcast start time indicated by minutes+program title" in preference to the program summary.

Figure 18A:
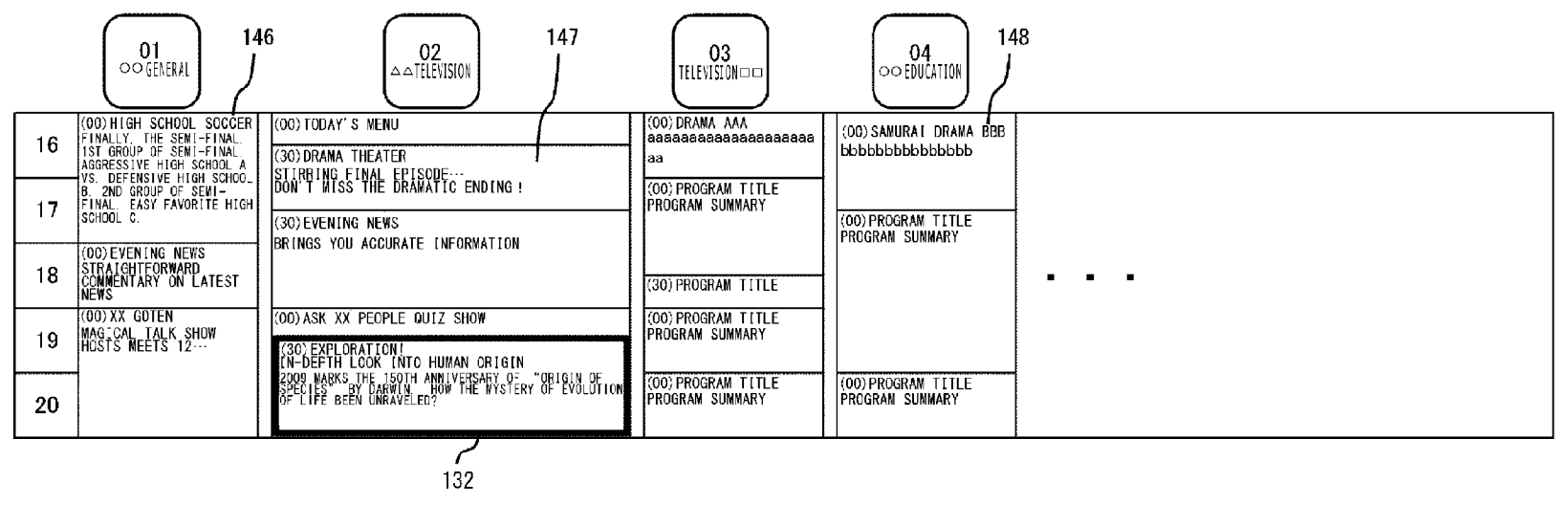

FIGS. 18(a) and 18(b) show exemplary second program guide as displayed. In this case, it is assumed that the current time is 17:45. FIG. 18(a) shows the second program guide displayed before scrolling. The figure shows a program guide for a time zone from 16:00 to 20:00. Meanwhile, FIG. 18(b) shows the second program guide displayed after scrolling. The figure shows a program guide for a time zone from 17:00 to 21:00. When the cursor 132 is moved downward in FIG. 18(a), the display is switched to FIG. 18(b).

The display area of program frames 146, 147, and 148 of FIG. 18(b) is reduced as compared to the status in FIG. 18(a).

Since the program of the program frame 146 is currently broadcast, the second program guide displaying unit 94 displays as much of the program information as can be fitted in the area of the program frame 146 that remains displayed, starting at the head of the information. In other words, the position where the program information as displayed starts is shifted to the head of the remaining area.

Meanwhile, since the programs for the program frames 147 and 148 have already been broadcast, the second program guide displaying unit 94 does not change the position where the program information as displayed starts. The second program guide displaying unit 94 may display the program information of the program that has already been broadcast in a mode not so noticeable as that of the program information of the program not completely broadcast yet (e.g., using a light gray character color), and may not change the position where the program information starts in the program frame displayed in that mode.

Referring back to FIG. 6, when the video icon 102e is selected in the portal screen, the video control screen displaying unit 96 displays a video screen for controlling the operation of recording/playing back the program on the display 14. The video control screen displaying unit 96 includes a recording list displaying unit 98. The recording list displaying unit 98 displays a list of recordings that includes information on recorded content and a list of programmed recordings.

FIG. 19 shows an exemplary video screen showing a list of recordings. A list of recordings 150 shows a list of titles, recoded date and time, status, and playback progress rate of the recorded programs. A status field contains information indicating the status of recorded content. For example, the information may indicate whether the content is recorded, programmed to be recorded, or whether an error has occurred. A playback progress rate field contains a value indicating the degree of progress of the playback of the recorded content. The video control screen displaying unit 96 refers to the recording information in the recording information storage unit 52 to set values in the respective fields of the list of recordings. When a playback button 152 is selected by the viewer, the playback processing unit 66 starts playing back the recorded content corresponding to the playback button 152.

In one variation, the list of recordings in the video screen may contain only the information related to the content already recorded. In this case, the information on programmed recording may be displayed in a schedule screen at the destination of transition reached when the schedule icon 102d is selected in the portal screen.

Referring back to FIG. 6, the viewing status communicating unit 99 periodically transmits viewing status data to the information management server 16. The viewing status data associates the program ID of the program currently displayed by the program image displaying unit 84, i.e., the program ID of the program currently viewed by the viewer, with the attribute information of the viewer. Further, the viewing status communicating unit 99 periodically refers to the recording information in the recording information storage unit 52 and periodically transmits viewing status data to the information management server 16. The viewing status data associates the program ID of the program programmed to be recorded with the attribute information of the viewer. The frequency of communicating the viewing status may be determined in light of the real time performance required to collect viewing status and of the network and system load, comparing the requirements. For example, the frequency may be once in every one minute.

Figure 20:
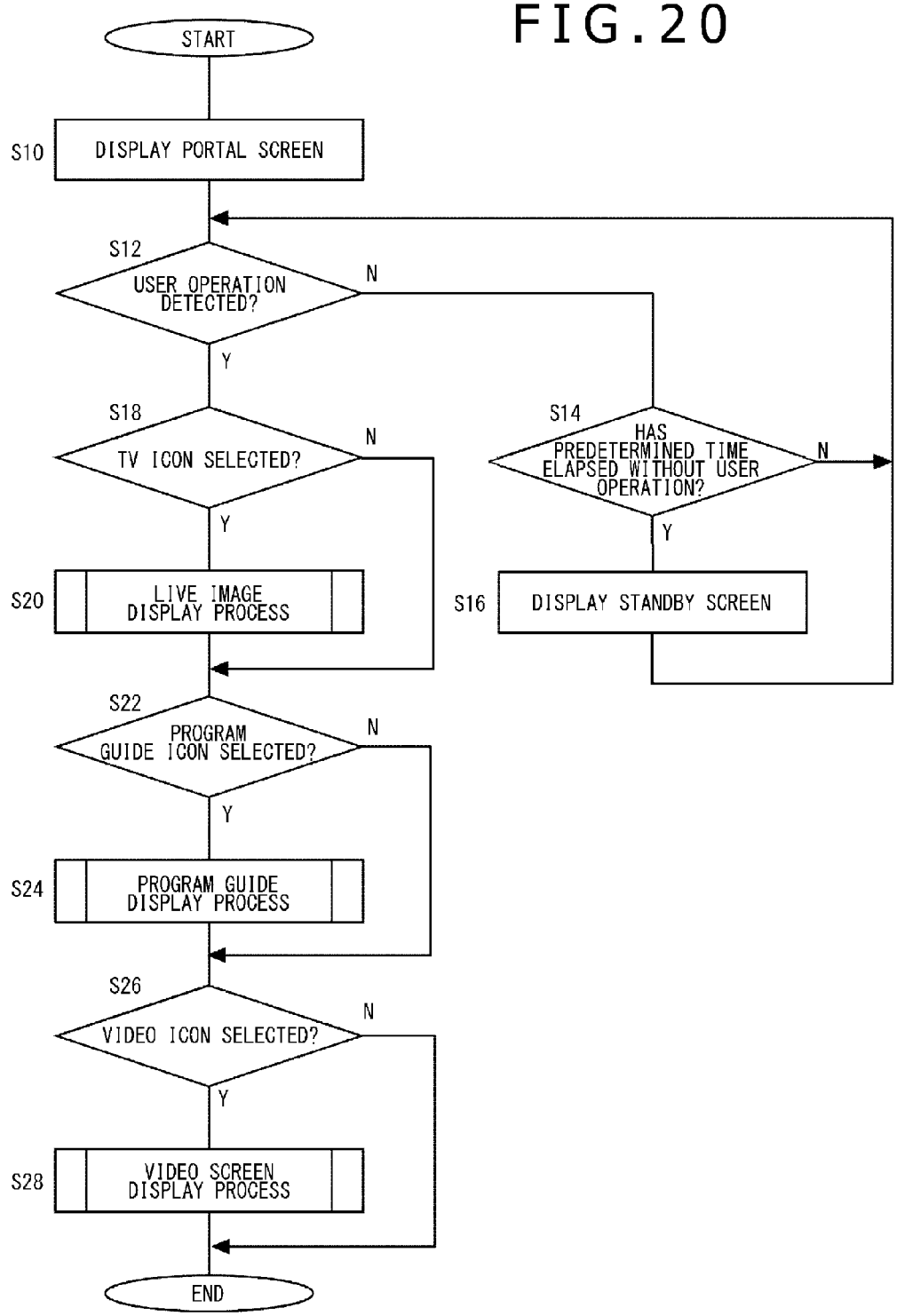
FIG. 20 is a flowchart showing the operation of the information processing apparatus.

A description will now be given of the operation in the configuration described above. FIG. 20 is a flowchart showing the operation of the information processing apparatus 11. The figure primarily shows the operation initiated via a user interface. When an instruction for starting the program viewer AP is acknowledged in the information processing apparatus 11, the portal screen displaying unit 80 displays a portal screen (S10). When a user operation is not detected (N in S12) and a predetermined period of time or more has elapsed in that state (Y in S14), the standby screen displaying unit 82 displays a standby screen (S16), whereupon a determination in S12 is performed for a second time. When the elapsed time during which an operation is not detected is less than the predetermined period of time (N in S14), control is returned to S12 without displaying a standby screen.

In the portal screen, the latest information pop 104 is displayed in association with each of the icons for selecting respective functional screens. The status tag 106 indicating the viewing status or operating status is also displayed. In this way, the viewer can view the useful latest information in the portal screen without making a transition to each functional screen. Consequently, viewer convenience is improved. By displaying a thumbnail image of recorded content in the portal screen or standby screen, the viewer can not only view the recorded content but also enjoy viewing the history of recording. For example, since the standby screen shows a thumbnail image in a varying mode, the standby screen may be displayed as some sort of an interior decoration. By allowing a thumbnail image to be displayed in a mode that varies depending on the date and time of recording, the viewer can easily identify and determine a recorded content to view.

When a viewer operation is detected (Y in S12), the standby screen displaying unit 82 terminates the display of the standby screen if it is being displayed. When the operation of selecting the TV icon 102a is detected (Y in S18), a live image display process described later is performed (S20). When the detected operation is not the selection of the TV icon 102a (N in S18), S20 is skipped. When the operation of selecting the program guide icon 102b is detected (Y in S22), a program guide display process described later is performed (S24). If the detected operation is not the selection of the program guide icon 102b (N in S22), S24 is skipped. When the operation of selecting the video icon 102e is selected (Y in S26), a video screen display process described later is performed (S28). When the detected operation is not the selection of the video icon 102e (N in S26), S28 is skipped so that the flow of the figure is terminated. When another on-screen selection icon 102 is selected in the portal screen, the process of displaying a screen corresponding to the selected icon is performed (not shown in the figure).

Figure 21:
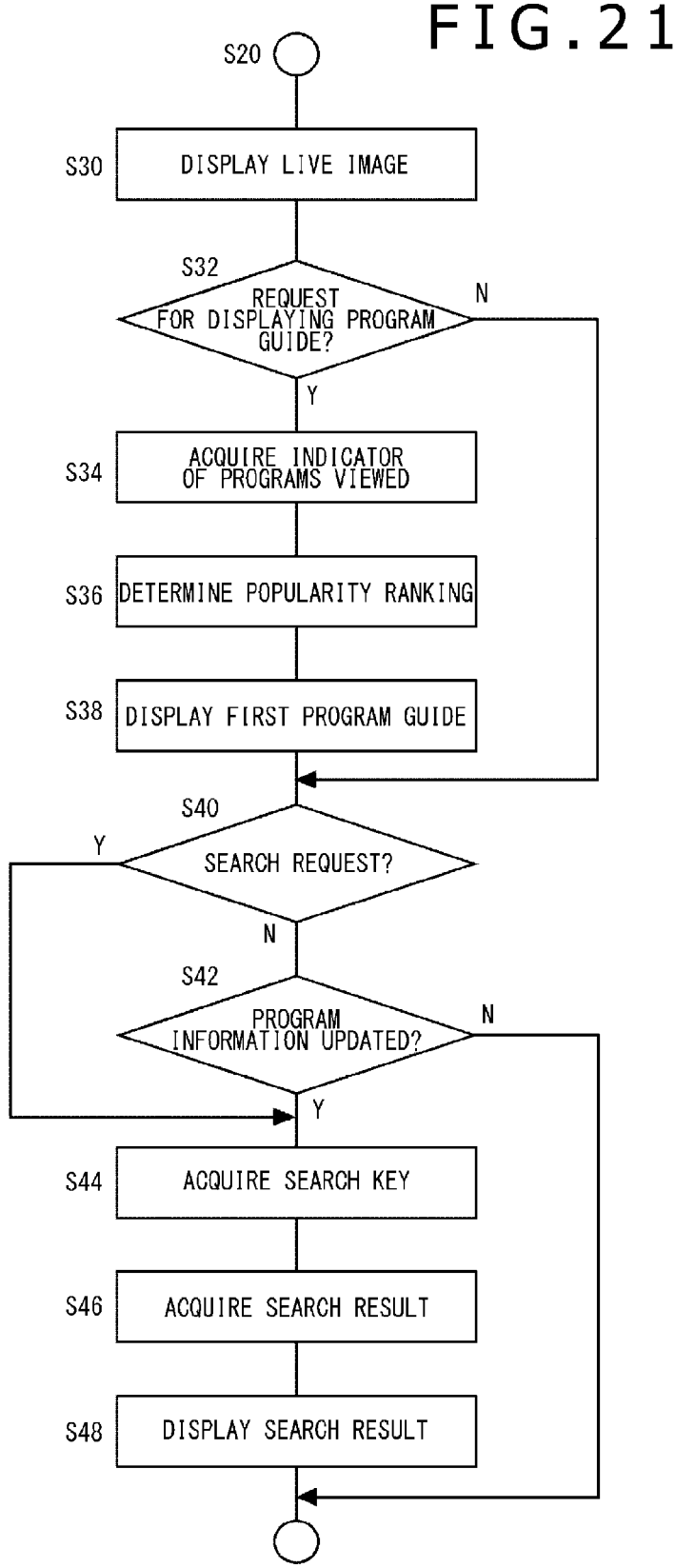
FIG. 21 is a flowchart showing S20 of FIG. 20 in further detail.

FIG. 21 is a flowchart showing S20 of FIG. 20 in further detail. The program image acquisition unit 58 acquires the image data for the program selected by the viewer from the tuner 13, and the program image displaying unit 84 displays the live image of the program in the image display screen 110 (S30). When a request for displaying a program guide is acknowledged (Y in S32), the indicator acquisition unit 68 acquires the live indicator and the programmed recording indicator from the information management server 16 (S34), the popularity determination unit 70 determines the ranking of popularity of the programs according to the indicators (S36). The first program guide displaying unit 92 displays the first program guide associating the program information of the programs being broadcast with the rank of popularity, superimposing the guide on the image display screen 110 (S38). When a request for displaying a program guide is not acknowledged (N in S32), S34 through S38 are skipped.

When a ranking determination interval (e.g., one minute) corresponding to the interval of collecting the viewing status in the information management server 16 elapses, the indicator acquisition unit 68 again acquires the latest indicators from the information management server 16 (not shown in FIG. 21). The popularity determination unit 70 updates the popularity rank of each program in accordance with the latest indicators. The first program guide displaying unit 92 displays the updated popularity ranking of the programs in the first program guide.

By displaying the first program guide showing ranking indicators along with the live image of the program, the viewer can know programs that are currently popular at a glance while viewing the desired program. In the first base technology, the viewing status is identified based on a viewing action that can be objectively identified (e.g., viewing of a program or a programming of a recording). In this way, viewing status can be identified that is more precise than base upon the viewer's subjective indicator of the program (e.g., "like," "dislike," "intend to view," or the like), i.e., more properly representing the situation.

Since the channel can be switched by controlling the first program guide, the viewer can select a program of interest as needed based on the changing ranking order. Since the first program guide shows the progress status of the programs or the status of transition in popularity, the viewer can select a program to view by referring to the status. Since the program summary of the program selected by the cursor is displayed in the program summary field 124, allowing the scrolling of the display, the area occupied by the first program guide is controlled while allowing the viewer to view a desired program summary. This helps maintain the viewability of program image.

When a request for a search is acknowledged while the program image is being displayed (Y in S40), or when the information related to the program being displayed is updated (Y in S42) absent an explicit search request (N in S40), the search key acquisition unit 74 acquires a search key from the program information (S44). The search execution unit 76 transmits a search request to the search server 17 and receives a result of the search (S46). The search result displaying unit 86 displays the browser screen 114 showing the web page retrieved by the search side by side with the image display screen 110 (S48). Absent an explicit search request and updating of the program related information (N in S42), S44 through S48 are skipped so that the flow of the figure is terminated.

According to this form, various information related to the program viewed is acquired from web sites on the Internet and presented to the viewer along with the program image. This allows the user to view a variety of information, i.e., information not limited to typical program guide information, associated with the program viewed. Further, since a search key is automatically retrieved from the program information, it is not necessary for the viewer to designate a search key. When the information related to a program is updated, the information displayed in the browser screen 114 is updated as changes occur. In this way, the viewer can view a search result updated based on the latest information on the program without performing a specific operation and can continue to view the program image.

Figure 22:
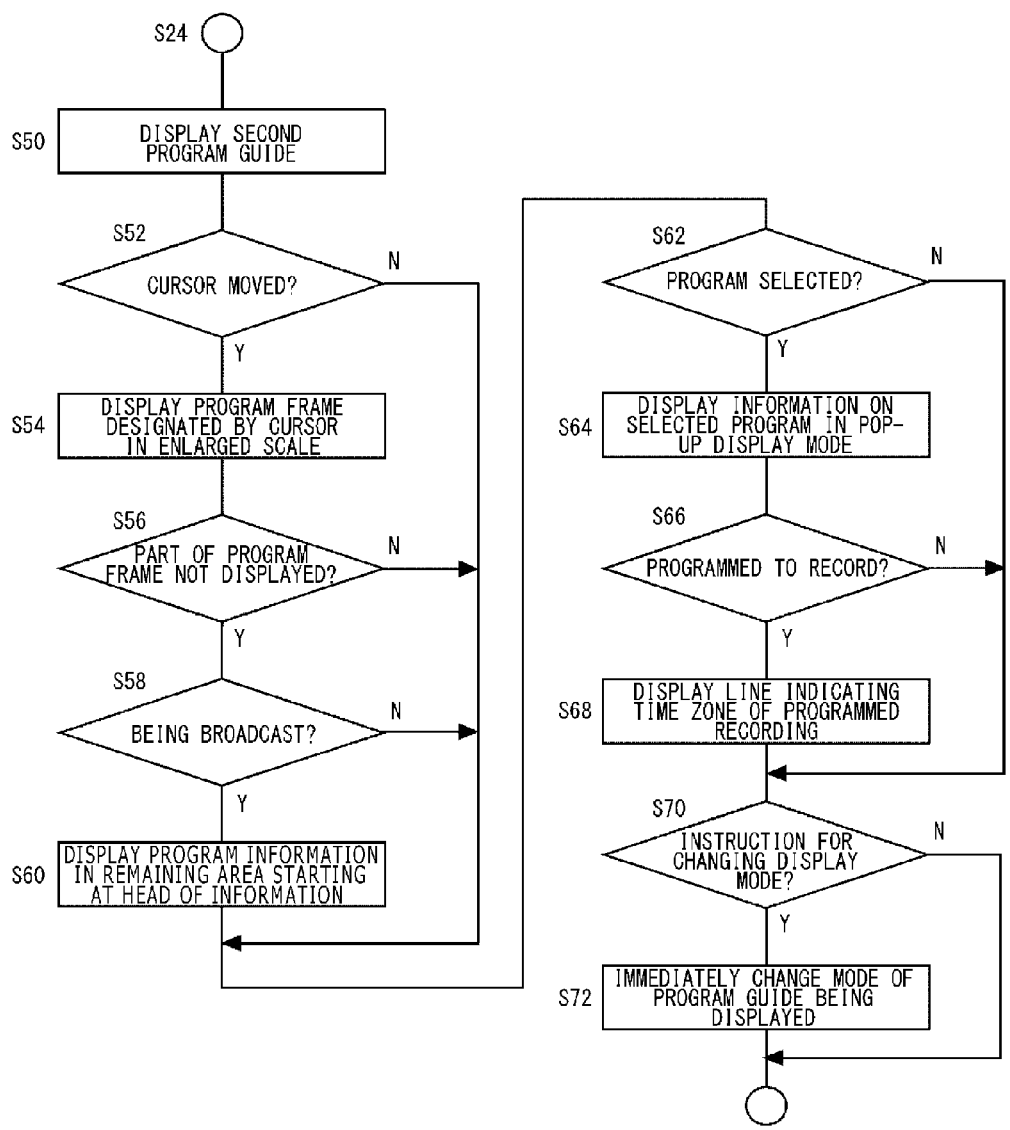
FIG. 22 shows S24 of FIG. 20 in further detail.

FIG. 22 is a flowchart showing S24 of FIG. 20 in further detail. The second program guide displaying unit 94 displays the second program guide based on the program information in the program information storage unit 50 (S50). The cursor displaying unit 90 moves the display position of the cursor across a plurality of program frames in the second program guide in accordance with the viewer operation. When the cursor is moved (Y in S52), the second program guide displaying unit 94 displays the program frame designated by the cursor, i.e., the program frame of the temporarily selected program, on a larger scale than the program frames for the other channels (S54).

A part of the program frame goes out of the view in association with the movement of the cursor (Y in S56). When the program frame is for the program being broadcast (Y in S58), the second program guide displaying unit 94 displays the program information in the remaining area of the program frame, starting at the head of the information (S60). When the program frame is for the program already broadcast (N in S58), S60 is skipped. When none of the parts of the program frame goes out of the view (N in S56), S58 and S60 are skipped. When the cursor is not moved (N in S52), S54 to S60 are skipped.

Subsequently, when the program that the viewer desires to control for viewing is selected in the second program guide, i.e., when the program is formally selected (Y in S62), the second program guide displaying unit 94 displays the program information on the selected program in the program detail window 136 in a pop-up display mode (S64). In this case, the control icon 138 is displayed to accompany the program detail window 136. The second program guide is displayed in the background in a blurred manner. When the recording of the formally selected program is programmed (Y in S66), the second program guide displaying unit 94 displays the programmed recording line 142 indicating the time zone of the programmed recording in the second program guide (S68).

When the recording is not programmed (N in S66), S68 is skipped. When the program is not formally selected (N in S62), S64 to S68 are skipped. When an instruction for changing the display mode of the second program guide (e.g., change in character font, change in size of program frame, etc.) is acknowledged (Y in S70), the second program guide displaying unit 94 immediately changes the mode of the second program guide (S72). When an instruction for changing the display mode is not acknowledged (N in S70), S72 is skipped.

According to this form, the area of the program frame in the second program guide selected by the cursor is dynamically enlarged so that more program information is displayed than before the selection. This reduces necessity for the viewer to perform an extra operation of, for example, displaying another screen to view program information. In other words, the viewer operation for viewing program information is simplified so that the convenience of the electronic program guide is improved. By superimposing the program detail window 136 on the second program guide, the viewer is allowed to perform an operation for viewing the program, while maintaining an impression of the time or program position viewed in the second program guide. By reducing the image quality of the second program guide in the background of the program detail window 136, the viewability of the program detail window 136 is relatively improved.

The display mode of the second program guide is changed as needed in accordance with user control while maintaining the display of the second program guide, i.e., without making a transition to another setting screen. This provides the viewer with immediate feedback resulting from the change in the display mode. For example, the viewer can immediately view the change in viewability. Further, by setting the programmed recording line 142 in the second program guide in association with the programmed recording, the viewer can easily view the setting status of programmed recording even if the viewer cannot directly view the program frame of the program programmed to be recorded due to a large number of channels. This helps prevent duplicate programmed recordings or unexpected overwriting, for example.

By displaying the program frame that partly goes out of the view, starting at the head of the program information that should be displayed, important information (program title, etc.) is displayed in the remaining area of the program frame preferentially. When the program information is displayed, starting in the middle of the information, the viewer will not be able to determine which program the information is about. By displaying the information from the start, the viewer can know the program content easily. By sliding only the program information of the program being broadcast into view in the program frame, only the program content of the program that the viewer can view is presented in an easily distinguishable manner.

Figure 23:
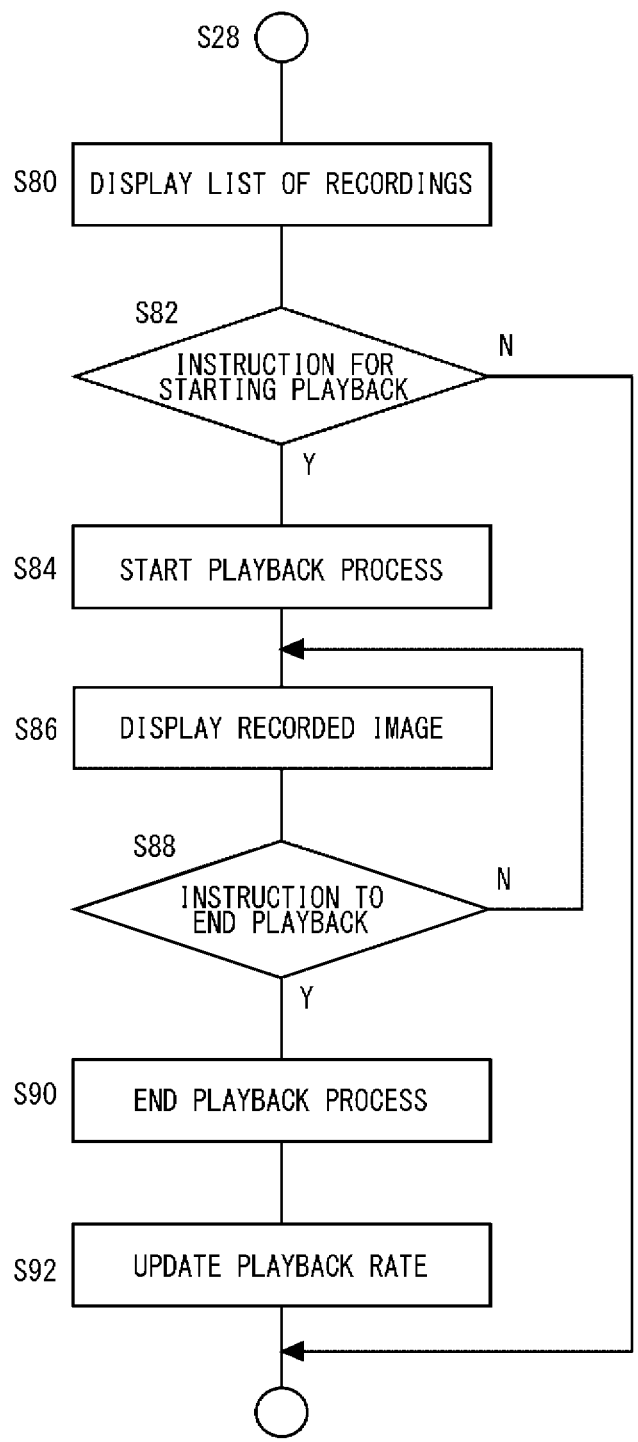
FIG. 23 shows S28 of FIG. 20 in further detail.

FIG. 23 is a flowchart showing S28 of FIG. 20 in further detail. The video control screen displaying unit 96 displays a video screen, and the recording list displaying unit 98 displays a list of recordings 150 in the video screen (S80). In the list of recordings, the recorded content suspended in the middle of playback is displayed in a mode to indicate as such. More specifically, the playback progress rate indicating the degree of the progress of playback is displayed in association with each of the recorded content. This helps the viewer efficiently determine the recorded content to play back.

When an instruction to start playback is acknowledged (Y in S82), the playback processing unit 66 starts playing back the recorded content (S84) and sends the data for recorded image to the program image displaying unit 84. The program image displaying unit 84 displays the recorded image on the display 14 (S86). When an instruction to end the playback is not acknowledged (N in S88), control is returned to S86. When an instruction to end the playback is acknowledged (Y in S88), the playback processing unit 66 ends the process of playing back the recorded content (S90) and stores the playback progress rate occurring at that moment in the recording information storage unit 52 (S92). When an instruction to start playback is not acknowledged (N in S82), S84 to S92 are skipped.

Figure 24:
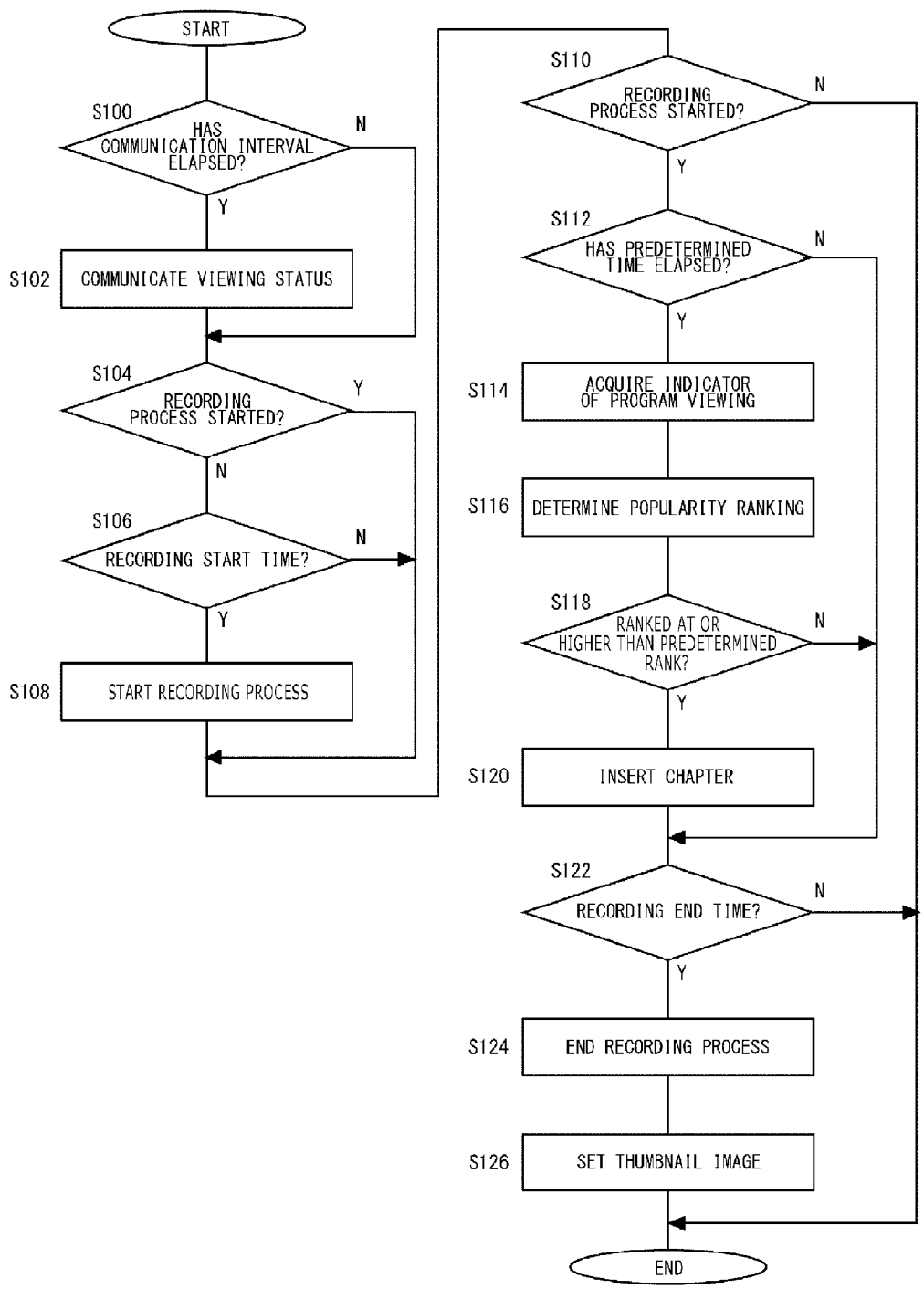
FIG. 24 is a flowchart showing the operation of the information processing apparatus.

FIG. 24 is a flowchart showing the operation of the information processing apparatus 11. The figure primarily shows the operation performed as a background process. When a predetermined interval for communication (e.g., one minute) has elapsed (Y in S100), the viewing status communicating unit 99 communicates the information management server 16 of the program ID of the program in which the live image is being displayed and the program ID of the program already programmed to be recorded (S102). When an interval for communication has not elapsed (N in S100), S102 is skipped. The recording processing unit 64 refers to the recording information in the recording information storage unit 52 and performs the programmed recording process. In other words, when the recording process is not started (N in S104) and when the recording start time comes (Y in S106), the recording processing unit 64 starts the recording process (S108). When the recording start time has not come (N in S106), S108 is skipped. When the recording process is already started (Y in S104), S106 and S108 are skipped.

When the recording process is already started (Y in S110) and when a predetermined ranking determination interval (e.g., one minute) has elapsed (Y in S112), the indicator acquisition unit 68 acquires the live indicator and the programmed recording indicator from the information management server 16 (S114). The popularity determination unit 70 determines the popularity ranking in accordance with the indicators (S116). When the program being recorded is ranked at or higher than a predetermined rank (Y in S118), the recording processing unit 64 inserts a chapter in the recorded data (S120). When the program being recorded is not ranked at or higher than a predetermined rank (N in S118), S120 is skipped. When the ranking determination interval has not elapsed (N in S112), S114 to S120 are skipped. By inserting a chapter in the recorded content, the viewer can easily search for and identify the start of a scene that is popular to viewers, when playing back the recorded content.

When the recording end time comes (Y in S122), the recording processing unit 64 ends the recording process (S124). The thumbnail setting unit 72 sets a thumbnail image from the recorded video and image occurring when the program is ranked at or higher than a predetermined rank and stores the thumbnail image in the thumbnail storage unit 54 (S126). When the recording end time does not come (N in S122), S124 and S126 are skipped. When the recording process is not started yet (N in S110), S112 to S126 are skipped. According to this embodiment, the scene that is popular to viewers is turned into a thumbnail image so that the recorded content is more easily identified by a thumbnail image.

Described above is an explanation based on the first form of the base technology. This form is intended to be illustrative only and it will be obvious to those skilled in the art that various modifications to constituting elements and processes could be developed and that such modifications are also within the scope of the first base technology. A description will now be given of variations to the first base technology.

The first variation will be described. The search key acquisition unit 74 of the first base technology uses program information acknowledged as EPG information as a search key. In one variation, the information processing apparatus 11 may additionally be provided with a caption information acquisition unit that acquires caption information in character multiplex broadcast (so-called caption multiplex broadcast) from the tuner 13. The search key acquisition unit 74 may use a caption character string included in the caption information as a search key. For example, the search key acquisition unit 74 may subject the caption character string to morphological analysis and use a noun phrase included in the caption character string as a search key. Alternatively, when the caption information acquisition unit acquires new caption information, the search key acquisition unit 74 may allow the search execution unit 76 to perform a new search using the caption character string included in the new caption information as a new search key.

The second variation will be described. The search key acquisition unit 74 may acquire a search key in accordance with the live indicator or programmed recording indicator acquired by the indicator acquisition unit 68 or the popularity ranking of the programs determined by the popularity determination unit 70. According to this variation, a search result useful for the viewer can easily be provided by using the program related information available when the popularity of the program is increased as a search key.

For example, a search key may be acquired from the program information or caption character string available when the live indicator, programmed recording indicator, or a sum thereof of a program reaches a predetermined value or higher while the image of the program is being displayed. Alternatively, a search key may be acquired from the program information or caption character string available when a program reaches a certain popularity rank or higher while the image of the program is being displayed. The caption character string, indicator, and history of popularity rank may be stored in the data storage unit 48 in association with the program ID, and the search key acquisition unit 74 may acquire a search key based on the history information while the recorded content is being played back.

The third variation will be described. In the first form of the base technology, the first program guide is assumed to be displayed in a display mode reflecting the popularity ranking of the programs, and no reference is made to the second program guide. In one variation, the second program guide may also be displayed in a display mode reflecting the popularity ranking of the programs. In this case, the second program guide displaying unit 94 may change the display mode (e.g., color, character font, etc.) of the program frames of the second program guide in accordance with the popularity ranking determined by the popularity determination unit 70. Alternatively, similarly to the first program guide, the popularity indicator or the data for an indicator itself may be displayed in association with the program frame. This variation provides the viewer with information useful for the viewer that selects a program for view in the second program guide. For example, a program programmed by a lot of viewers to be recorded can be suggested to the viewer, thereby helping the viewer to determine a program that should be programmed for recording.

The fourth variation will be described. The first program guide displaying unit 92 may dynamically change the size of a program frame for each channel, typically the length in the direction of channel axis, in accordance with the attribute or propensity of the viewer or the information related to the program. For example, the first program guide displaying unit 92 may refer to the age group or sex of the viewer and display program frames for channels that are more likely to be viewed by viewers having a selected attribute on a larger scale. Alternatively, the higher the current popularity rank, the larger the program frame of the program may be displayed. The program frame for a channel in which the broadcasting of a program ends and that of the next program has not been started may be displayed on a smaller scale than the program frames for the other channels in which programs continue to be broadcast. According to this variation, the viewability of program frames for channels that are likely to be selected by viewers is improved and the volume of displayable program information can be increased.

The fifth variation will be described. The program image acquisition unit 58 may acquire from the tuner 13 the program image currently ranked at a predetermined rank (typically, No. 1) or higher as determined by the popularity determination unit 70. When the popularity ranking changes, the channel from which to acquire image information may be dynamically switched in accordance with the change. The program image displaying unit 84 displays the program image acquired by the program image acquisition unit 58 in accordance with the change in popularity ranking on the display 14. According to this variation, a program that is popular to viewers is automatically selected so that the display 14 always displays the image of a popular program. This implements a sort of zapping without viewer intervention.

The sixth variation will be described. When playing back the recorded content, the playback processing unit 66 may communicate the information indicating as such to the information management server 16 along with the program ID. The information management server 16 may periodically supply the information processing apparatus 11 with a playback ratio indicating the ratio of viewers that have played back the recorded content with respect to the viewers having programmed the program with the program ID to be recorded, associating the ratio with the program ID. The playback ratio is stored in the recording information in the recording information storage unit 52. The recording list displaying unit 98 may further display the playback ratio in association with each recorded content in the list of recordings. The viewer may select one of the plurality of recorded contents for view by referring to the playback ratio of the recorded contents.

The seventh variation will be described. The recording processing unit 64 may record the live image ranked at or higher than a predetermined rank (typically, No. 1) even without a viewer operation for recording. In this case, the recording processing unit 64 dynamically changes the live image recorded in accordance with a change in popularity ranking. According to this variation, the live image of a popular program is always recorded in the background. The viewer can later view a program image popular to other viewers in an efficient manner.

This variation is particularly suitable in the program viewing system 10 provided with a plurality of tuners 13. According to the first form of the base technology, the viewer can refer to the first program guide and know that the popularity of a program different from the program that the viewer is viewing is increased. However, the viewer may find it difficult to view the very program image that caused the increase in popularity even if the viewer switches to the other program. According to this variation, program images that become popular are always recorded so that the viewer does not miss out on viewing program images that become popular. As a result, viewer convenience is improved.

The eighth variation will be described. When a certain viewer operation regarding the cursor movement in the second program guide is acknowledged, the cursor displaying unit 90 may allow program frames of programs programmed for recording to be successively selected by the cursor. According to this variation, the viewer can efficiently select the program programmed to be recorded in the second program guide.

The ninth variation will be described. In the first form of the base technology, the popularity ranking of the programs is determined in the information processing apparatus 11. In a variation, the information management server 16 may determine the popularity ranking of the programs across the entire attributes of viewers and the popularity ranking for each viewer attribute. In this case, the indicator acquisition unit 68 of the information processing apparatus 11 may acquire the popularity ranking as the indicator from the information management server 16. The popularity determination unit 70 may directly output the popularity ranking thus acquired to the data processing unit 56.

The tenth variation will be described. In the first form of the base technology, the history of popularity ranking is stored in the information processing apparatus 11. In a variation, the history of indicators originating the popularity ranking may be stored in the information management server 16. For example, the information management server 16 may further be provided with a tally history storage unit, which may store the tally result of viewing status as a tally history, associating the result with date and time information. In acquiring the popularity ranking of programs broadcast in the past in the information processing apparatus 11 (e.g., in playing back a recorded content), the information processing apparatus 11 may acquire the tally history from the information management server 16 to determine the popularity ranking in the past.

The eleventh variation will be described. In the first form of the base technology, the program information acquisition unit 60 acquires EPG information from the tuner 13. In a variation, the program information acquisition unit 60 may acquire EPG information from an information provider server on the Internet 15 via the Internet 15. Further, the program information acquisition unit 60 may acquire EPG information from the tuner 13 and acquire program related information that should be appended to the EPG information and displayed in the electronic program guide via the Internet 15.

The twelfth variation will be described. The functions of the information processing apparatus 11 described in the first base technology may be implemented in the tuner 13. In this case, the tuner 13 may include the CPU 300, GPU 302, main memory 308, hard disk drive 334, network card 330, and interface 332 shown in FIG. 5. The functions shown in FIG. 6 may be implemented by the tuner.

Figure 25:
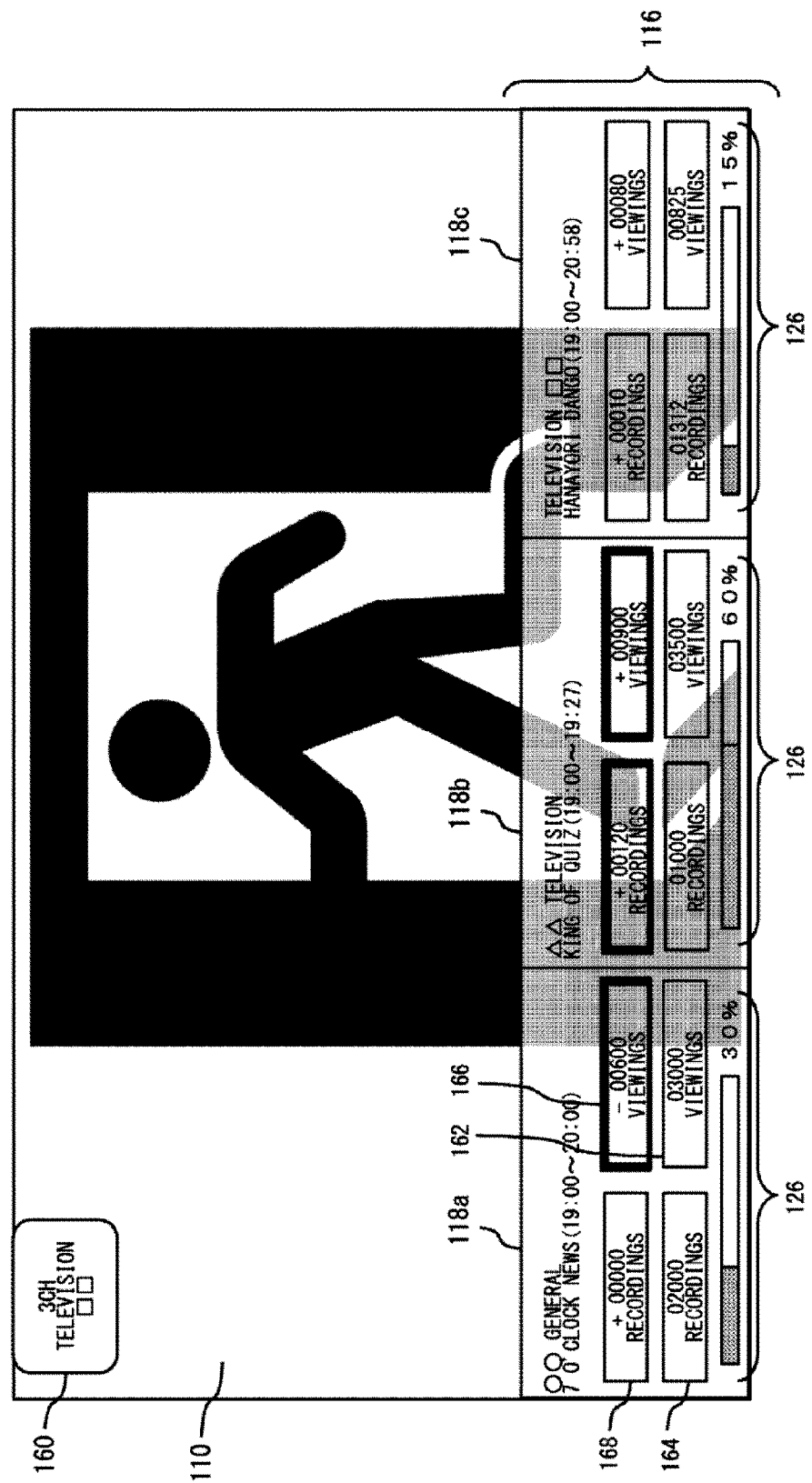
FIG. 25 shows an exemplary first program guide as displayed in an exemplary variation.

As a thirteenth variation, an explanation is given of a display mode of a first program guide 116. FIG. 25 shows an exemplary first program guide as displayed in the present exemplary variation. The exemplary first program guide as displayed in the figure corresponds to the one shown in FIG. 13, and like signs represent like constituting elements that are identical to or correspond to those shown in FIG. 13. A displayed station indicator 160 shows broadcasting stations being displayed on the image display screen 110. Program frames 118a, 118b, and 118c (also generically referred to as a "program frame 118") of the first program guide 116 each include a view count field 162, a recording count field 164, a view count change field 166, a recording count change field 168, and a progress indicator 126.

The progress indicator 126 shows the degree of progress of each station program at the current moment. The view count field 162 shows the number of users viewing each station program. The recording count field 164 shows the number of users recording each station program. As described later, the number of viewing users in the view count field 162 and the number of recording users in the recording count field 164 are updated periodically (for every passing minute in the present exemplary variation and hereinafter). The view count change field 166 shows a difference in the number of the viewing users before and after the update, i.e., the value of an increase/decrease in the number of the viewing users associated with the update. The recording count change field 168 shows the value of an increase/decrease in the number of the recording users associated with the update. The respective values of the view count change field 166 and the recording count change field 168 are also updated in accordance with the update of the view count field 162 and the recording count field 164.

An explanation is now given of a configuration for achieving the first program guide 116 described above. In addition to the configuration shown in the form of the first base technology, the information management server 16 is further provided with an executed recording tally unit for counting the number of users executing recordings. The executed recording tally unit acquires the program ID of the program that the viewer is currently recording from each of the plurality of information processing apparatuses 11 on a periodical basis and counts the number of recordings being executed. Therefore, the viewing status communicating unit 99 of the information processing apparatus 11 transmits the program ID of the program being recorded by the recording processing unit 64 to the information management server 16 on a periodical basis.

The indicator acquisition unit 68 of the information processing apparatus 11 acquires, as a live indicator, the number of the viewing users, which is the number of users viewing each program currently being broadcast, and the number of the recording users, which is the number of users recording each program on a periodical basis from the information management server 16. The popularity determination unit 70 outputs the number of the viewing users and the number of the recording users acquired by the indicator acquisition unit 68 as it is as data indicating the degree of popularity.

The first program guide displaying unit 92 displays the first program guide 116 and the displayed station indicator 160 over a program image being displayed on the image display screen 110 in accordance with a user operation. The first program guide displaying unit 92 sets the number of the viewing users in the view count field 162, calculates the value of an increase/decrease in the number of the viewing users before and after the setting, and sets the value of the increase/decrease in the view count change field 166. The first program guide displaying unit 92 sets the number of the recording users in the recording count field 164, calculates the value of an increase/decrease in the number of the recording users before and after the setting, and sets the value of the increase/decrease in the recording count change field 168. The first program guide displaying unit 92 repeats a process of updating the view count field 162, the recording count field 164, the view count change field 166, and the recording count change field 168 every time a new live indicator is acquired by the indicator acquisition unit 68, that is, every passing minute.

When the increase/decrease in the number of the viewing users is at least a predetermined threshold (e.g., plus/minus 500 people), the first program guide displaying unit 92 highlights the view count change field 166 more than usual as shown in the program frames 118a and 118b in FIG. 25. Similarly, when the increase/decrease in the number of the recording users is at least a predetermined threshold (e.g., plus/minus 100 people), the first program guide displaying unit 92 highlights the recording count change field 168 more than usual as shown in the program frame 118b in FIG. 25.

As a reference for highlighting in the program frame 118, an increase/decrease in the number is used in here. However, the first program guide displaying unit 92 may calculate an increase/decrease rate and may highlight a field under the condition that the increase/decrease rate shows a change of at least a predetermined threshold. Alternatively, the first program guide displaying unit 92 may highlight a field when either one or both of the increase/decrease in the number and the increase/decrease rate are at least the respective predetermined threshold. Alternatively, the first program guide displaying unit 92 may highlight a field when either one or both of an increase in the number and an increase rate are at least the respective predetermined threshold or may highlight a field when either one or both of a decrease in the number and a decrease rate are at least the respective predetermined threshold. It is obvious that either an increase or decrease may be used as a requirement.

The first program guide displaying unit 92 may suggest a user a significant increase/decrease in the number of the viewing users or the number of the recording users with an effect by displaying a predetermined image or a video image, instead of the highlighting, in a corresponding program frame 118. Further, with regard to the number of the viewing users and the number of the recording users, the increase/decrease in the number and/or the increase/decrease rate may be calculated by the information management server 16, and the information processing apparatus 11 may directly use the increase/decrease in the number and/or the increase-decrease rate.

The first program guide displaying unit 92 sets a progress indicator 126 for a program shown in each program frame 118. In other words, a progress indicator 126 is also set to a program not being viewed by a user or a program in a program frame 118 not being selected by a cursor (not shown). This allows the user to more easily overlook the degree of progress of a program including a program that is not being viewed or selected. Thus, the user can effectively select a program more easily. The first program guide displaying unit 92 may display the progress indicator 126 while overlaying the indicator 126 on other displays in the program frame 118 and on the program image. In other words, the first program guide displaying unit 92 may overlay-display the progress indicator 126 on another display object.

The display mode for presenting the degree of progress of a program to a user is not limited to the progress indicator 126, which is in graph form. The first program guide displaying unit 92 may set a different display mode (e.g., a different background color) to the program frame 118 according to the degree of progress of a program. For example, a ratio of displaying a first background color and a second background color of the program frame 118 may be changed sequentially as a progress indicator according to the degree of progress of a program, or the ratio of one of the background colors may be increased progressively as the program progresses. Obviously, the first program guide displaying unit 92 may also overlay-display the progress indicator, obtained in this case, on another display object. The first program guide displaying unit 92 may display the progress indicator of a program frame 118 that corresponds to a program being selected by the user, that is, a program being displayed on the image display screen 110 in a mode that is different (e.g., in a different color) from that of the progress indicator that corresponds to another program not being selected.

When there is a change in the viewing status of the program in the first program guide displaying unit 92, the first program guide displaying unit 92 instantly reflects the change in the first program guide 116 by updating the view count field 162 of the program frame 118 without waiting to acquire information from the information management server 16. More specifically, when a program that is being viewed is switched to another program, for example, when the operation detection unit 44 detects an operation of switching a program, the first program guide displaying unit 92 instantly decrements the view count field 162 of the program frame 118 for the program that had been selected until the switching of the program. The first program guide displaying unit 92 instantly increments the view count field 162 of the program frame 118 that is newly selected.

Similarly, when there is a change in the recording status of the program in the first program guide displaying unit 92, the first program guide displaying unit 92 instantly reflects the change in the first program guide 116 by updating the recording count field 164 of the program frame 118 without waiting to acquire information from the information management server 16. More specifically, when the recording of a program is started, for example, when the operation detection unit 44 detects an operation of starting the recording or when the recording processing unit 64 starts a recording process, the first program guide displaying unit 92 instantly increments the recording count field 164 of the program frame 118 of a program to be recorded. When the recording of the program is ended, the first program guide displaying unit 92 instantly decrements the recording count field 164 of the program frame 118 of the program that had been recorded.

According to the exemplary variation, the number of the viewing users and the number of the recording users of each program are displayed in the first program guide 116. Therefore, a user can more easily know the degree of popularity of each program, specifically. Since an increase/decrease in the number is displayed, the user can more easily know the transition in popularity of each program, specifically. Also, the user can more easily know, almost in real time, a program with a drastic increase or decrease in the number of viewing users or the number of the recording users, in other words, a program having a drastic change in its popularity. As described above, the user-friendliness for a program selection as well as the interest in viewing the program can be increased by allowing the trend of other viewers to be more easily known in addition to simply allowing a program image to be viewed. For example, notifying a user of the presence of a program with increasing popularity arouses a user's desire to view the program, preventing the user from missing the program to be viewed.

(Second Base Technology)

Figure 26:
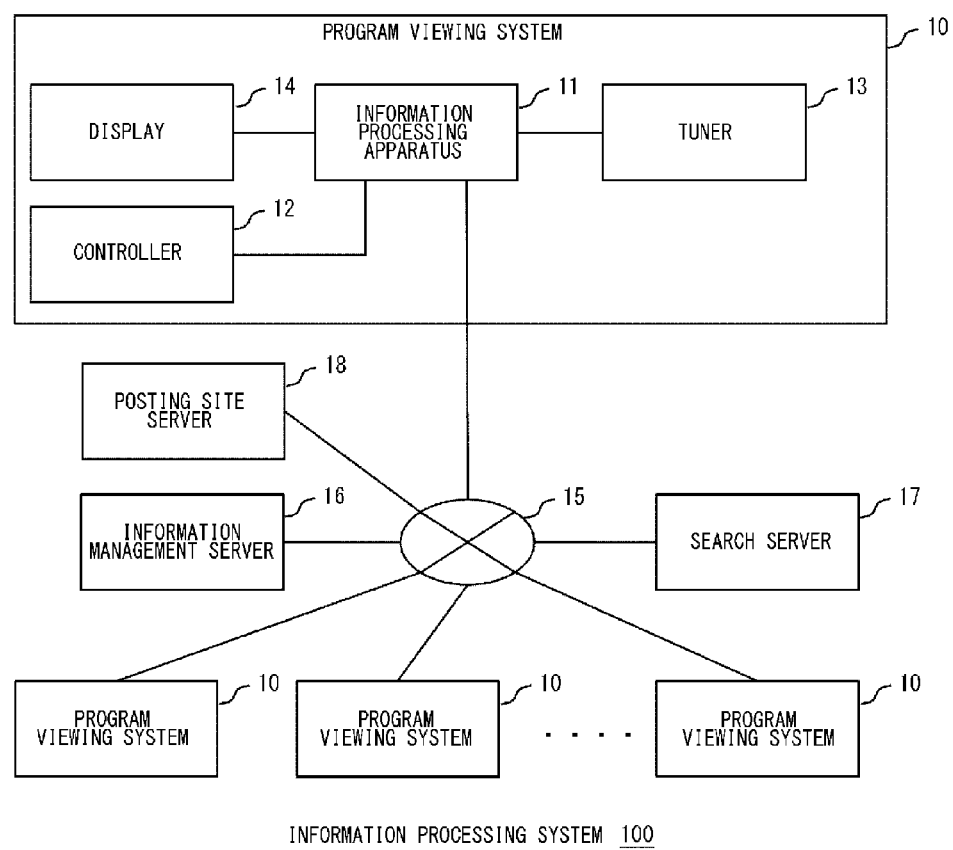
FIG. 26 shows the configuration of an information processing system according to a second form of the base technology.

FIG. 26 shows the configuration of an information processing system 100 according to a second form of the base technology of the present invention. In addition to the configuration stated in the first base technology, a program viewing system 10 and a posting site server 18 are connected via the Internet 15 in the information processing system 100 of the second base technology.

The posting site server 18 puts a posting site on the Internet 15 that allows for an instant posting of a feedback comment (typically short sentences of about 100 characters and also referred to as a "tweet") of the moment regarding the content of a program that is provided by a viewer viewing the program through the viewer's terminal. To a posted comment, a tag (hereinafter, also referred to as a "hashtag") may be added by a poster (viewer), which is for grouping with other comments and, more specifically, used as a search keyword for searching a plurality of posted comments all at once.

Upon the receipt of a comment acquisition request (in other words, a search request) specifying a specific hashtag, the posting site server 18 supplies, all at once, a client originating a search request with data of at least one comment to which the hashtag is added. Such a posting site includes, for example, "Twitter" (trademark or registered trademark).

Figure 27:
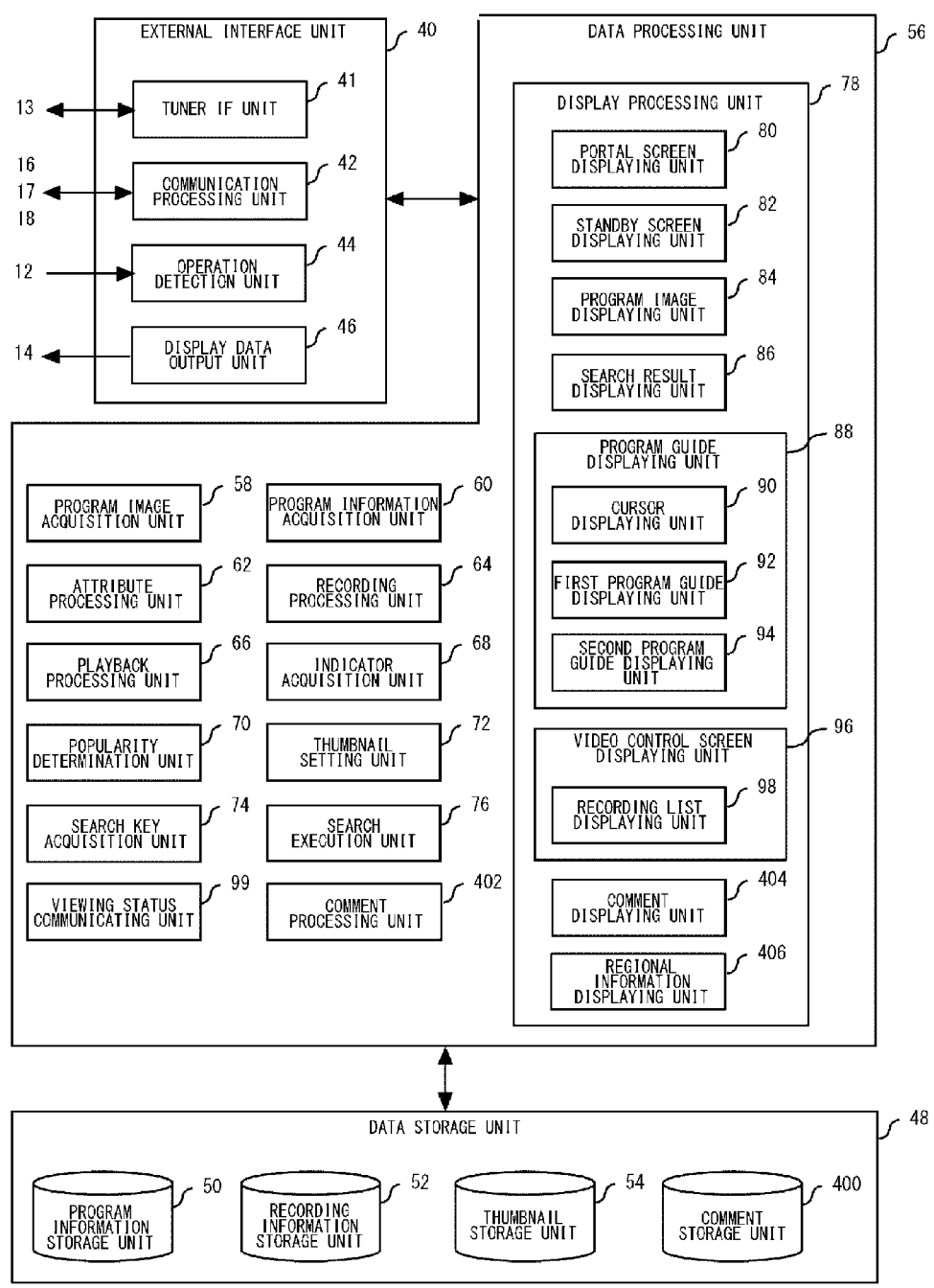
FIG. 27 is a block diagram showing the functional configuration of an information processing apparatus of FIG. 26.

The information processing apparatus 11 of the second base technology provides a new viewing experience to a user by acquiring comments posted to the posting site server 18 by various viewers and then presenting the comments to the user viewing a program being currently broadcast. FIG. 27 is a block diagram showing the functional configuration of the information processing apparatus 11 of FIG. 26. In addition to the configuration stated previously in the first base technology, the information processing apparatus 11 further includes a comment storage unit 400, a comment processing unit 402, a comment displaying unit 404, and a regional information displaying unit 406.

In the second base technology, it is assumed that program information acquired by the program information acquisition unit 60 and then stored in the program information storage unit 50 includes a service ID and an event ID, which are predetermined as identification information for uniquely identifying a single program, and information indicating the genre and category (e.g., news, variety, sports, etc.) to which the program contents belongs. It is also assumed that the data storage unit 48 stores, in advance, information indicating a user's viewing region that corresponds to at least one specific broadcasting station as the attribute information of the user.

Figures 28, 29:
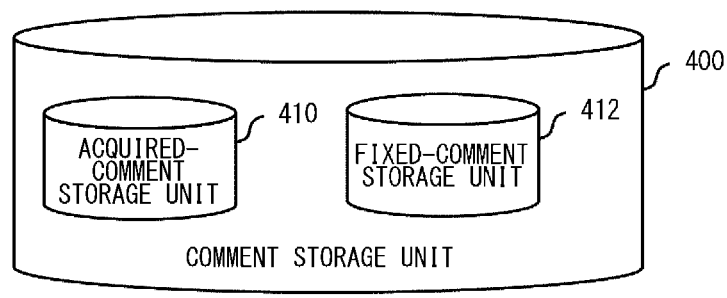
FIG. 28 is a block diagram showing a comment storage unit of FIG. 27 in further detail.
FIG. 29 shows the configuration of data stored in a fixed-comment storage unit.

FIG. 28 is a block diagram showing the comment storage unit 400 of FIG. 27 in further detail. The comment storage unit 400 includes an acquired-comment storage unit 410 and a fixed-comment storage unit 412. The acquired-comment storage unit 410 is a storage area adapted to store a comment acquired from the posting site server 18 by the information processing apparatus 11 in accordance with a user operation. To a comment acquired by the posting site server 18, the posting time and date of the comment are added.

The fixed-comment storage unit 412 is a storage area adapted to store a fixed-comment, which is a prepared comment for supporting the creation of a comment to be posted to the posting site server 18. FIG. 29 shows the configuration of data stored in the fixed-comment storage unit 412. The fixed-comment storage unit 412 stores the information indicating a plurality of types of program genres and categories, for example, news, variety, sports, etc., and fixed comments expected to be appropriate for respective genres in association with each other. These fixed comments are also said to be typical comments that are often posted according to a program genre. A "program name" in a fixed comment of the figure is dynamically replaced with the name of a program (e.g., "7 o'clock news," etc.) being viewed by a user at the time of creating a posting comment as described later.

Figure 30:
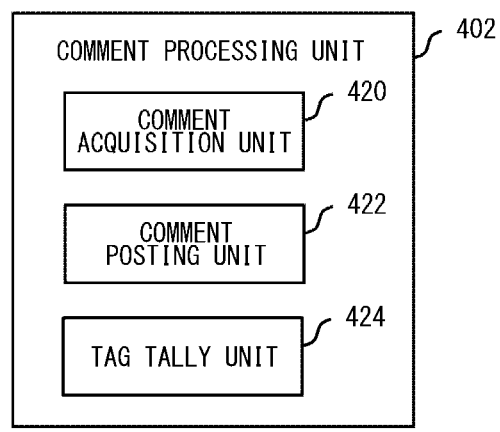
FIG. 30 is a block diagram showing a comment processing unit of FIG. 27 in further detail.

FIG. 30 is a block diagram showing the comment processing unit 402 of FIG. 27 in further detail. The comment processing unit 402 includes a comment acquisition unit 420, a comment posting unit 422, and a tag tally unit 424.

The comment acquisition unit 420 transmits a comment acquisition request to the posting site server 18 by using, as a search key, a hashtag identified in accordance with a user operation and then acquires the data of at least one comment to which the hashtag is added from the posting site server 18. The comment acquisition unit 420 then stores the acquired comment data in the acquired-comment storage unit 410.

By transmitting the data of a comment created by a user on a comment creating screen (described later) to the posting site server 18, the comment posting unit 422 registers the comment with the posting site server 18. In posting the comment created by the user, the comment posting unit 422 adds to the comment a predetermined hashtag that indicates software (hereinafter, also referred to as "program viewing software"), which is installed in the information processing apparatus 11 so as to provide a program viewing function, and a predetermined hashtag that indicates a broadcasting station being viewed by the user.

The comment acquisition unit 420 and the comment posting unit 422 may perform the above processes by calling an application programming interface (API) for acquiring a comment and an API for posting a comment from among Web application programming interfaces (WebAPI) put by the posting site server 18.

Referring to a plurality of comments stored in the acquired-comment storage unit 410, the tag tally unit 424 counts the number of hashtags added to each comment according to the type of the hashtags. In other words, the number of appearances of each hashtag in the plurality of comments is counted. In other words, the number of comments to which each of a plurality of types of hashtags (e.g., "#soccer" and "#kokkai") is added is calculated for each hashtag type. It can be said that the comments stored in the acquired-comment storage unit 410 are acquired from the posting site server 18 based on a user operation (a screen selection operation, etc.) and are displayed based on the user operation.

The tag tally unit 424 counts the number of hashtags of a comment posted within the past hour prior to the time at which the number is counted (in other words, the posting time and date of a comment are within the past hour of the time at which the number is counted). The tag tally unit 424 may start a process of counting hashtags by using, as a trigger, the detection of an operation of displaying an information screen or the detection that a certain period of time (e.g., ten minutes) has passed.

Figure 31:
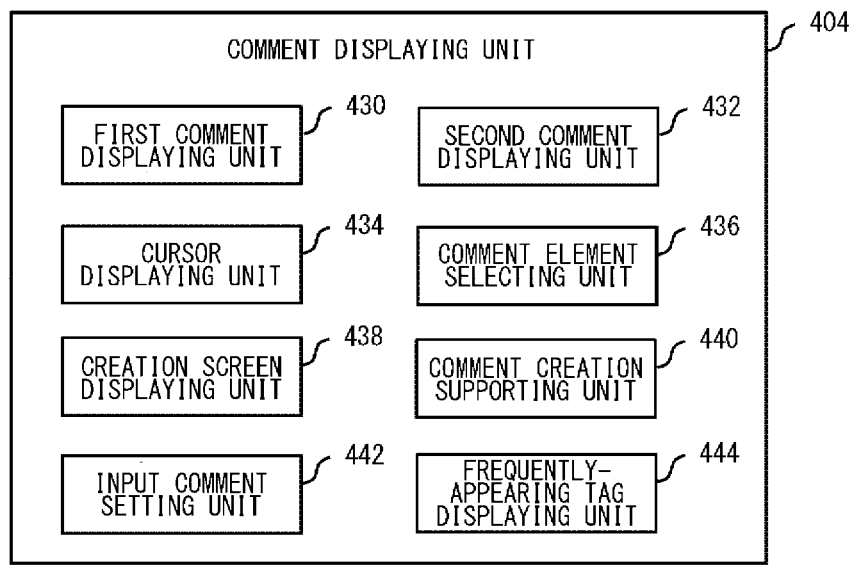
FIG. 31 is a block diagram showing a comment displaying unit of FIG. 27 in further detail.

FIG. 31 is a block diagram showing the comment displaying unit 404 of FIG. 27 in further detail. The comment displaying unit 404 includes a first comment displaying unit 430, a second comment displaying unit 432, a cursor displaying unit 434, a comment element selecting unit 436, a creation screen displaying unit 438, a comment creation supporting unit 440, an input comment setting unit 442, and a frequently-appearing tag displaying unit 444.

The first comment displaying unit 430 displays an all-TL screen (described later) that displays all tweet lists (hereinafter, written as "TL") on the display 14. A tweet list of the second base technology means a user interface that displays comments posted to the posting site server 18 and is a concept including a so-called timeline in which the posted comments are arranged in chronological order. The second comment displaying unit 432 displays a channel TL screen (described later) that displays a comment related to a specific broadcasting station and a hashtag TL screen (described later) that displays a comment related to a specific hashtag.

The cursor displaying unit 434 displays a cursor for a user to select a specific area (hereinafter, also referred to as an "area") and a specific comment on the respective TL screens displayed by the first comment displaying unit 430 and the second comment displaying unit 432. When depression of an up or down switch of a directional button of the controller 12 is detected by the operation detection unit 44, the cursor displaying unit 434 may move the cursor over a plurality of areas and comments.

The comment element selecting unit 436 selects a specific element character string in an area or comment focused by the cursor in accordance with the user operation to the controller 12. The element character string is typically a character string that is different from the main text of a comment and is, for example, a URL of a webpage or a character string of a hashtag. When depression of a left or right switch of the directional button of the controller 12 is detected by the operation detection unit 44, the comment element selecting unit 436 may successively select an individual hashtag added to the comment focused by the cursor and highlight the selected hashtag in a predetermined mode.

The creation screen displaying unit 438 displays on the display 14 a tweet menu screen (described later) for selecting the type of a comment posting operation and a comment creating screen (described later) for creating a comment for posting. The creation screen displaying unit 438 displays a software keyboard (in other words, a "screen keyboard") for entering characters for a comment on the comment creating screen.

The comment creation supporting unit 440 identifies the genre of a program a user is viewing by referring to the program information stored in the program information storage unit 50. The comment creation supporting unit 440 then selects a fixed comment corresponding to the genre of the program the user is viewing in accordance with a correspondence relationship between program genres and fixed comments stored in the fixed-comment storage unit 412.

The input comment setting unit 442 sets a character, which is selected by the user through the software keyboard displayed on the comment creating screen, in a comment creating area of the comment creating screen. When a fixed comment is selected by the user, the input comment setting unit 442 automatically sets the selected fixed comment in the comment creating area.

When the display of an information screen (described later) is instructed by the user, the frequently-appearing tag displaying unit 444 identifies the top eight hashtags (hereinafter, also referred to as "frequently-appearing tags") with respect to the number of appearances of respective hashtags counted by the tag tally unit 424. The frequently-appearing tag displaying unit 444 displays each of the frequently-appearing tags in a frequently-appearing tag display area of the information screen along with the number of appearances in a plurality of comments.

Referring back to FIG. 27, when the display of the information screen (described later) is instructed by the user, the regional information displaying unit 406 acquires the number of viewing users, which is the number of users viewing a program of each broadcasting station in each region from the indicator acquisition unit 68. Therefore, the viewer tally unit 26 of the information management server 16 acquires the information of the program the user is viewing along with the information indicating the broadcasting station from the information processing apparatus 11 and counts the number of the viewing users for each broadcasting station in each region. The indicator acquisition unit 68 of the information processing apparatus 11 acquires the number of the viewing users of each broadcasting station in each region and provides the number of the viewing users to the regional information displaying unit 406. The regional information displaying unit 406 displays, in a broadcasting-station-specific viewing status displaying area in the information screen, the number of the viewing users of each broadcasting station in each region.

Figure 32:
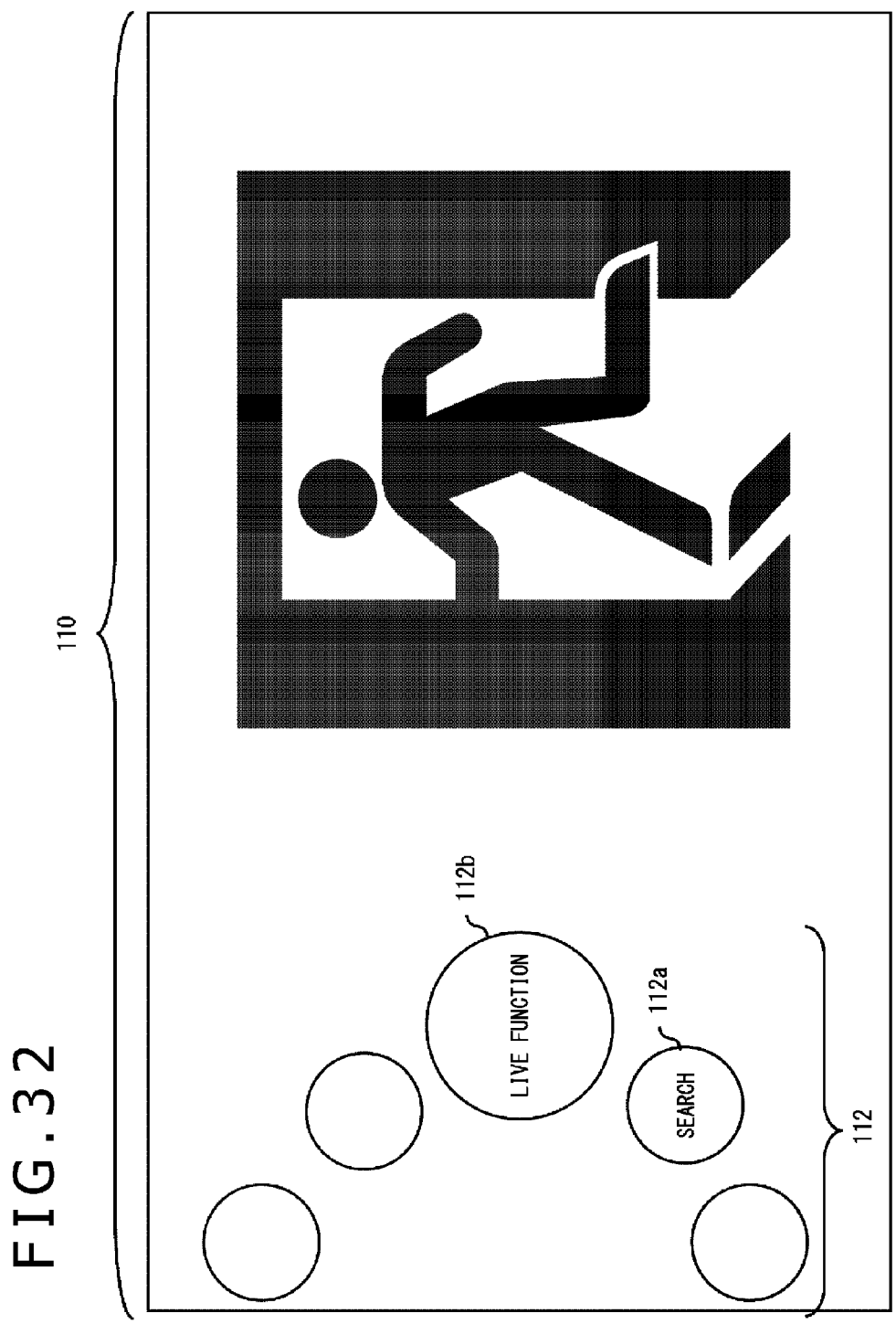
FIG. 32 shows an exemplary image display screen as displayed.

An explanation is given of the operation of the above configuration in the following. FIG. 32 shows an exemplary image display screen 110 as displayed and corresponds to FIG. 11. As described in the first base technology, the program image acquisition unit 58 acquires, from the tuner 13, the image of a single program selected by a user from among a plurality of programs being broadcast by a plurality of broadcasting stations, and the program image displaying unit 84 displays the program image on the image display screen 110 in accordance with the image information. Control icons 112 of the second base technology include a live function icon 112b. When the live function icon 112b is selected by the user on the image display screen 110, a live function explained in the following flowchart is started.

Figure 33:
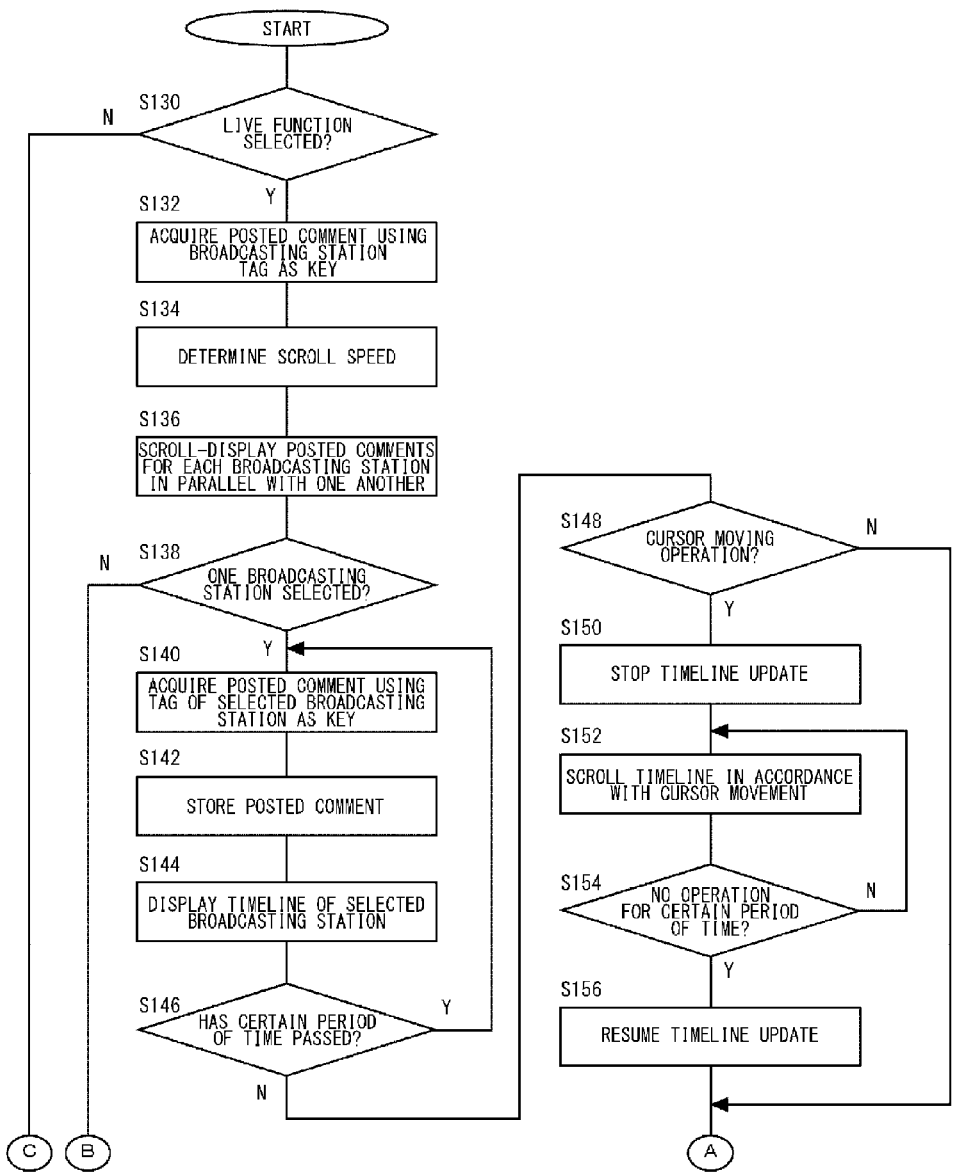
FIG. 33 is a flowchart showing the operation of the information processing apparatus of FIG. 26.

FIG. 33 is a flowchart showing the operation of the information processing apparatus 11 of FIG. 26. When the live function icon 112b is selected on the image display screen 110 (Y in S130), the comment acquisition unit 420 transmits a comment acquisition request to the posting site server 18 by using, as a search key, the hashtag of each of a plurality of broadcasting stations that corresponds to a user's viewing region that is stored in the data storage unit 48. The comment acquisition unit 420 then acquires a comment to which the hashtag of each broadcasting station is added from the posting site server 18 and stores the comment in the acquired-comment storage unit 410. In other words, the comment acquisition unit 420 acquires comments posted by various viewers for a program being broadcast by each broadcasting station that corresponds to the user's viewing region (S132).

The first comment displaying unit 430 acquires a comment to which the hashtag of each broadcasting station is added that is stored in the acquired-comment storage unit 410. As the number of posted comments to which a hashtag of a certain broadcasting station is added increases, the first comment displaying unit 430 determines the scroll speed in displaying the posted comment of the broadcasting station to be faster. In other words, the first comment displaying unit 430 determines scroll speed such that the scroll speed for the posted comments for a broadcasting station with relatively more posted comments is faster than the scroll speed for the posted comments for a broadcasting station with relatively less posted comments (S134). For example, the first comment displaying unit 430 may store a correspondence relationship between the range of the number of posted comments (0 to 20 posted comments, 20 to 40 posted comments, . . . , 80 to 100 posted comments) and scroll speed in advance and may determine the scroll speed for the posted comments for each broadcasting station in reference to the correspondence relationship. The first comment displaying unit 430 displays an all-TL screen for the scroll display of the posted comments for each broadcasting station in parallel with one another (S136).

Upon the detection that a predetermined waiting period (e.g., one minute) has passed, the comment acquisition unit 420 acquires the posted comments for each broadcasting station from the posting site server 18 again (not shown in FIG. 33). In the second base technology, it is assumed that a maximum of 100 posted comments are acquired for each broadcasting station in reverse chronological order of the posting time and date. The first comment displaying unit 430 sequentially changes the scroll speed for the posted comments according to the transition of the number of comments acquired by the comment acquisition unit 420. In other words, the scroll speed is decreased as the number of comments decreases, and the scroll speed is increased as the number of comments increases. Using a user account in a posting site that is recorded in advance in the information processing apparatus 11, the comment acquisition unit 420 acquires a comment that is associated with the user account in the posting site server 18.

Figure 34:
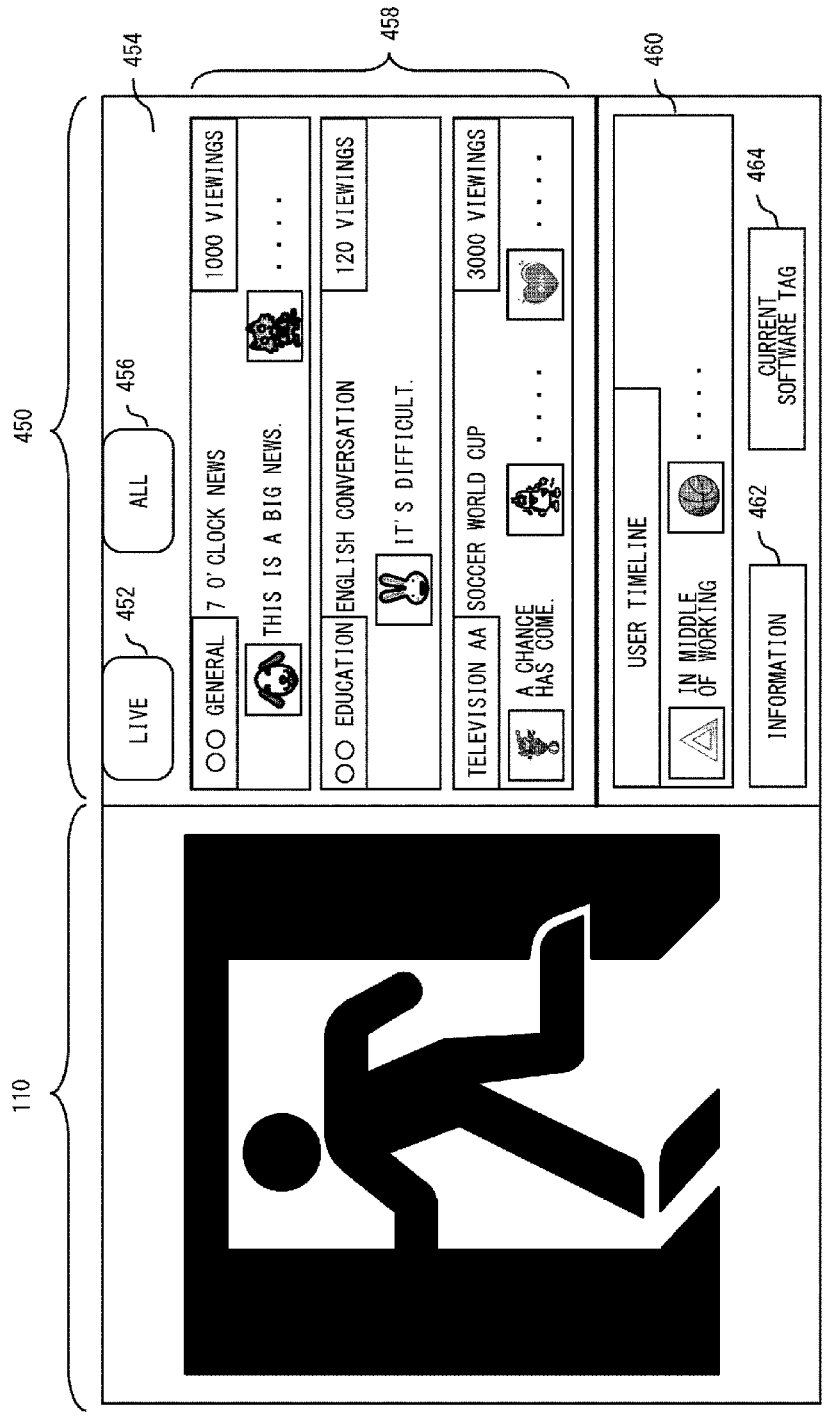
FIG. 34 shows an exemplary all-TL screen as displayed.

FIG. 34 shows an exemplary all-TL screen as displayed. When the live function icon 112b is selected on the image display screen 110, the first comment displaying unit 430 sets a part of the display screen of the display 14 to be a live information display area 450. The first comment displaying unit 430 then displays an all-TL screen 454 in the live information display area 450 side by side with the image display screen 110 that displays a program image. On the all-TL screen 454, a live function tag 452 that shows that a live function is being performed and an all-TL tab 456 that shows that the screen is the all-TL screen 454 are displayed.

The first comment displaying unit 430 displays the comments posted for a program being broadcast by each broadcasting station in parallel with one another in an area for the broadcasting station provided in a broadcasting-station-specific comment area 458. In other words, the first comment displaying unit 430 displays the comments posted for a program being broadcast by a certain broadcasting station independently from the comment posted for a program being broadcast by another broadcasting station.

This allows real-time comments from other viewers provided for a program the user is viewing to be sequentially presented to the user. Also, real-time comments from viewers provided for programs the user is not viewing can be also presented to the user at the same time. Viewer's comments (tweets) are true opinions of viewers that cannot be learned from information shown in program guides. Therefore, a user can check both comments for a program the user is viewing and comments for other programs at the same time so as to select a program to view. An innovative viewing experience can be provided to a user that makes the user aware of a loose connection with other viewers by sequentially presenting the user the thoughts of the moment of people viewing various programs at around the same time.

The first comment displaying unit 430 displays the comments posted for a program of each broadcasting station in an area provided for the broadcasting station in the broadcasting-station-specific comment area 458 while sequentially scrolling the posted comments to the left in reverse chronological order of the posting time and date at a speed that corresponds to the number of postings. This allows the user to intuitively know programs with a large number of comments, which are typically programs for which many viewers are excited, and also supports the user to select a program for which many viewers are excited.

The first comment displaying unit 430 excludes a hashtag and a URL character strings that are added to each comment from being displayed, in other words, hides the hashtag and the URL character strings, when displaying a posted comment. For example, after acquiring a comment from the acquired-comment storage unit 410, the first comment displaying unit 430 may delete hashtag and URL character strings from the comment so as to display the comment. More specifically, upon the detection of a predetermined character string (e.g., "#") that indicates the start of a hashtag in a comment character string, the first comment displaying unit 430 may delete a part of the comment character string that starts with the predetermined character string and ends with a predetermined character string (e.g., a blank character or a space) that indicates the end of the hashtag. Similarly, upon the detection of a predetermined character string (e.g., "http://") that indicates the start of a URL, the first comment displaying unit 430 may delete a part of the comment character string that starts with the predetermined character string and ends with a predetermined character string (e.g., a blank character or a space) that indicates the end of the URL.

The broadcasting-station-specific comment area 458 includes a plurality of broadcasting station areas. Although a comment display area of each broadcasting station is relatively small, only the main text of each comment can be displayed according to this form. This allows a comment to be efficiently displayed while keeping the essential part of the comment.

The first comment displaying unit 430 acquires the number of viewers of a program being broadcast by each broadcasting station from the indicator acquisition unit 68 and displays the acquired number of the viewers in a comment display area of the broadcasting station. The first comment displaying unit 430 may highlight the area of a broadcasting station, which corresponds to a program (being viewed by the user) being displayed on the image display screen 110, in a predetermined mode such as displaying the area in a different background color from that of other areas. This supports the user to easily distinguish the program currently being viewed from other programs.

The first comment displaying unit 430 scroll displays a comment associated with a user account in a user comment area 460. An information area 462 is an area selected to transition the screen to an information screen (described later). A current software tag area 464 is an area selected to transition the screen to a comment to which a hashtag, which indicates a program viewing software, is added, that is, a comment display screen regarding the program viewing software.

The cursor displaying unit 434 displays a cursor for selecting any one of the areas of respective broadcasting stations in the broadcasting-station-specific comment area 458, the user comment area 460, the broadcasting-station-specific comment area 458, and the user comment area 460 on the all-TL screen 454. The user can display an arbitrary screen by selecting a specific area by operating the cursor via the controller 12.

Referring back to FIG. 33, when any of the broadcasting station areas in the broadcasting-station-specific comment area 458 of the all-TL screen 454 is selected by the user (Y in S138), the comment acquisition unit 420 transmits a comment acquisition request to the posting site server 18 by using, as a search key, a hashtag that is preset to the broadcasting station (hereinafter, also referred to as a "selected broadcasting station") selected by the user. The comment acquisition unit 420 then acquires a comment to which the hashtag of the selected broadcasting station is added from the posting site server 18 (S140) and stores the comment in the acquired-comment storage unit 410 (S142).

The second comment displaying unit 432 acquires a comment to which the hashtag of the selected broadcasting station is added that is stored in the acquired-comment storage unit 410. The second comment displaying unit 432 then displays a channel TL screen that displays a list of comments in the order of the posting time and date (S144). The channel TL screen is a so-called timeline related to the selected broadcasting station. When a certain period of time (e.g., one minute) has passed (Y in S146), the step goes back to S140, and a comment is acquired again. The second comment displaying unit 432 updates a tweet list (timeline) on the channel TL screen. In other words, when a new comment is acquired by the comment acquisition unit 420, the second comment displaying unit 432 displays the new comment on the channel TL screen while hiding the old comment.

Figure 35:
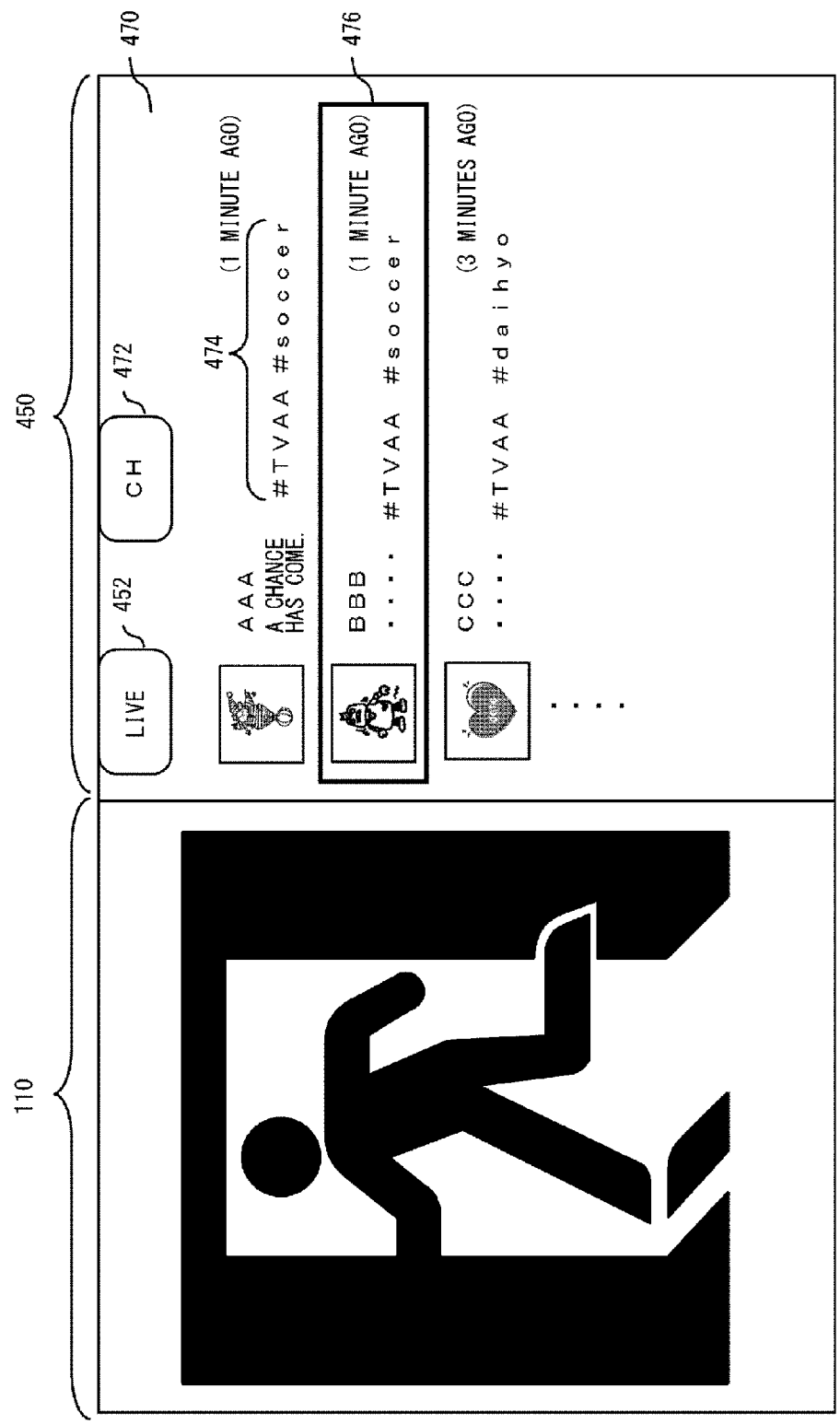
FIG. 35 shows an exemplary channel TL screen as displayed.

FIG. 35 shows an exemplary channel TL screen as displayed. On a channel TL screen 470, the live function tag 452 and a channel TL tab 472 that shows that the screen is the channel TL screen 470 are displayed. On the channel TL screen 470 of the same figure, a list of comments for a program of the selected broadcasting station (the hashtag thereof is "TVAA") is displayed in descending order of the posting time and date. Different from the all-TL screen 454, a hashtag 474 and a URL character string are directly displayed.

When a user operation to the controller 12 is detected during the display of the channel TL screen 470, the cursor displaying unit 434 displays a cursor 476. The cursor 476 is moved in a vertical direction for each comment in accordance with an up/down operation to the directional button of the controller 12. The comment element selecting unit 436 successively leaves the hashtag 474 and the URL character string selected that are described in a comment focused by the cursor 476 in accordance with a left/right operation to the directional button of the controller 12. When a predetermined operation (e.g., depression of a circular button) by the user is detected while the hashtag is being selected, the second comment displaying unit 432 displays a hashtag TL screen that includes a tweet list related to the hashtag.

Figure 36:
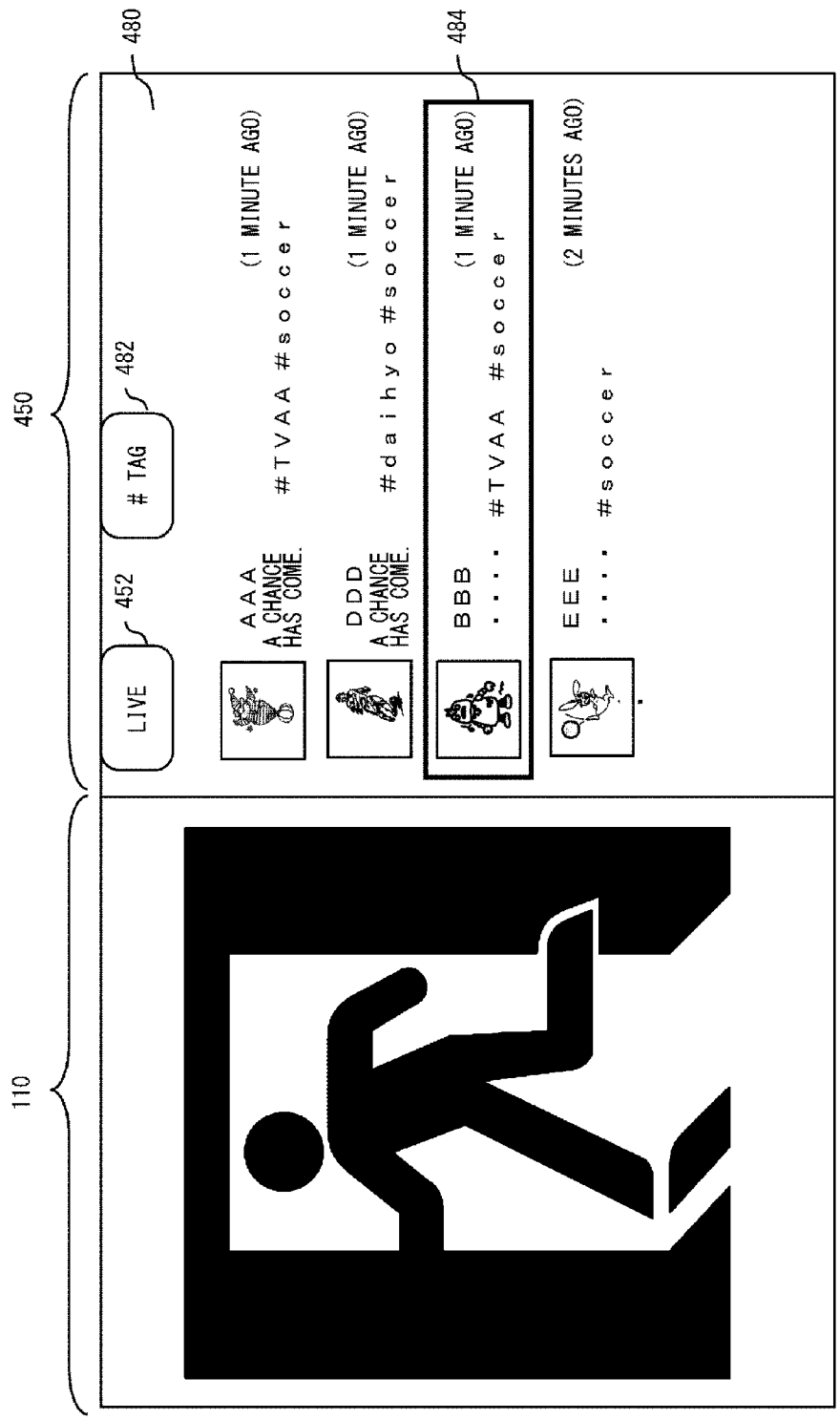
FIG. 36 shows an exemplary hashtag TL screen as displayed.

FIG. 36 shows an exemplary hashtag TL screen as displayed. A hashtag TL screen 480 is a timeline related to a specific hashtag (in this case, "#soccer"). On the hashtag TL screen 480, the live function tag 452 and a hashtag TL tab 482 that shows that the screen is the hashtag TL screen 480 are displayed. On the hashtag TL screen 480 of the same figure, a list of comments to which the hashtag "soccer" is added is displayed in descending order of the posting time and date. The cursor displaying unit 434 displays a cursor 484 for selecting the comments.

Referring back to FIG. 33, when an operation of moving the cursor 476 is detected (Y in S148) before the certain period of time has passed on the channel TL screen 470 (N in S146), the second comment displaying unit 432 temporarily stops the update of the timeline on the channel TL screen (S150). In accordance with a cursor operation by the user, the cursor displaying unit 434 moves the cursor 476, and the second comment displaying unit 432 scroll displays the timeline (S152). For example, when a previously-posted comment that is hidden on the channel TL screen 470 is selected by the cursor 476, the second comment displaying unit 432 scrolls the timeline for each comment and redisplays the comment selected by the cursor 476.

When no operation of moving the cursor 476 is detected before a certain period of time (e.g., 30 seconds) has passed (Y in S154), the cursor displaying unit 434 hides the cursor 476, and the second comment displaying unit 432 resumes the update of the timeline on the channel TL screen (S156). When the operation of moving the cursor 476 is detected within the certain period of time (N in S154), the step goes back to S152. When there is no operation of moving the cursor 476 at all (N in S148), S150 to S156 are skipped. The same operations as those in S140 to S156 also apply to the display of a hashtag TL screen except that a specific hashtag is used as a search key.

As described above, the latest posted comment can be presented to the user by sequentially acquiring the latest posted comment and then by sequentially updating the channel TL screen 470. On the other hand, while a cursor operation (a comment selection operation, etc.) is given by the user, the update of the channel TL screen 470 is prevented so that the operation by the user is prevented from being interfered by the update of the channel TL screen 470. Generally, compared to a mouse of a PC, etc., there is more constraint on a selection operation, and the degree of interference to a user operation by the update of the channel TL screen 470 is larger in the controller 12 (e.g., a game controller) that operates the information processing apparatus 11. Therefore, compared to when a mouse is used as operation means, the user-friendliness can be greatly improved by preventing the update of the channel TL screen 470 during an operation by the user.

Figure 37:
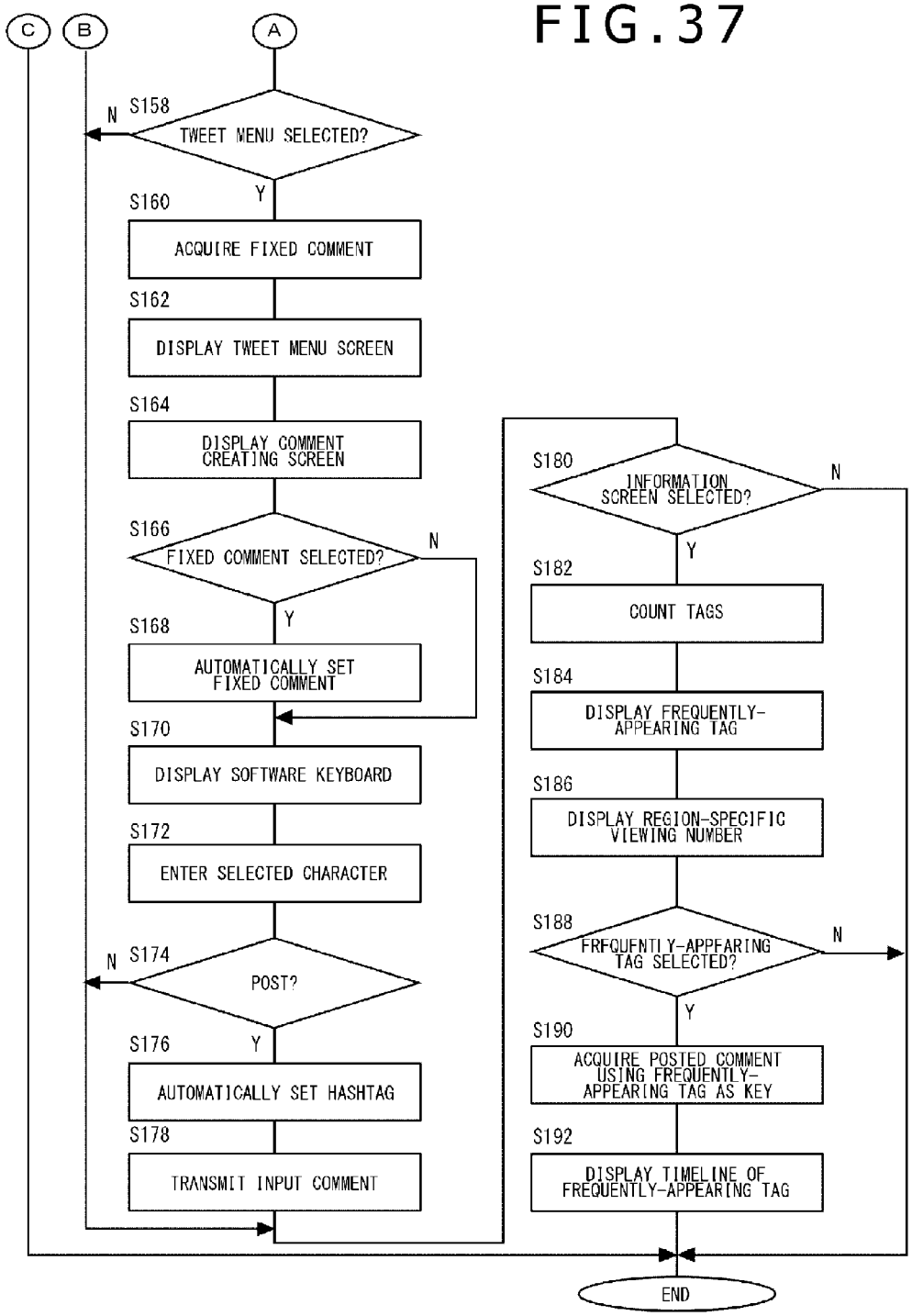
FIG. 37 is a flowchart that continues from FIG. 33.

FIG. 37 is a flowchart that continues from FIG. 33. When a predetermined operation (e.g., depression of a square button) of displaying a menu (hereinafter, also referred to as a "tweet menu") for an operation of posting a comment is detected on the channel TL screen or the hashtag TL screen (Y in S158), the comment creation supporting unit 440 identifies the genre of a program being displayed on the image display screen 110 and acquires a fixed comment associated with the genre from the fixed-comment storage unit 412 (S160). The creation screen displaying unit 438 displays a tweet menu screen including the fixed comment acquired by the comment creation supporting unit 440 (S162).

Figure 38:
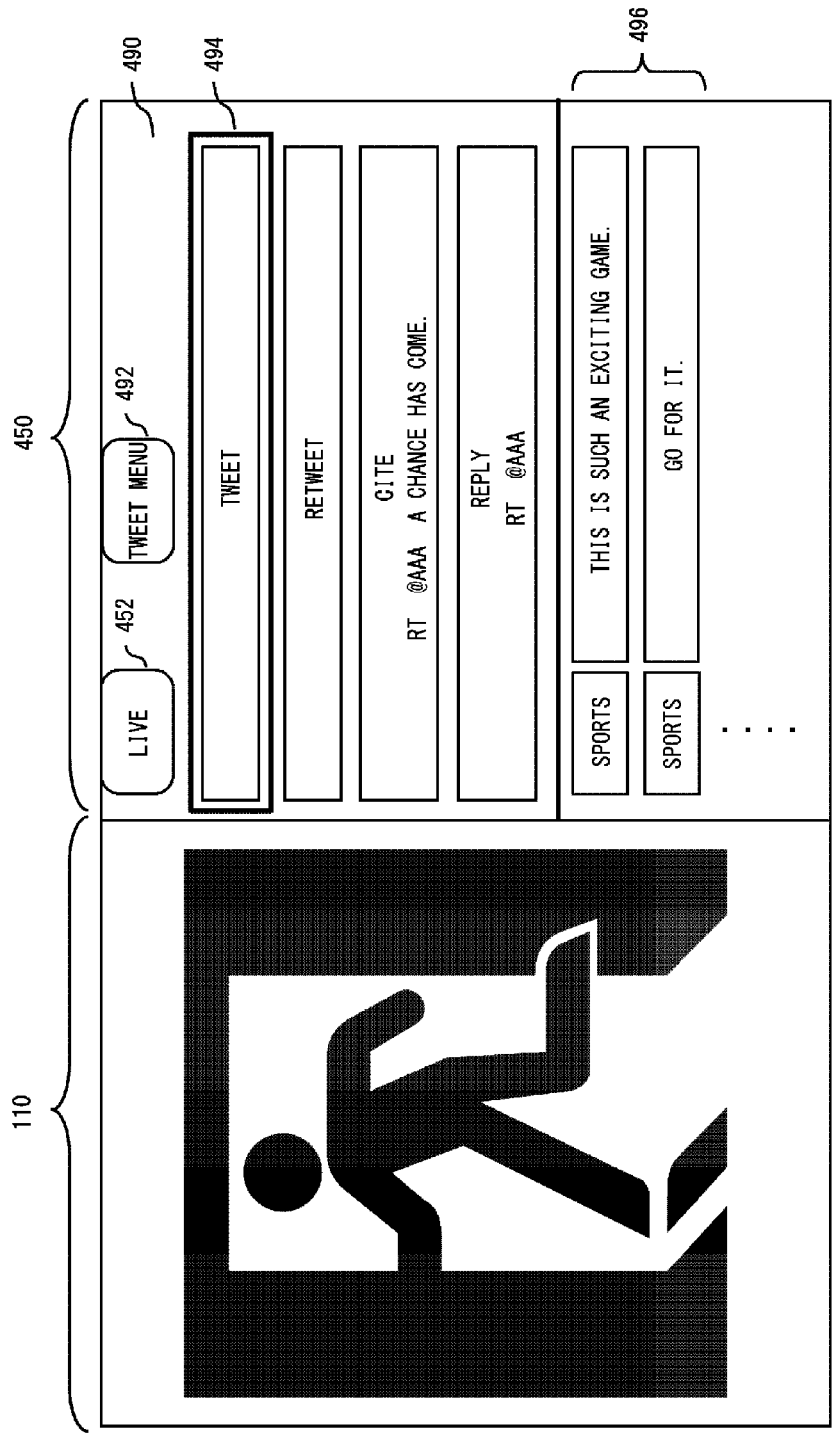
FIG. 38 shows an exemplary tweet menu screen as displayed.

FIG. 38 shows an exemplary tweet menu screen as displayed. On a tweet menu screen 490, the live function tag 452 and a tweet menu tab 492 that shows that the screen is the tweet menu screen 490 are displayed. In the figure, a new tweet and a retweet, citation, and reply for a comment specified by a cursor 494 are displayed as selectable tweet menus. In the lower part of the figure, a fixed comment 496 associated with a program genre "sports" in advance is displayed. The cursor displaying unit 434 displays the cursor 494 on the tweet menu screen 490. The user selects a desired operation area or fixed comment area by operating the cursor 494.

Referring back to FIG. 37, when any one of the selections (a tweet, citation, and fixed comment) is selected on the tweet menu screen, the creation screen displaying unit 438 displays a comment creating screen (S164). When a fixed comment is selected on the tweet menu screen (Y in S166), the input comment setting unit 442 automatically sets the selected fixed comment in the comment creating area of the comment creating screen prior to an operation of entering a comment by the user (S168). When a fixed comment is not selected (N in S166), S168 is skipped. Upon the receipt of a request for entering a comment in the comment creating area from the user, the creation screen displaying unit 438 displays, on the comment creating screen, an image showing a keyboard in which various keys are arranged (S170). When a key of the keyboard is selected by the user, the input comment setting unit 442 sets a character that corresponds to the key in the comment creating area (S172).

Figure 39:
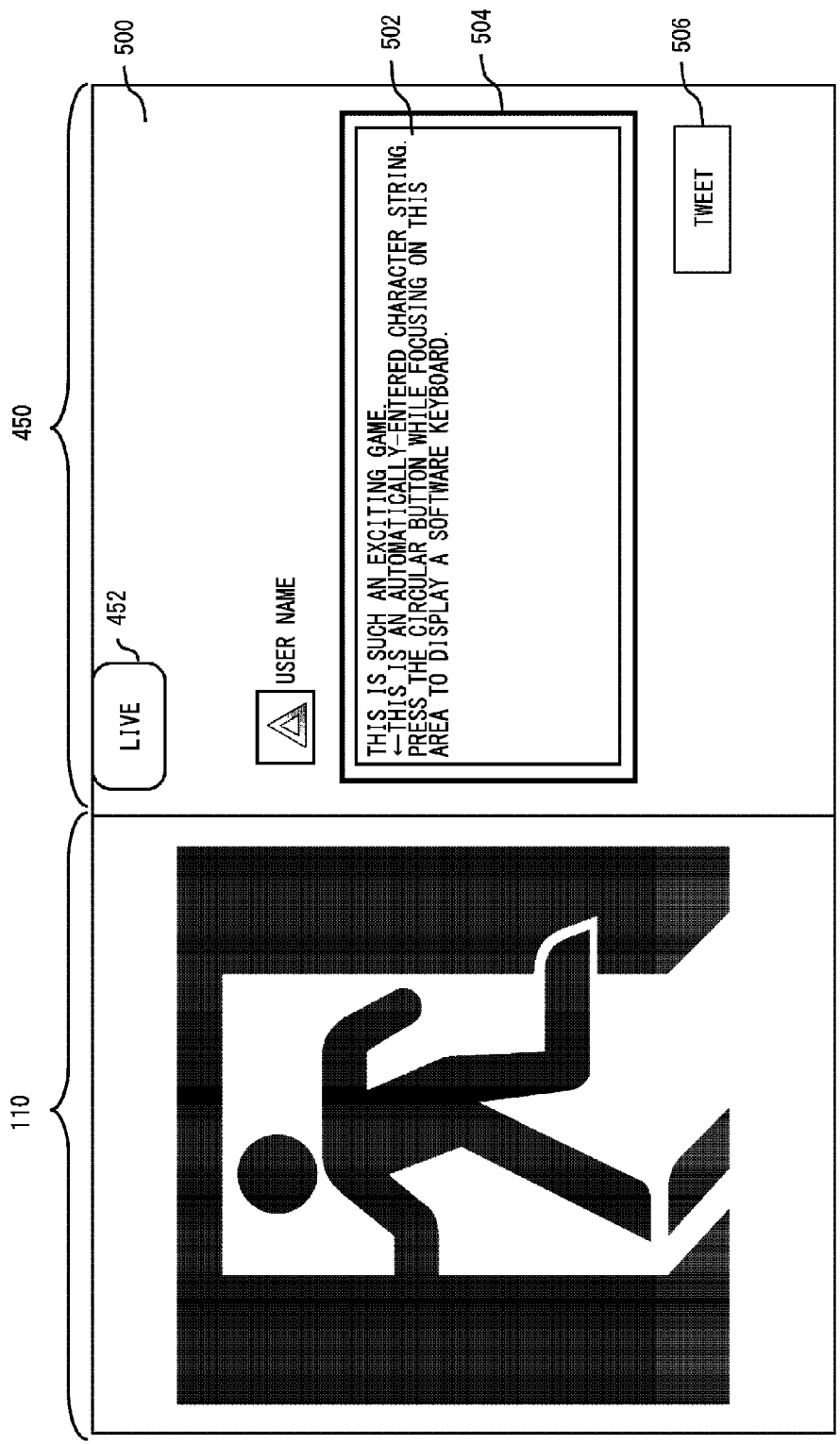
FIG. 39 shows an exemplary comment creating screen as displayed.

FIG. 39 shows an exemplary comment creating screen as displayed. A comment creating screen 500 includes a comment creating area 502 and a posting button 506 for posting a comment created in the comment creating area 502 to the posting site server 18. In the comment creating area 502 of the figure, a fixed comment "this is such an exciting game," which is selected on the tweet menu screen 490 is automatically set. When a fixed comment includes a predetermined original character string to be replaced, the input comment setting unit 442 replaces the original character string with a replacement character string that corresponds to the original character string and sets the replaced character string in the comment creating area 502. For example, when a comment "'a program name' is interesting" of FIG. 29 is selected as a fixed comment, the input comment setting unit 442 changes the fixed comment to "'the actual program name (e.g., 7 o'clock news, etc.)' is interesting."

The cursor displaying unit 434 displays a cursor 504 on the comment creating screen 500. When the user presses down a predetermined button (e.g., a circular button) after focusing on the comment creating area 502 by the cursor 504, the creation screen displaying unit 438 displays a software keyboard. The user enters an arbitrary character in the comment creating area 502 by operating the cursor 504 to select an arbitrary key on the software keyboard.

As described above, a fixed comment appropriate for a program that is being viewed can be extracted from a plurality of fixed comments and presented to the user by storing a correspondence relationship between program genres and fixed comments in advance so as to select a fixed comment that corresponds to the genre of the program the user is viewing. Also, by automatically setting the fixed comment selected by the user in the comment creating area, user's burden in creating a comment can be reduced. Such a configuration is particularly suitable for when a software keyboard is used as means for entering characters. In other words, when a software keyboard instead of a hardware keyboard is used in entering characters, user's burden in entering characters is generally increased. Therefore, by allowing the user to select a fixed phrase, the number of characters entered by the user can be reduced, and the user's burden can be thus reduced greatly.

Referring back to FIG. 37, when the posting button 506 is pressed down on the comment creating screen 500 (Y in S174), the comment posting unit 422 acquires a character string that is entered in the comment creating area. The comment posting unit 422 then sets a final posting comment by adding, to the character string, hashtags indicating a program viewing software, a broadcasting station of a program being displayed on the image display screen 110, a service ID of the program, and an event ID, respectively. The comment posting unit 422 registers the data of the final posting comment by transmitting the data to the posting site server 18 (S178). When depression of the posting button is not detected (N in S174), S176 and S178 are skipped. When an operation of displaying the tweet menu is not detected (N in S158), S160 to S178 are skipped. When none of the broadcasting stations in the broadcasting-station-specific comment area 458 is selected on the all-TL screen 454 (N in S138 of FIGS. 33), S140 to S178 are skipped.

As described above, by automatically setting an appropriate hashtag for a user viewing a program, all the user needs to do is to enter the main text of a comment, and the user's burden can be reduced. As described previously, when a software keyboard is used as means for entering characters, the user's burden can be further reduced.

When the information area 462 is selected by the user on the all-TL screen 454 (Y in S180), the tag tally unit 424 refers to the data of comments posted within the past hour from among comments stored in the acquired-comment storage unit 410 so as to count the number of hashtags added to each comment according to a type of the hashtags and identifies the number of appearances of each hashtag (S182). In addition to displaying the information screen, the frequently-appearing tag displaying unit 444 displays the top eight frequently-appearing tags in a part of the area of the information screen along with the number of appearances thereof (S184). In addition to these, the regional information displaying unit 406 displays, in a part of the area of the information screen, the number of viewing users of each broadcasting station in each region (S186). A predetermined hashtag (e.g., "#TVAA" of FIG. 35, etc.) that indicates a broadcasting station is excluded from being counted by the tag tally unit 424 or selected as a frequently-appearing tag by the frequently-appearing tag displaying unit 444.

Figure 40:
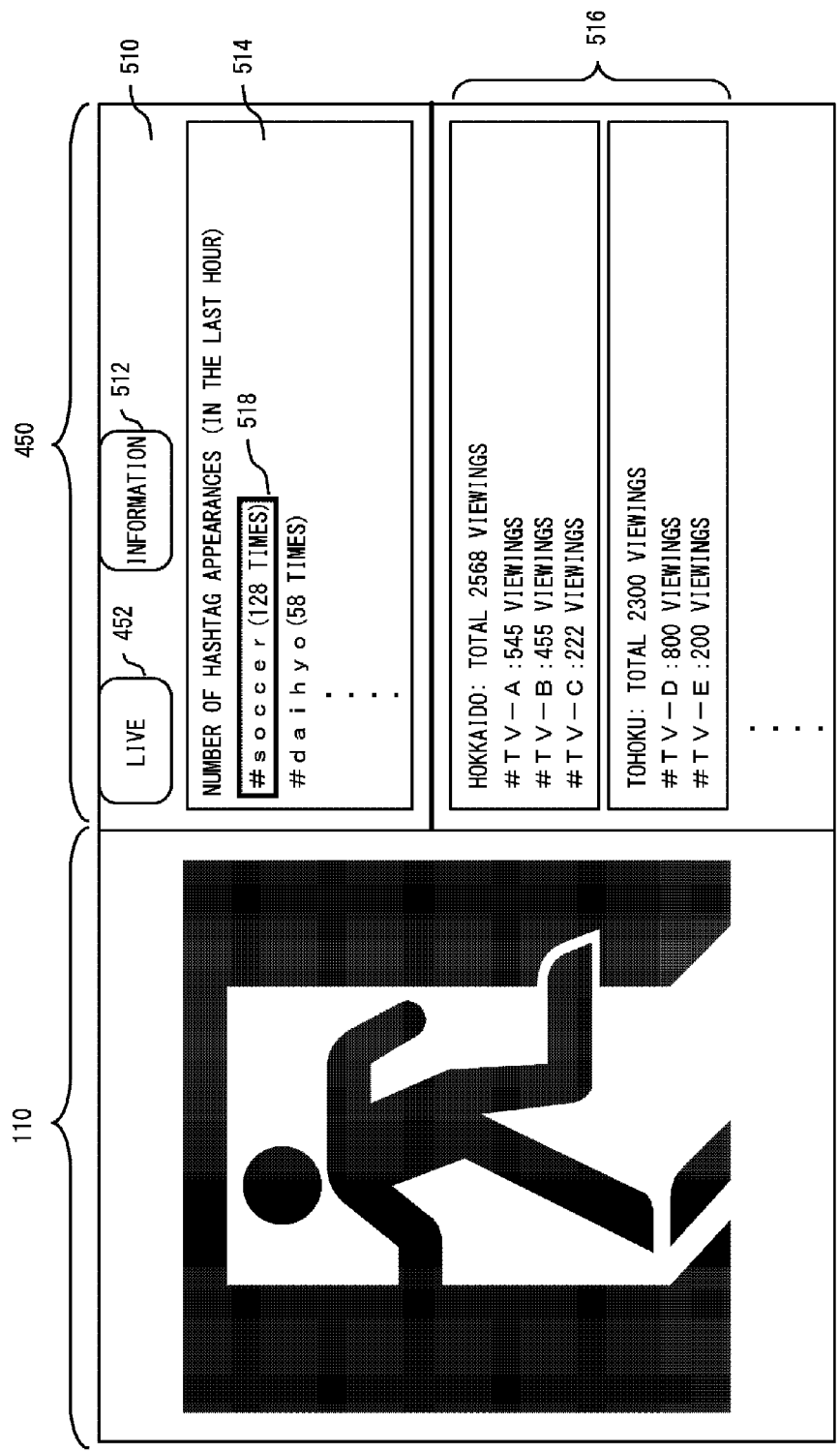
FIG. 40 shows an exemplary information screen as displayed.

FIG. 40 shows an exemplary information screen as displayed. On an information screen 510, the live information display area 450 and an information tab 512 that shows that the screen is the information screen 510 are displayed. The frequently-appearing tag displaying unit 444 displays the information of frequently-appearing tags in the past hour in the frequently-appearing tag display area 514. The regional information displaying unit 406 displays, in a broadcasting-station-specific viewing status displaying area 516, the number of viewing users of each broadcasting station in each region. FIG. 40 shows the number of viewing users in association with hashtags that indicate respective broadcasting stations. The figure also shows the total number of the viewing users in each area, that is, the total number of the viewing users for a broadcasting station corresponding to each region. The cursor displaying unit 434 displays a cursor 518 on the information screen 510. The user can display a desired hashtag TL screen by selecting a desired frequently-appearing tag or broadcasting station tag by operating the cursor 518.

Referring back to FIG. 37, when a frequently-appearing tag is selected on the information screen 510 (Y in S188), the comment acquisition unit 420 transmits a comment acquisition request to the posting site server 18 by using, as a search key, the frequently-appearing tag selected by the user. The comment acquisition unit 420 then acquires a comment to which the frequently-appearing tag is added from the posting site server 18 (S190). The second comment displaying unit 432 displays a hashtag TL screen that displays a list of comments to which frequently-appearing tags acquired by the comment acquisition unit 420 are added in the order of the posting time and date (S192). When a frequently-appearing tag is not selected by the user (N in S188), S190 and S192 are skipped. When the information area 462 is not selected on the all-TL screen 454 (N in S180), S182 to S192 are skipped. When a live function is not selected to begin with (N in S130 of FIG. 33), S132 and all the subsequent steps are skipped.

As described above, by displaying a frequently-appearing tag of a posted comment that is acquired in accordance with a user operation, a hashtag added to many comments can be presented to a user. For example, regarding comments posted for a relay program of a soccer game, there are often more comments to which a hashtag such as "soccer" is added than comments to which the hashtag of the broadcasting station is added. In other words, displaying a timeline of comments to which a hashtag such as "soccer" is added is often more useful for a user than displaying a timeline of comments to which the hashtag of the broadcasting station is added. Presenting a user a frequently-appearing tag allows a candidate for a hashtag, which is useful to the user viewing a program, to be presented, supporting the user to reach a useful timeline. Since comments acquired from the posting site server 18 in accordance with a user operation are the population for counting hashtags, a frequently-appearing tag related to comments the user is interested in can be efficiently presented to the user.

Described above is an explanation of the second form of the base technology. This form is intended to be illustrative only, and it will be obvious to those skilled in the art that various modifications to constituting elements and processes could be developed and that such modifications are also within the scope of the second base technology. An exemplary variation of the second base technology is shown in the following.

A first exemplary variation is now described in detail. Although no particular reference is made in the above second base technology, when the cursor displaying unit 434 hides the cursor 476 since no operation on the cursor 476 is detected for a certain period of time on the channel TL screen 470, the second comment displaying unit 432 may gradually updates the timeline displayed at that point for each comment. For example, the second comment displaying unit 432 may hide the oldest comment in the timeline displayed at that point and add a new comment to be displayed, which is posted subsequently to the latest comment in the timeline. The second comment displaying unit 432 may successively display newly-posted comments in the timeline by repeating the replacement. More specifically, when comments are arranged in descending order of the posting time and date in the timeline, the second comment displaying unit 432 may gradually scroll up the comments from the display position of a cursor at the time the cursor is made hidden so as to successively display newly-posted comments. According to this variation, new comments are successively displayed starting from a comment selected by a user, facilitating the user to find comments (e.g., comments such as replies and citations) that are related to the comment selected by the user. The variation can also facilitate the user to reselect a comment selected before a cursor is made hidden.

Further, the second comment displaying unit 432 may replace an old comment with a new comment in the timeline at a higher speed or scroll up the timeline at a higher speed as the number of comments that are periodically acquired by the comment acquisition unit 420 increases. This variation allows the user to more easily know whether the number of comments posted for a program is large or small in an intuitive manner and also allows new comments to be more easily presented to the user in a quick manner.

A second exemplary variation is now described in detail. Although no particular reference is made in the above second base technology, a plurality of genres may be assigned to each program with regard to program information stored in the program information storage unit 50. For example, a genre "news" an d a genre "variety" may be assigned to a talk show program. The fixed-comment storage unit 412 may store a plurality of genres in association with the same fixed comment. For example, both the genre "news" and the genre "variety" may be associated with the same fixed comment "that's funny." When the comment creation supporting unit 440 selects a plurality of fixed comments, which are all identical, for a program to which a plurality of genres are assigned, the creation screen displaying unit 438 may hide either of the fixed comments on the tweet menu screen 490. According to this variation, a situation can be prevented where a task of checking fixed comments by the user becomes unnecessarily complicated due to a plurality of identical fixed comments being displayed on the tweet menu screen 490 and where the user's burden is increased as a result.

(Embodiment)

Figure 41:
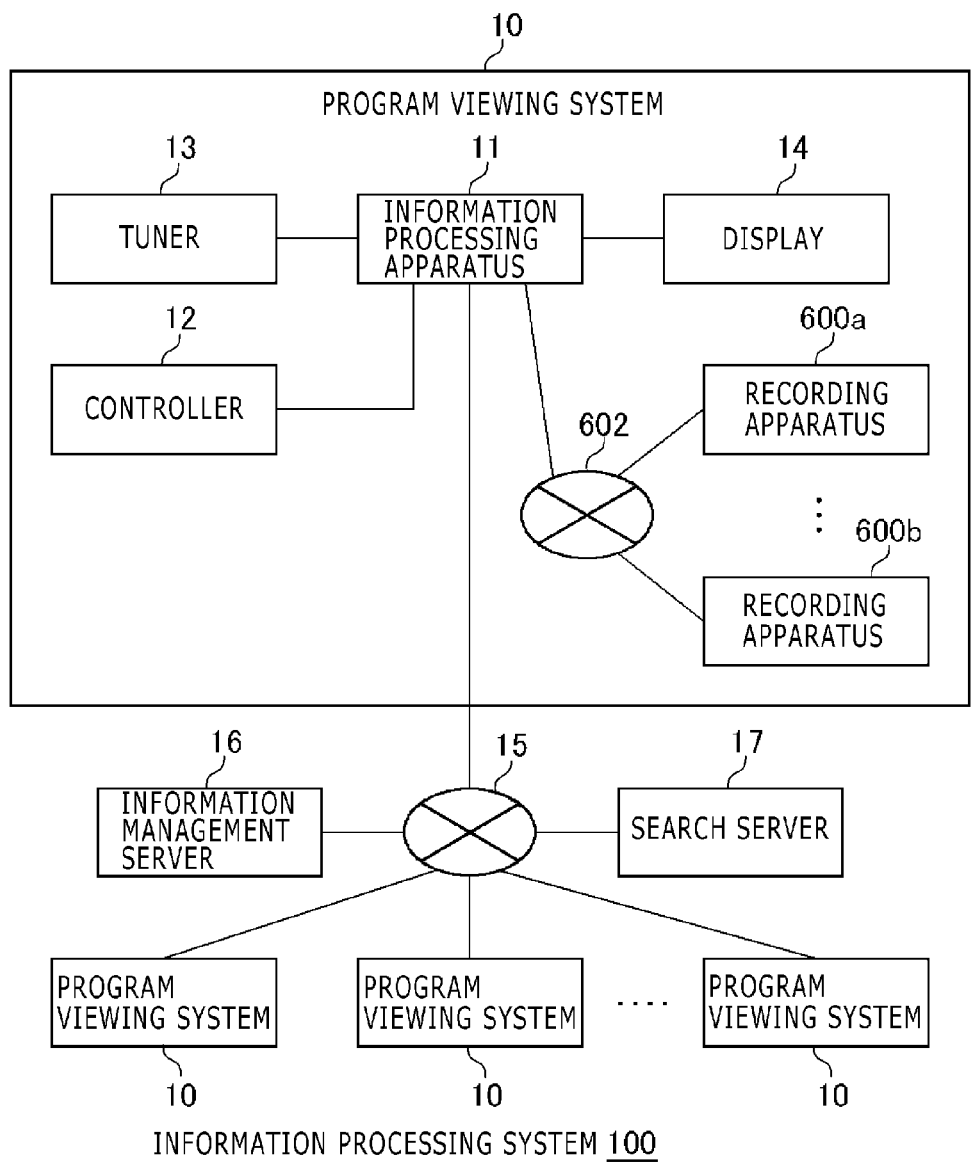
FIG. 41 shows the configuration of an information processing system of an embodiment.

FIG. 41 shows the configuration of an information processing system 100 of an embodiment. In the information processing system 100 of the embodiment, in addition to the components described hereinabove in connection with the base technologies, a program viewing system 10 includes a recording apparatus 600a and another recording apparatus 600b represented generally by a recording apparatus 600. Typically, the information processing system 100 is constructed in a house of a user (viewer), and the recording apparatus 600 are connected to an information processing apparatus 11 through a LAN 602 in the user house. As an example of the recording apparatus 600, a BD recorder (Blu-ray disk recorder) can be listed. Here, the LAN 602 is connected, for example, under the DLNA (Digital Living Network Alliance) standards or compatible standards.

The recording apparatus 600 periodically acquires program information of terrestrial digital television broadcast, BS broadcast and CS broadcast through a tuner not shown in FIG. 41. Then, the recording apparatus 600 causes a predetermined display to display individual program guides. The recording apparatus 600 in the embodiment updates the program guides after every 12 hours. Therefore, the recording apparatus 600 acquires program information through the tuner not shown at least once for every 12 hours.

Although the information processing apparatus 11 of the embodiment acquires program information stored in the recording apparatus 600, the information processing apparatus that provides program information to the information processing apparatus 11 is not limited to any of the recording apparatus 600. For example, in place of the recording apparatus 600, a different program viewing apparatus or AV apparatus (for example, a television set, an HDD recorder or a DVD recorder) may naturally be connected to the information processing apparatus 11 and provide program information to the information processing apparatus 11.

Figure 42:
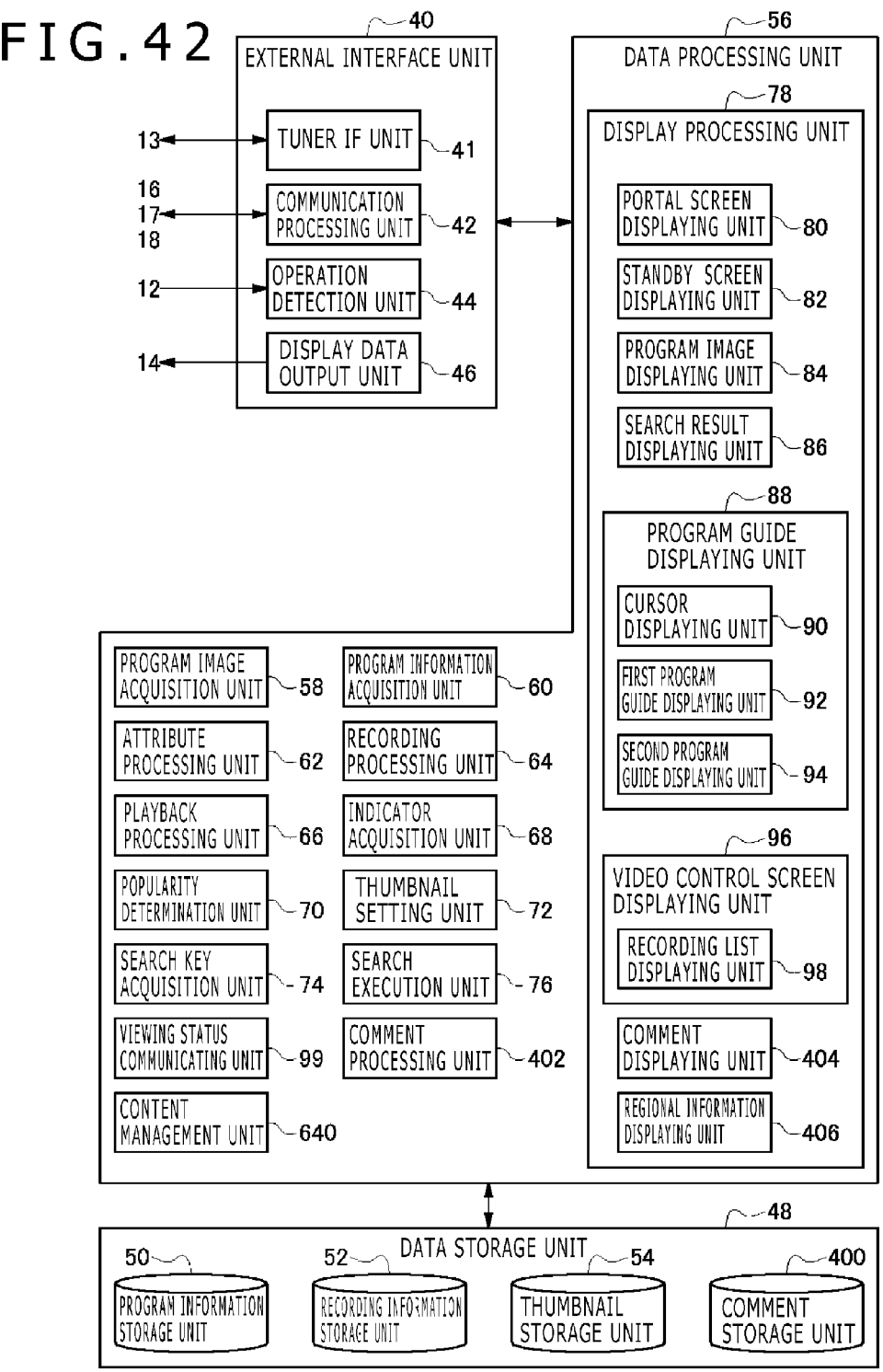
FIG. 42 schematically shows the functional configuration of an information processing apparatus according to the embodiment.

FIG. 42 schematically shows the functional configuration of the information processing apparatus 11 according to the embodiment. When compared with the information processing apparatus 11 according to the second base technology shown in FIG. 27, the information processing apparatus 11 according to the embodiment is different in that it additionally includes a content management unit 640.

Figure 43:
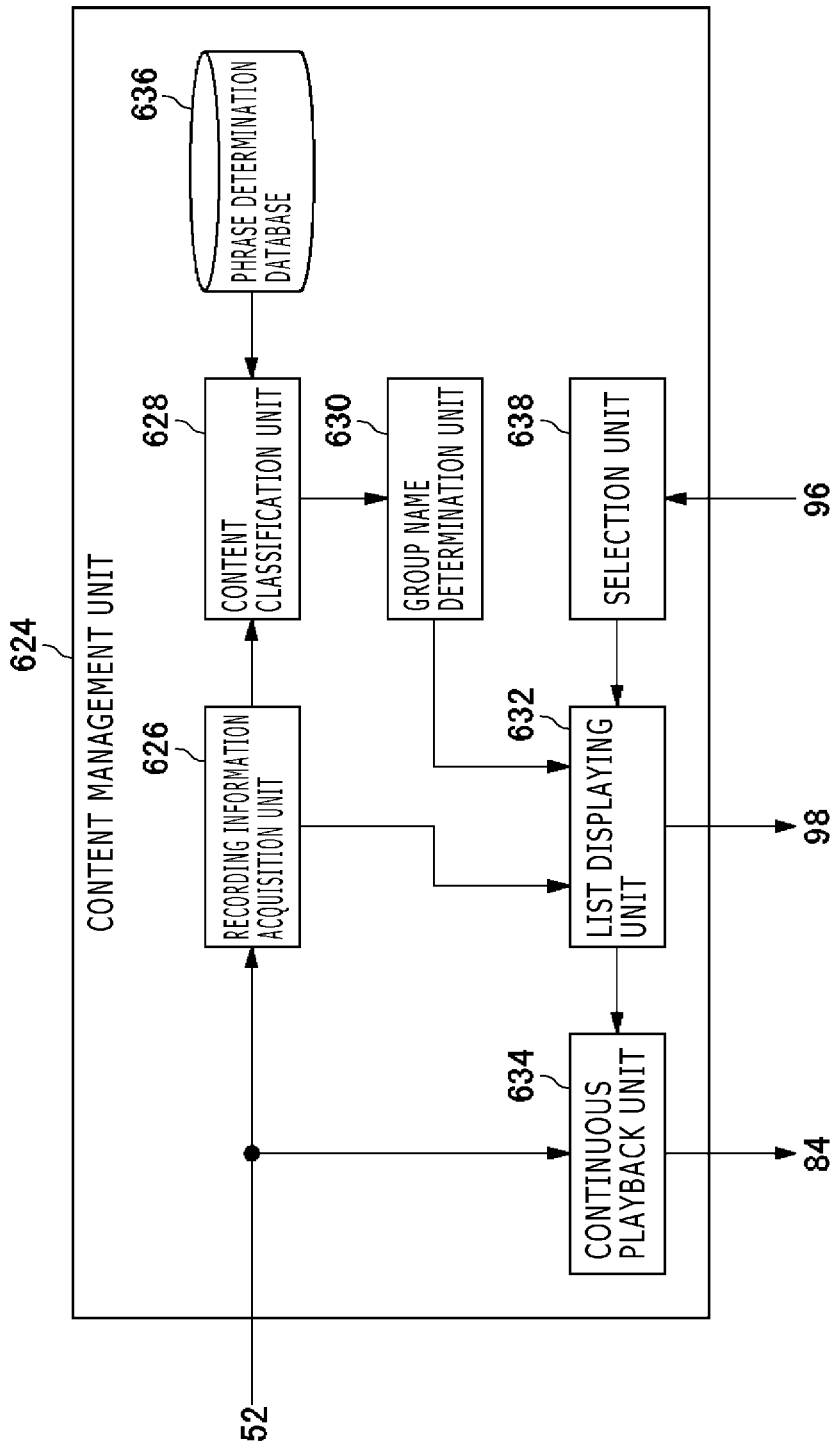
FIG. 43 schematically shows the functional configuration of a content management unit in the information processing apparatus according to the embodiment.

FIG. 43 schematically shows the functional configuration of the content management unit 640 in the information processing apparatus 11 according to the embodiment. The content management unit 640 includes a recording information acquisition unit 626, a content classification unit 628, a group name determination unit 630, a list displaying unit 632, a continuous playback unit 634, a phrase determination database 636 and a selection unit 638.

The recording information acquisition unit 626 acquires recording information of a recorded content locally stored in the recording information storage unit 52 in the information processing apparatus 11. The recording information acquisition unit 626 further acquires recording information of recorded contents stored in a plurality of recording apparatus connected to the information processing apparatus 11 through a network such as a DLNA via the communication processing unit 42 in the information processing apparatus 11. As a result, the recording information acquisition unit 626 acquires all recording information of recorded contents stored in any apparatus without distinguishing the apparatus in which the recorded contents are stored.

The content classification unit 628 analyzes program names included in the recording information acquired by the recording information acquisition unit 626 and sets recorded contents in which programs whose program names include phrases related to each other are recorded as one group. As a result, the recorded contents are grouped without distinction of the apparatus in which they are stored. Details of the manner of determination of a phrase that is utilized upon grouping of recorded contents are hereinafter described.

The group name determination unit 630 determines, for each of the groups of the recorded contents grouped by the content classification unit 628, a title of the group based on phrases used upon grouping. The group name determination unit 630 may determine, for example, one of the phrases themselves used upon grouping as the title of the group. Alternatively, a set of a serial number allocated uniquely to each group and the phrase may be determined as the title of the group.

The list displaying unit 632 outputs group names determined by the group name determination unit 630 to the display processing unit 78 so that all group names are displayed in a list on a single interface.

The selection unit 638 accepts selection of one of the group names displayed by the list displaying unit 632 from the user through the operation detection unit 44. The list displaying unit 632 additionally displays program names of programs recorded in recorded contents included in the group accepted from the user by the selection unit 638 in a list on the single interface. The list displaying unit 632 displays, together with the program names of the programs recorded in the recorded contents included in the group corresponding to the selected group name, also information of recording apparatus in which the recorded contents are stored in a list. The continuous playback unit 634 causes the playback processing unit 66 to sequentially play back the recorded contents included in the group corresponding to the group name accepted by the selection unit 638.

Figure 44:
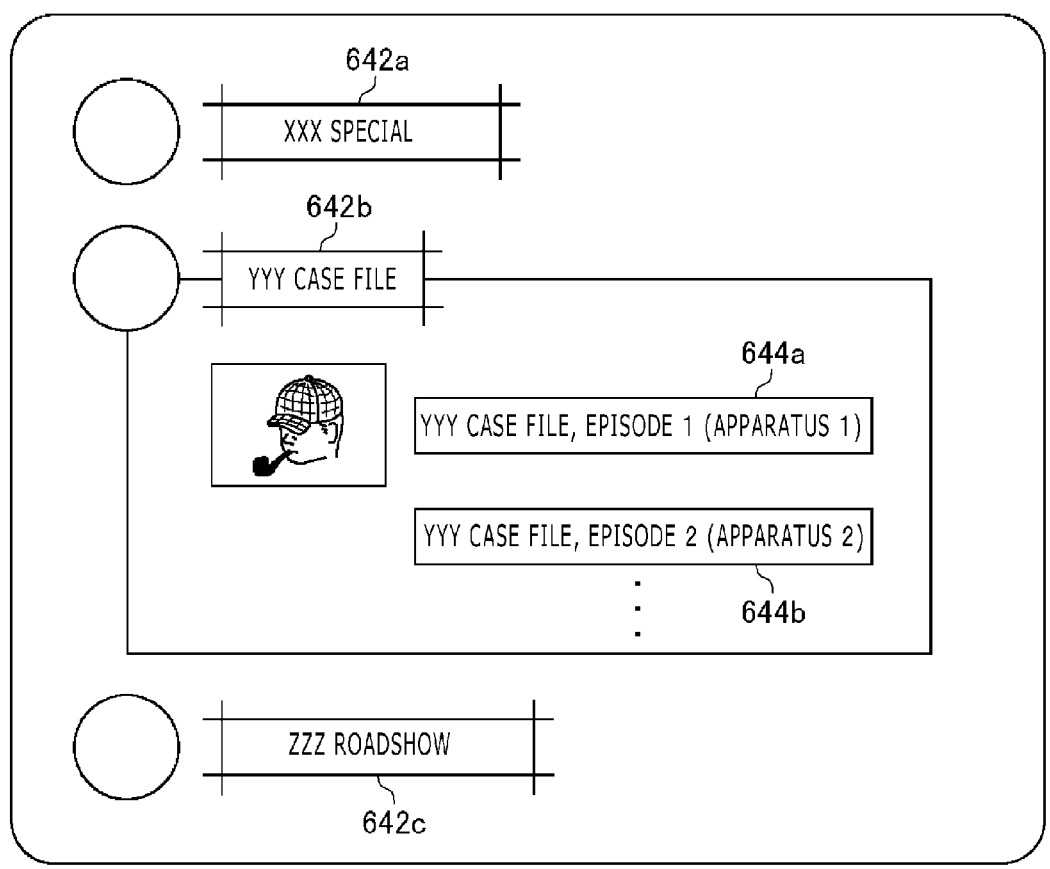
FIG. 44 schematically shows an example of a user interface displayed by a list displaying unit according to the embodiment.

FIG. 44 schematically shows an example of a user interface (UI) displayed by the list displaying unit 632 according to the embodiment. Referring to FIG. 44, a manner in which titles 642a, 642b and 642c of a group generally denoted by reference numeral 642 are displayed in a list on a single UI is shown. In particular, in FIG. 44, the title 642a is "XXX special"; the title 642b is "YYY case file"; and the title 642c is "ZZZ roadshow."

If the user selects the title 642b through the selection unit 638, then the list displaying unit 632 additionally displays recorded contents included in the group on the user interface. FIG. 44 shows a manner in which a program name 644a and another program name 644b included in the group titled "YYY case file" are displayed. For example, the program name 644a is "YYY case file, episode 1 (apparatus 1)," and the list displaying unit 632 simultaneously displays also information of the apparatus in which the recorded content is stored.

In this manner, the list displaying unit 632 handles all recorded contents equally without distinguishing them by the locations where the recorded contents are stored. Consequently, all program names of programs recorded in the recorded contents are displayed in a list on a single user interface. If the recording apparatus 600 is connected through the LAN 602, then the user of the information processing apparatus 11 according to the embodiment can view a recorded content on the single user interface without paying attention to in which one of the recording apparatus 600 the recorded content is stored.

Referring back to FIG. 43, a character string that configures a program name is configured from a phrase useful for grouping programs and a character or characters (hereinafter referred to as "exclusion character") that is insignificant when programs are grouped or may possibly make an obstruction to appropriate grouping. For example, it is assumed that a certain program name is "<New> Great Adventure of ABC 'The Final Battle of ABC' PART 2." At this time, "<New>" is a character string composed of exclusion characters. Meanwhile, such characters as space character (space, tab and so forth) and "are separates (punctuations) for separating "Great Adventure of ABC," "Final Battle of ABC" and so forth which are useful phrases for grouping programs from each other. In other words, a "separate" is a character which serves as a punctuation between a plurality of phrases existing in a program name.

Thus, upon determination of a phrase to be used for grouping of recorded contents by the content classification unit 628, the phrase determination database 636 stores character strings to be excluded from program names and separates between phrases existing in the program names. Here, as an example of an exclusion character string, such character strings as "free, <new>, [5.1]" and so forth are listed. Further, if particular examples of a separate are enumerated, then they are "#, vol X, vol. X, PART X, PART. X, /, X hours, Xth day, :, ( ), < >, " ", ∇, 「」, 『』, guest:, season X, special, double-byte space, one-byte space, +−, first half, second half, last part/day/episode, chapter X, /section/day/game, ~~" and so forth.

In the following, a procedure for phrase determination by the content classification unit 628 is described.

The content classification unit 628 converts an acquired program name from double-byte into one-byte. When an ARIB character, developed ARIB characters (that are not configured from a single character like [new]), or another character string that appears frequently and is not a decoration for a program name and hence is insignificant is positioned at the top of the title, the content classification unit 628 deletes the character or character string. In other cases, the content classification unit 628 replaces the character or character string into a space. Further, the content classification unit 628 collects more than one contiguous one-byte space into a single space.

Then, if an episode number (for example, #1) exists at the top of the program name, then the content classification unit 628 moves the episode number to the tail of the program name. The content classification unit 628 further determines whether or not the program name includes an episode number. If it is determined that the program name includes an episode number, then the content classification unit 628 determines part immediately preceding to the episode number as a frame. Further, if an episode number is included and a bracket like " 「 " or " 『 " does not exist in the part immediately preceding to the episode number, then the content classification unit 628 determines the immediately preceding part as a phrase.

The content classification unit 628 excludes the exclusion characters stored in the phrase determination database 636 from the program name. Then, if the content classification unit 628 finds out, from within the remaining character string, a character string punctuated by a separate and having a length equal to or greater than an effective length or a character string having more than a predetermined number of characters which is liable to be unique, then the content classification unit 628 produces the character string as a phrase. If the character string punctuated by a separate remains within the effective length, then the content classification unit 628 searches for a next separate. The content classification unit 628 carries out forward match comparison between produced phrases and determines, when the phrases match each other, that the recorded contents in which the programs are recorded belong to the same group. The content classification unit 628 allocates a same group ID to phrases regarded as belonging to the same group but allocates a unique group ID to each of different phrases.

Since the content classification unit 628 carries out forward match comparison, for example, such a situation that a program name of "XXX entateimento 1" and "XXX entateimento 2" (katakana character expression: expression in Roman leltters) are not regarded as the same program depending upon the presence or absence of the character "n" may possibly occur. Further, for example, from "every week drama title A new program" and "every week drama title A episode 2," different phrases are produced depending upon whether or not an episode number is included. In the example given above, the phrase of the former is "every week drama" while the phrase of the latter is "every week drama title A," and as a result, they are allocated to different groups.

In order to deal with such problems as described above, the content classification unit 628 executes a requote process. The requote process is a process of carrying out comparing phrases produced once and associated with a group and an inputted group name with each other and allocating the group newly. The content classification unit 628 successively compares the inputted program name and those phrases whose one character at the top match each other and determines whether they exhibit match-all or match of equal to or more than a predetermined number of characters with which they are considered as associated programs. Then, the phrase whose match-all or longest match is determined is regarded as a related group, and the group ID of the phrase is allocated.

Here, the "predetermined number of characters" is a comparison reference character number to be used as a reference for the determination of whether or not phrases coincide with each other, and is, for example, five characters. This comparison reference character number is stored in the phrase determination database 636, and the content classification unit 628 reads out the comparison reference character number from the phrase determination database 636 and executes the requote process.

Here, the following three cases are exceptions. In particular, (i) match-all of one character is not regarded as match-all. (ii) Even if forward match comparison results in failure, if one is a space and a character next to the space is found to be matched, then the forward match is continued with the position changed. (iii) If the inputted program name and the phrase during comparison for match have a space at the same position, then the forward match is executed anew from the next position (even if match of equal to or more than five characters is found, the forward match is carried out again). If the processes described above result in no determination, then the content classification unit 628 allocates 0 as the group ID.

By the requote process, if, in the example of "every week drama" described above, two or more of "every week drama" are not found, then "every week drama title A new program" is acted upon by the requote process and re-allocated to "every week drama title A." On the other hand, if a different program name of "every week drama title B" is found, then since also this program name is punctuated as "every week drama," "every week drama title A new program" and "every week drama title B" are grouped into "every week drama" group. Further, in the example of "XXX entateimento," since match of ten characters which is match of equal to or more than five characters can be confirmed by the forward match, "XXX entateimento" is re-allocated to the "XXX entateimento" group only when it belongs to no group, namely, only when the group ID of it is 0.

FIG. 45 is a flowchart showing the operation of the content management unit 624 according to the embodiment.

The recording information acquisition unit 626 acquires recording information of a recorded content of a playback target from the recording information storage unit 52 (S200). The content classification unit 628 produces phrases from a program name included in the recording information acquired by the recording information acquisition unit 626 (S202). Further, the content classification unit 628 uniquely allocates different IDs to different phrases (S204).

If the recording information of all of the recorded contents stored in the information processing apparatus 11 or the recording apparatus 600 is not acquired (N in S206), then the processing returns to step S200 described above and the processes are repeated. If the recording information of all recorded contents stored in the information processing apparatus 11 or the recording apparatus 600 is acquired (Y in S206), then the content classification unit 628 produces groups of the recorded contents based on the allocated group IDs (S208).

The content classification unit 628 scans the produced groups in order (S210). If the group being currently scanned does not include a plurality of programs (N in S212), then the content classification unit 628 executes a requote process (S214). If the group being currently scanned includes a plurality of programs (Y in S212), then the content classification unit 628 advances the processing to step S216 without executing the requote process.

If the scanning of all groups is not completed (N in S216), then the processing returns to step S210 described above to repeat the processes. If the scanning of all groups is completed (Y in S216), then the list displaying unit 632 displays the titles of the groups grouped by the content classification unit 628 in a list on a single user interface (S218). After the list displaying unit 632 displays the titles of the groups in a list, the processing in the present flowchart is ended.

Action by the configuration described above is described below. If a recorded content is added to the information processing apparatus 11 or any of the recording apparatus 600 according to the embodiment, then the recording information acquisition unit 626 acquires the recording information of the recorded content. The content classification unit 628 produces a group ID of the recorded content from the recording information of the added recorded content.

If the user of the information processing apparatus 11 uses the controller 12 or the like to display a video operation screen, then the content classification unit 628 executes a requote process. This is because, since the requote process requires satisfaction of the assumption that all program names are inputted, the timing at which the user causes the video operation screen to be displayed assures the assumption.

As described above, with the information processing apparatus 11 according to the embodiment, programs recorded in a plurality of recording apparatus can be managed in a centralized manner.

Described above is an explanation of the present invention based on the embodiment. The embodiment is intended to be illustrative only, and it will be obvious to those skilled in the art that various modifications to constituting elements and processes could be develop and that such modifications are also within the scope of the present invention.

While, in the foregoing description, the content classification unit 628 carries out grouping based on a produced phrase, the content classification unit 628 may utilize a known morphological analysis when it produces a phrase. Further, a word dictionary may be used in addition in the morphological analysis.

Optional combinations of the aforementioned embodiment and exemplary variations will also be within the scope of the present invention. New modes of practicing the invention created by combinations will provide the advantages of the embodiment and variations combined.

It will be obvious to those skilled in the art that the function to be achieved by each constituent requirement described in the claims may be achieved by each constituting element shown in the embodiment and the variations or by a combination of the constituting elements.

REFERENCE SIGNS LIST

11 Information processing apparatus, 13 Tuner, 60 Program information acquisition unit, 88 Program guide displaying unit, 90 Cursor displaying unit, 94 Second program guide displaying unit, 100 Information processing system, 600 Recording apparatus, 624 Content management unit, 626 Recording information acquisition unit, 628 Content classification unit, 630 Group name determination unit, 632 List displaying unit, 634 Continuous playback unit, 636 Phrase determination database, 638 Selection unit.

INDUSTRIAL APPLICABILITY

The present invention relates to a data processing technology and can be applied to a technique for displaying program names of programs recorded in a plurality of recording apparatus in a list.

The invention claimed is:

1. An information processing apparatus, comprising:
a recording information acquisition unit configured to acquire recording information of a plurality of recorded contents having programs recorded therein and stored in the information processing apparatus or in any of a plurality of recording apparatus connected to the information processing apparatus through a network;
a content classification unit configured to classify the recorded contents into groups based on the recording information acquired by the recording information acquisition unit;
a group name determination unit configured to determine, for each of the groups of the recorded contents classified by the content classification unit, a title of the group;
a list displaying unit configured to display the group names determined by the group name determination unit in a list on a user interface without distinguishing the apparatus in which the recorded contents are stored,
wherein the content classification unit analyzes the program names of a plurality of programs included in the recording information acquired by the recording information acquisition unit to specify programs whose program names include phrases related to each other and classifies, for each of the recorded contents in which the specified program is recorded, the recorded contents into a group without distinguishing the apparatus in which the recorded contents are stored; and
a phrase determination database configured to store character strings to be excluded from a program name upon the determination of the phrases and separates to be used as punctuations between plurality of phrases existing in the program name;
the content classification unit excluding character strings to be excluded which are stored in the phrase determination database from the program names of the programs included in the recording information acquired by the recording information acquisition unit to produce character strings punctuated by the separates as phrases.

2. The information processing apparatus according to claim 1, wherein the phrase determination database further includes a comparison reference character number to be used as a reference for the determination regarding whether or not phrases coincide with each other, and the content classification unit carries out forward match comparison of the produced phrases and classifies those recorded contents in which programs including phrases whose numbers of characters equal to or greater than the comparison reference character number match each other are recorded into the same group.

3. The information processing apparatus according to claim 1, further comprising:

a selection unit configured to accept selection of any of the group names displayed by the list display unit;

the list displaying unit further displaying the program names of the programs recorded in the recorded contents included in the group corresponding to the selected group name in a list on the user interface that displays the group names in a list.

4. The information processing apparatus according to claim 3, further comprising a continuous playback unit configured to successively play back the recorded contents included in the group corresponding to the group name accepted by the selection unit.

5. The information processing apparatus according to claim 3, wherein the list displaying unit displays, together with the program names of the programs recorded in the recorded contents included in the group corresponding to the selected group name, also information of the recording apparatus in which the recorded contents are stored in a list.

6. An information processing method causing a processor to carry out:

classifying a plurality of recorded contents having programs recorded therein and stored locally or in any of a plurality of recording apparatus connected through a network into groups;

producing group names;

displaying the produced group names in a list on a user interface without distinguishing the apparatus in which the recorded contents are stored;

analyzing program names of the programs to specify programs whose program names include phrases related to each other;

classifying, for each of the recorded contents in which the specified program is recorded, the recorded contents into a group;

storing character strings to be excluded from a program name upon the determination of the phrases and separates to be used as punctuations between a plurality of phrases existing in the program name; and excluding character strings to be excluded which are stored from the program names of the programs included in the acquired recording information to produce character strings punctuated by the separates as phrases.

7. A non-transitory computer readable medium having stored thereon a program causing a computer to implement:

a function for acquiring recording information of a plurality of recorded contents having programs recorded therein and stored locally or in any of a plurality of recording apparatus connected through a network;

a function for classifying the recorded contents into groups based on the acquired recording information;

a function for applying a group name to each of the groups obtained by the classification;

a function for displaying the group names in a list on a user interface without distinguishing the apparatus in which the recorded contents are stored;

wherein the function for classifying analyzes the program names of a plurality of programs included in the recording information acquired by the function for acquiring to specify programs whose program names include phrases related to each other and classifies, for each of the recorded contents in which the specified program is recorded, the recorded contents into a group without distinguishing the apparatus in which the recorded contents are stored and a phrase determination database configured to store character strings to be excluded from a program name upon the determination of the phrases and separates to be used as punctuations between a plurality of phrases existing in the program names;

the function for classifying excluding character strings to be excluded which are stored in the phrase determination database from the program names of the programs included in the recording information acquired by the function for acquiring to produce character strings punctuated by the separates as phrases.

\* \* \* \* \*